US009022583B2

(12) United States Patent
Neuman et al.

(10) Patent No.: US 9,022,583 B2
(45) Date of Patent: May 5, 2015

(54) VEHICULAR EXTERIOR TRANSFLECTIVE REARVIEW MIRROR ASSEMBLY

(71) Applicant: Gentex Corporation, Zeeland, MI (US)

(72) Inventors: George A. Neuman, Holland, MI (US); Jeffrey A. Forgette, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 314 days.

(21) Appl. No.: 13/751,989

(22) Filed: Jan. 28, 2013

(65) Prior Publication Data

US 2014/0211492 A1  Jul. 31, 2014

(51) Int. Cl.

| | | |
|---|---|---|
| *G02B 7/18* | (2006.01) | |
| *G02B 1/10* | (2006.01) | |
| *B60Q 1/26* | (2006.01) | |
| *B60R 1/08* | (2006.01) | |
| *B60R 1/12* | (2006.01) | |

(52) U.S. Cl.
CPC ............... *G02B 1/10* (2013.01); *B60Q 1/2665* (2013.01); *B60R 2001/1215* (2013.01); *B60R 1/088* (2013.01)

(58) Field of Classification Search
CPC ............... G02B 7/1815; G02B 1/10; B60R 2001/1215; B60R 1/088; B60R 1/12; B60R 1/1207; B60Q 1/30; B60Q 1/2665
USPC .......... 359/512, 601, 603, 608, 265, 273, 839
See application file for complete search history.

(56) References Cited

U.S. PATENT DOCUMENTS

| | | | |
|---|---|---|---|
| 5,189,537 A | 2/1993 | O'Farrell | |
| 5,535,056 A | 7/1996 | Caskey et al. | |
| 5,604,626 A | 2/1997 | Teowee et al. | |
| 5,668,663 A * | 9/1997 | Varaprasad et al. | .......... 359/608 |
| 5,682,267 A | 10/1997 | Tonar et al. | |
| 5,724,187 A | 3/1998 | Varaprasad et al. | |
| 5,838,483 A | 11/1998 | Teowee et al. | |
| 6,074,066 A | 6/2000 | Macher et al. | |
| 6,111,683 A | 8/2000 | Cammenga et al. | |
| 6,196,688 B1 | 3/2001 | Caskey et al. | |
| 6,246,505 B1 | 6/2001 | Teowee et al. | |
| 6,280,041 B1 | 8/2001 | Unger et al. | |
| 6,286,965 B1 | 9/2001 | Caskey et al. | |
| 6,304,363 B1 | 10/2001 | Lynam | |

(Continued)

OTHER PUBLICATIONS

Patent Cooperation Treaty, International Searching Authority, International Search Report, Written Opinion of the International Searching Authority and Notification of Transmittal, May 22, 2014 6 Pages.

*Primary Examiner* — Euncha Cherry

(74) *Attorney, Agent, or Firm* — Price Heneveld LLP; Scott P. Ryan

(57) ABSTRACT

A single-substrate mirror element defined by a transflective metal layer—non-metal layer—metal layer coating disposed on the first surface of the substrate and enabled to meet the requirements of operation in an exterior rearview assembly and to provide for stealthy appearance of a light source of the assembly disposed behind the mirror element. The appearance of the mirror element, defined in parameters of the CIELAB color system, is substantially color-neutral, while tuning of reflectance and transmittance characteristics can be achieved substantially independently from one another. Reflectance value and measure of color content of light specularly reflected by the mirror at non-zero angles remains substantially stable within wide range of angles.

29 Claims, 17 Drawing Sheets

(56) References Cited

U.S. PATENT DOCUMENTS

| | | |
|---|---|---|
| 6,356,376 B1 | 3/2002 | Tonar et al. |
| 6,556,350 B2 | 4/2003 | Nakaho et al. |
| 6,657,767 B2 | 12/2003 | Bonardi et al. |
| 6,916,099 B2 | 7/2005 | Su et al. |
| 6,919,796 B2 | 7/2005 | Boddy et al. |
| 7,004,592 B2 | 2/2006 | Varaprasad et al. |
| 7,019,906 B2 | 3/2006 | Leu et al. |
| 7,042,616 B2 | 5/2006 | Tonar et al. |
| 7,048,392 B2 | 5/2006 | Nakaho |
| 7,182,475 B2 | 2/2007 | Kramer et al. |
| 7,317,566 B2 | 1/2008 | Tench et al. |
| 7,626,749 B2 | 12/2009 | Baur et al. |
| 2002/0041443 A1 | 4/2002 | Varaprasad et al. |
| 2003/0002179 A1 | 1/2003 | Roberts et al. |
| 2004/0070857 A1 | 4/2004 | Bonardi et al. |
| 2005/0231839 A1 | 10/2005 | Murakami et al. |
| 2006/0098289 A1 | 5/2006 | McCabe et al. |
| 2006/0221452 A1 | 10/2006 | Chen |
| 2007/0019296 A1 | 1/2007 | Bauer et al. |
| 2007/0042200 A1 | 2/2007 | Wityak |
| 2007/0172625 A1 | 7/2007 | Ridout et al. |
| 2007/0207571 A1 | 9/2007 | Morisue et al. |
| 2007/0279752 A1 | 12/2007 | McCabe et al. |
| 2008/0024854 A1 | 1/2008 | Izumi et al. |
| 2010/0020380 A1 | 1/2010 | Tonar et al. |

\* cited by examiner

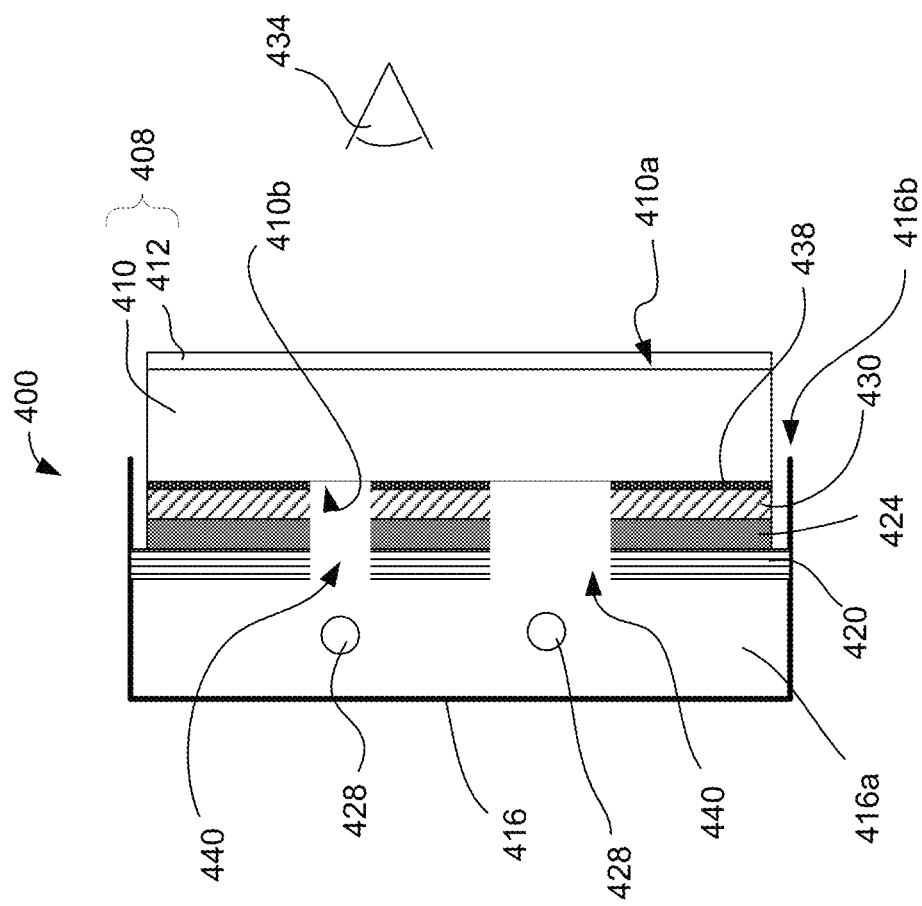

VEHICULAR EXTERIOR TRANSFLECTIVE REARVIEW MIRROR ASSEMBLY

TECHNICAL FIELD

The present invention relates to vehicular external mirror assemblies and, in particular, to an assembly a mirror system of which is transflective and devoid of electrochromic element.

BACKGROUND ART

As a an automotive rearview assembly is equipped with more and more technical features (for example, laser-ablated openings in reflective layer(s) of a mirror element for delivery of light from a turning signal indicator to the user, or side blind zone indicators), the effective area of the mirror element that forms an image of space surrounding and at the back of the vehicle is consistently reduced. To counterbalance this at least to a certain degree, the idea of a complex transflective mirror element for use in an interior rearview assembly and in a driver-side exterior rearview assembly has been introduced, that facilitates the integration of various light sources (such as displays or turn signals) behind the mirror element without the substantially reduction of the area of the mirror.

In a case of a passenger-side exterior rearview mirror (which, in many cases, already possesses optical power and delivers to the driver an image, of an object behind the vehicle, that is smaller than the object as it would be seen directly with an naked eye), any additional reduction of the effective area of the mirror surface compromises the visibility and recognition of an image of the object. At it is preferred that both exterior rearview assemblies—on the driver's and passenger's sides—possess substantially similar optical and operational properties, and the continuous need to reduce the cost of the passenger's side exterior rearview assembly remains at odds with the use of an electrochromic element on the passenger's side, achieving an industrially reasonable tradeoff dictates the use of a mirror devoid of an electro-optical element in an exterior rearview assembly on the passenger's side of the vehicle. Accordingly, there remains a need in a single-substrate-based transflective mirror element adapted for use in operational conditions to which an exterior rearview assembly is exposed and, at the same time, characterized by transflective optical properties substantially matching those presented by electrochromic-element based rearview mirrors, without necessarily requiring an opening in a reflective layer, all achieved at a reduced cost.

SUMMARY OF THE INVENTION

Embodiments of the invention provide an exterior automotive rearview assembly having a front. Such exterior automotive rearview assembly contains a mirror element structured for normal operation as part of the exterior automotive rearview assembly, which mirror element includes (i) a first substrate having a first surface corresponding to the front and a second surface substantially tangentially parallel to the first surface; and (ii) a thin-film coating carried on the first surface. The first substrate includes a lite of optically transparent material (such as glass and/or plastic). This first-surface thin-film coating of the embodiment of the invention includes first and second metallic layers and a non-metallic layer disposed therebetween such as to impart, to the first substrate with the thin-film coating thereon, optical performance characterized by reflectance from about 35 percent to about 70 percent and transmittance from about 5 percent to about 20 percent as measured in visible light (that is generated by a standard $D_{65}$ illuminant and that is incident onto the first surface from the front). In one embodiment of the assembly, each of the first and second metallic layers includes a layer of chromium and a non-metallic layer includes a layer of silicon structured to cause said reflectance to be between about 45 percent and about 65 percent and said transmittance to be between about 7.5 percent and about 15 percent. During normal operation, the first substrate is in contact with ambient medium surrounding the assembly.

The non-metallic layer of said thin-film coating includes a semiconductor material layer or a dielectric material layer, while a metallic layer, alternatively or in addition, includes one or more of chromium, molybdenum, nickel, Inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, and alloys thereof. In one specific implementation, the non-metallic layer includes one or more of Si, SiGe, InSb, InP, InGa, InAlAs, InAl, InGaAs, HgTe, Ge, GaSb, AlSb, GaAs and AlGaAs, while in another specific implementation such layer includes a material layer having refractive index greater than 1.9.

In a specific embodiment, the mirror element of the assembly is devoid of an electrochromic (EC) element and may include a composite substrate (i.e. a substrate including two substrates integrated together) or more than one substrate. The thin-film coating includes thin-film layers may be structured to ensure that a color characteristic of above-specified visible light reflected by the mirror element does not exceed 15 units of $*=\sqrt{a^{*2}+b^{*2}}$, where $a*$ and $b*$ are color parameters of the CIELAB color system. In a related embodiment, the color characteristic of the reflected light does not exceed 10 units of $C*$; in another related embodiment—5 units of $C*$; and yet in another embodiment—3 units of $C*$.

In one implementation, the mirror element is configured, alternatively or in addition, to ensure that during normal operation of the assembly a difference between first and second color characteristic values of the mirror element measured in reflection of light generated by the standard $D_{65}$ illuminant does not exceed 5 units of $C*$ (where the first color characteristic value corresponds to light incident onto the mirror element along a normal to the first surface and the second color characteristics value corresponds to light incident onto the first surface at an angle up to about 40 degrees). In a related embodiment, the structure of the mirror element is appropriately chosen to provide for such difference of color characteristics of no more than 2.5 units of $C*$. The first surface may include a non-planar surface.

Embodiments of the invention additionally provide an exterior automotive rearview assembly having a front and containing a single-substrate mirror element structured for normal operation as part of the exterior automotive rearview assembly. Such single-substrate mirror element contains a substrate having (an optionally non-planar) first surface corresponding the front and a second surface substantially parallel to the first surface; and a thin-film coating carried on the first surface, which thin-film coating is exposed to an incident medium and contains including first and second metallic layers and a non-metallic layer disposed therebetween such as to impart, to the single-substrate mirror element, a reflectance value from about 35 percent to about 70 percent, a transmittance value from about 5 percent to about 20 percent, and a change of a color characteristic of less than 0.4 units of $C*$ as a function of angle of incidence of light between zero degrees and about 40 degrees. Reflection, transmission, and color characteristics of an optical element are measured in visible light generated by a standard $D_{65}$ illuminant and directly incident onto the first surface from the incident medium.

In one implementation, such assembly may further include a housing; a heating element; and a light source behind the heating element such that the heating element contains a light-indicia area that is arranged in overlying registry with said light source such as to transmit light from the light source through said light indicia area towards the front.

BRIEF DESCRIPTION OF THE DRAWINGS

The invention will be more fully understood by referring to the following Detailed Description of Specific Embodiments in conjunction with the Drawings, of which:

FIG. 4 is a diagram representing, in side cross-sectional view, an embodiment of vehicular exterior rearview assembly containing an embodiment of the mirror element according to the invention;

FIGS. 12A and 11B are plots showing empirically determined color content and reflectance parameters, respectively, of light incident onto the second surfaces of mirror samples fabricated according to an embodiment of the invention;

DETAILED DESCRIPTION

Figure 1:
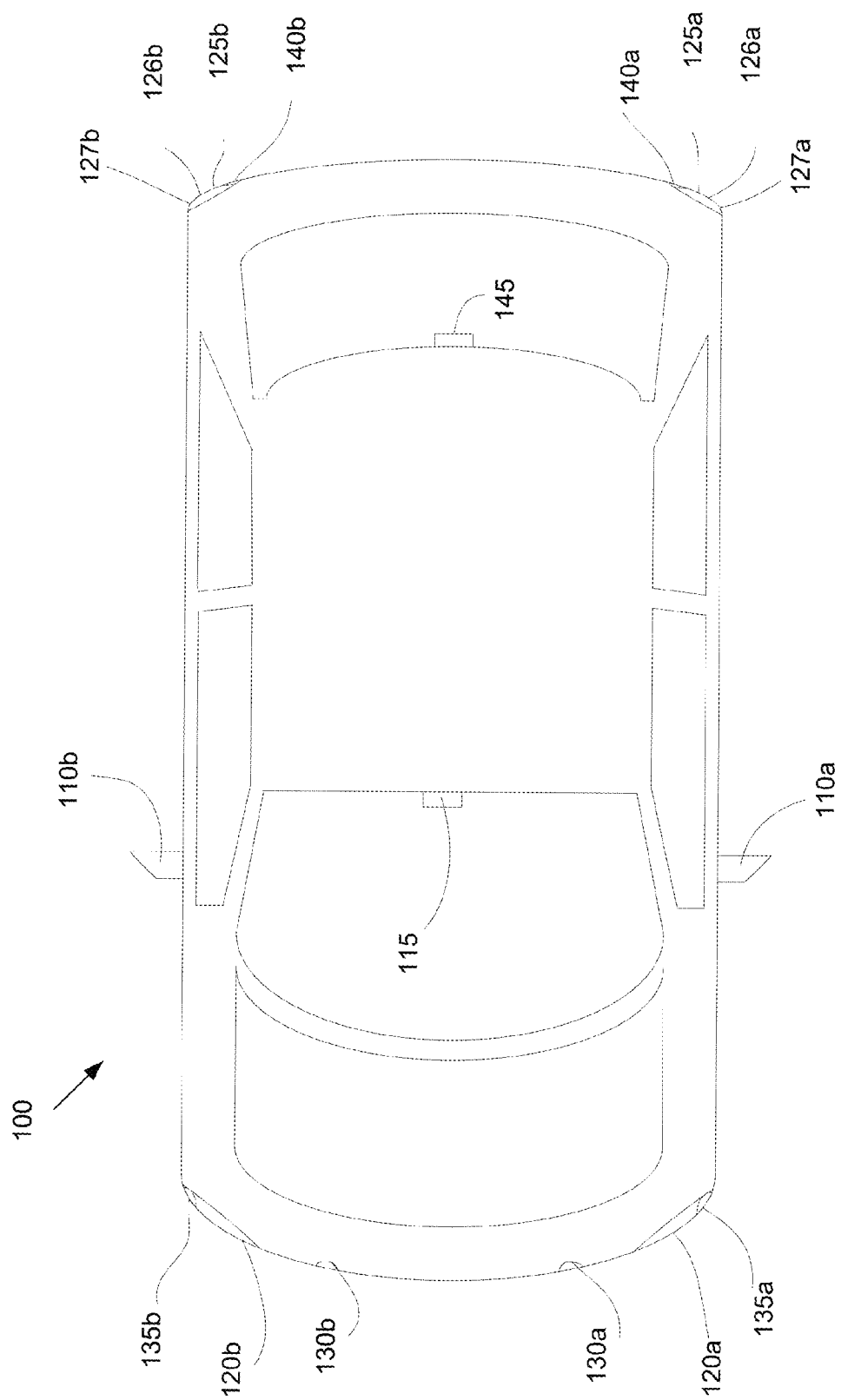
FIG. 1 is a diagram schematically depicting a controlled vehicle.

The spectrum of light reflected (and that of light transmitted) by an embodiment of the mirror system of the invention can be tuned or modified by adjusting the thickness of the reflectance-enhancing layers. The peak reflectance will vary with optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. According to the L*a*b* quantification scheme, L* represents brightness, a* is a color coordinate that denotes the color gamut ranging from red (positive a*) to green (negative a*), and b* is a color coordinate that denotes the color gamut ranging from yellow and blue (positive and negative values of b*, respectively). As used in this application, Y (sometimes also referred to as Cap Y), represents the overall reflectance. For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a value Y from the 1931 CIE Standard since it corresponds more closely to the spectral reflectance than L*. The value of "color magnitude", or C*, also referred to herein as metric chroma, is defined as $C^* = \sqrt{(a^*)^2 + (b^*)^2}$ and provides a measure for quantifying color neutrality. The metric of "color difference", or $\Delta C^*$ is defined as $\Delta C^* = \sqrt{(a^* - a^{*\prime})^2 + (b^* - b^{*\prime})^2}$, where (a*, b*) and (a*', b*') describe color of light obtained in two different measurements. Additional CIELAB metric is defined as $\Delta E^* = (\Delta a^{*2} + \Delta b^{*2} + \Delta L^{*2})^{1/2}$. The color values described herein are based, unless stated otherwise, on the CIE Standard $D_{65}$ illuminant and the 10-degree observer.

An optical element such as a mirror element or system is said to be relatively color neutral in reflected light if the corresponding C* value of the element is generally less than 20. Preferably, however, coatings and other optical component forming an embodiment of the color-neutral mirror element or system of the present invention are structured to ensure that the mirror element or system is characterized by the C* value of less than 15, more preferably of less than about 10, even more preferably of less than about 5, and most preferably of less than about 3.

As broadly used and described herein, the reference to an electrode or layer as being "carried" on a surface of an element refers to both electrodes or layers that are disposed directly on the surface of an element or disposed on another coating, layer or layers that are disposed directly on the surface of the element.

Numbering of Structural Surfaces.

In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed by an observer positioned in front of the assembly is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

The following disclosure describes embodiments of the invention with reference to the corresponding drawings, in which like numbers represent the same or similar elements wherever possible. In the drawings, the depicted structural elements are not to scale and certain components are enlarged relative to the other components for purposes of emphasis and understanding. References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. For example, to simplify a particular drawing of an electro-optical device of the invention not all thin-film coatings (whether electrically conductive, reflective, or absorptive or other functional coatings such as alignment coatings or passivation coatings), electrical interconnections between or among various elements or coating layers, elements of structural support (such as holders, clips, supporting plates, or elements of housing, for example), or auxiliary devices (such as sensors, for example) may be depicted in a single drawing. It is understood, however, that practical implementations of discussed embodiments may contain some or all of these features and, therefore, such coatings, interconnections, structural support elements, or auxiliary devices are implied in a particular drawing, unless stated otherwise, as they may be required for proper operation of the particular embodiment. In the following description, numerous specific details are recited to provide a thorough understanding of embodiments of the invention. One skilled in the relevant art will recognize, however, that the invention may be practiced without one or more of the specific details, or with other methods, components, or materials.

The invention as recited in claims appended to this disclosure is intended to be assessed in light of the disclosure as a whole, including features disclosed in prior art to which reference is made.

The terms "approximately" or "approximate value" or "about" refer to a value that is near or approaching a certain specified value. The approximate value may be equal to the specified value or it may deviate from it within a specified range. A typical range of deviation of the approximate value from the specified value is defined, for example, either explicitly or by fabrication or measurement tolerances that are recognized in a related field of art.

Figure 2:
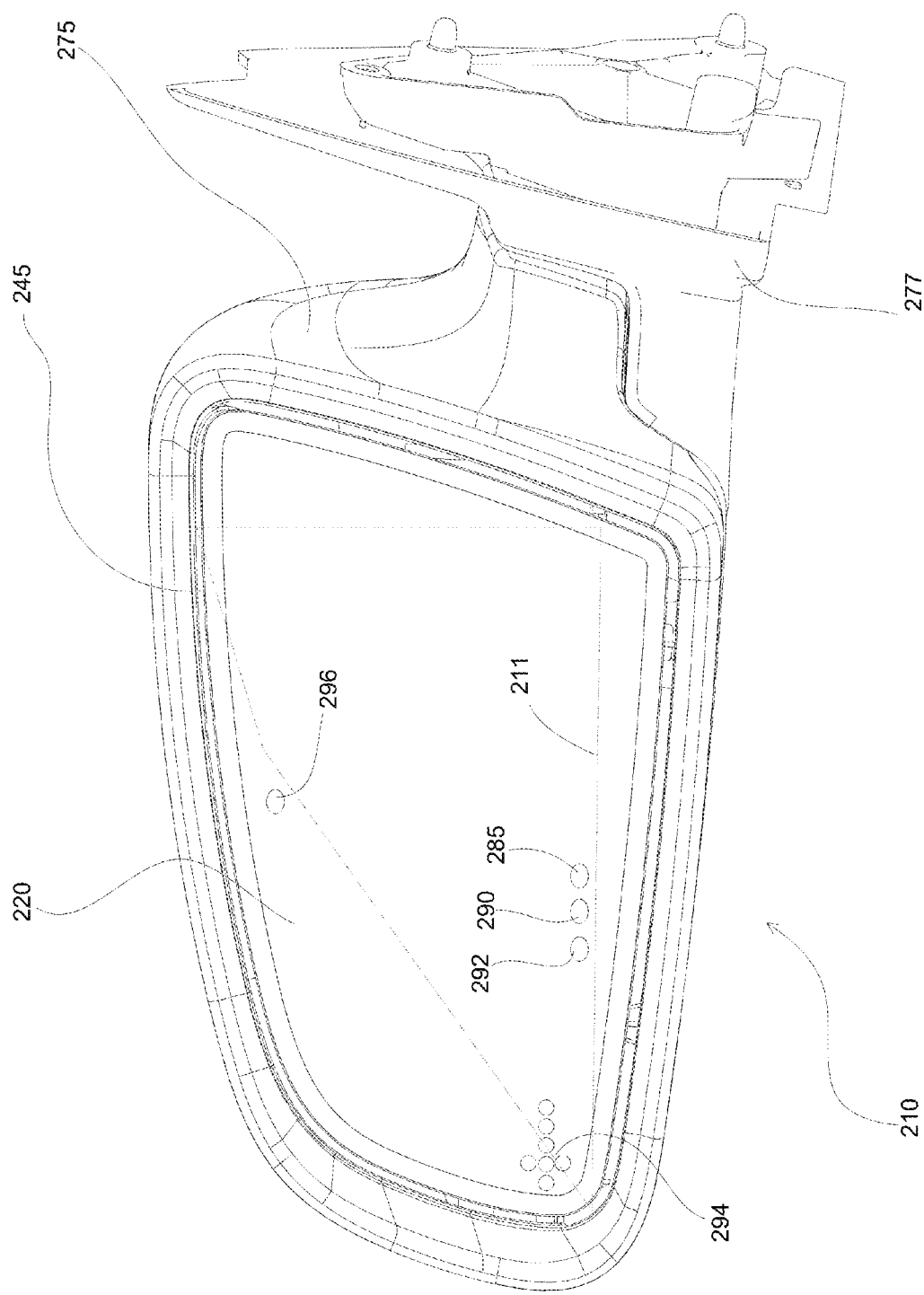
FIG. 2 is a schematic diagram of an exterior rearview mirror assembly.

In reference to FIGS. 1 and 2, an overview of technical subject matter is provided sufficient to build upon when considering embodiments of the present invention. FIG. 1 illustrates, schematically, a controlled vehicle 100 having a driver's side outside (or exterior) rearview mirror 110a, a passenger's side outside (or exterior) rearview mirror 110b and an inside (or interior) rearview mirror 115. The inside rearview mirror 115 is preferably characterized by unit magnification. (A unit magnification mirror, as used herein, refers to a mirror with a plane or flat reflective element producing an image having perceived angular and linear sizes equal to those of the object. A prismatic day-night adjustment rearview mirror which in at least one associated position provides unit magnification is considered to be a unit magnification mirror.) In the United States (as supplied by the automobile manufacturers), a mirror of the passenger-side assembly 110b typically has a spherically bent or convex shape, whereas a mirror of the driver-side assembly 110a and a mirror of the inside assembly 115 are presently required to be flat. In Europe, a mirror of the driver-side assembly 110a is commonly flat or aspheric, whereas a mirror of the passenger-side assembly 110b has a convex shape. In Japan, both outside mirrors typically have a convex shape.

The first and second surfaces of the same substrate may be substantially tangentially parallel to one another, regardless of whether this substrate defines a plane-parallel plate of glass or is a curved substrate. If a wedged substrate is used to form a mirror element, the surfaces of such substrate typically are inclined with respect to one another.

Preferably, each of the passenger's side and the driver's side outside mirrors 110b, 110a is positioned such as to provide the driver a view to the rear along an associated side of the controlled vehicle. The average reflectance of any vehicular mirror, as determined in accordance with SAE Recommended Practice J964, OCT84, is at least 35 percent (and 40 percent for many European Countries) and, if the mirror element is configured to operate at multiple reflectance levels, the minimum reflectance level in the day mode is at least 35 percent (40 percent when mirror is fabricated according to European standards) and the minimum reflectance level in the night mode is at least 4 percent. (Some of the automotive specification require the reflectance levels to be above about 42 percent, and more commonly above about 50 percent. The upper end reflectance values, while not necessarily defined, are sometimes specified at about 65 percent.) With further reference to FIG. 1, the controlled vehicle 100 may be equipped with a variety of exterior lights such as, for example, headlight assemblies 120a, 120b; foul condition lights 130a, 130b; front turn-signal indicators 135a, 135b; taillight assembly 125a, 125b; rear turn signal indicators 126a, 126b; rear emergency flashers 127a, 127b; backup lights 140a, 140b and center high-mounted stop light (CHMSL) 145.

Turning now to FIG. 2, a typical exterior rearview mirror assembly 210 on the driver's side is depicted that contains an electro-optical (EO) element and used in association with the driver's exterior mirror 110a of FIG. 1. The mirror system of the assembly 210 is usually engaged with a housing 275 which may include a swivel portion (not shown) adapted to facilitate angular repositioning of the mirror system within the assembly 210. Auxiliary devices such as, for example, a blind spot indicator 285, a keyhole illuminator 290, a puddle light 292, a turn signal 294, and a photo sensor 296 or even a display (not shown), to name just a few, may be incorporated within the rearview mirror assembly 210 behind the mirror system with respect to the viewer. Usually, the devices 285, 290, 292, 294, 296 are configured in combination with the mirror system to be at least partially covert and visible only when activated. As part of the EO-element, a mirror system of such assembly 210 often includes a spectral filter material 245 located near the periphery of the EO-element and configured to conceal various electrical connections of the EO-element from view. Generally, this optical thin-film spectral filter material 245 is circumferentially disposed in a peripheral area, next to a corresponding perimeter-defining edge, of either of the first and the second surface of the system, is configured as a ring, and is sometimes referred to as a peripheral ring. The mirror system employing the EO-element is also often configured as a multi-zone transflective mirror system including a substantially optically opaque area and a transflective area defined by complex structural and material combinations of optical thin-film layers disposed across a reflective surface of the mirror system such as to enable a generally transflective operational behavior of the mirror system. In particular, a multi-zone transflective rearview mirror assembly may be structured to facilitate an operation of the mirror system of the assembly in at least a dual-mode regime. In the first mode (a pure mirror mode), a source of light (such as, for example, any of the devices 285, 290, 292, and 294) is covert and not observable by the user from the front of the assembly and substantially all of the visible to the user area of the mirror system operates as a reflector. In a transflective mode, such source of light is activated to transmit light through the transflective area to define visually-perceivable optical indicia representing an operation of a particular auxiliary device associated with the assembly, while the remaining area of the mirror system continues to operate as a reflector.

Similarly to the exterior assembly on the driver's side of the vehicle, in further reference to FIG. 1, the assembly on the passenger side of the vehicle generally also includes a source of light adapted to transmit light through the mirror system of the assembly towards the user. The housing and general appearance of the passenger's side exterior mirror assembly are substantially similar to those of the assembly at the driver's side. Therefore, as would be appreciated by a skilled artisan, in operation it is preferred that mirror systems of both exterior rearview assemblies 110a, 110b of FIG. 1 possess substantially similar optical properties (such as, for example, spatial and spectral distribution of reflection and transmission characteristics across working surfaces of the mirror systems). In other words, a mirror system of the passenger side exterior rearview assembly should possess transflective optical characteristics similar to those of the mirror system employed at the driver's side of the vehicle. Accordingly, a designer and a manufacturer of the passenger side mirror assembly 110b have a choice of whether to structure the passenger side mirror assembly to include an EO-element defining a multi-zone mirror system or to employ a simpler single-substrate based mirror such as a dichroic mirror or another mirror having a single-material coating, for example, as well a light source behind the mirror that generates light at a specific wavelength chosen in coordination with optical properties of such simple version of the mirror.

Mirror Elements for Automotive Rearview Assembly.

When manufactures of passenger side's external rearview assembly chose to employ a cheaper dichroic version of the transflective reflector in such assembly, a typical light source of choice may include red LED(s) (or an LED at another operating wavelength). A dichroic mirror usually includes a dichroic reflective coating provided on the rear surface (the second surface, with respect to the front of the assembly) of the single glass plate that transmits the red light generated by the LEDs as well as infrared radiation while reflecting all light and radiation having shorter wavelengths. By utilizing a dichroic mirror, the mirror assembly hides the LEDs when not in use to provide the general appearance of a typical rearview mirror, and allows the red or amber light from such LEDs to pass through the dichroic mirror and be visible to drivers of vehicles behind and to the passenger side of the vehicle.

More generally, an automotive mirror reflector defined by a dielectric coating on a substrate (such as, for example, a quarter-wave coating stack of the HLH-type), while achieving the required by industrial standards levels of reflectance remain too transmissive and require additional opacifying coatings to conceal the content of the assembly located behind the mirror element from being observed from the front. For example, with substantially negligible absorption in a HLH-type dielectric coating (comprised of, for example, $TiO_2$ or SiN or $SnO_2$ for high-index material and $SiO_2$ for a low index material), a typical 55 percent reflector would possess transmittance of about 40 percent to about 45 percent or so.

Figure 3A:
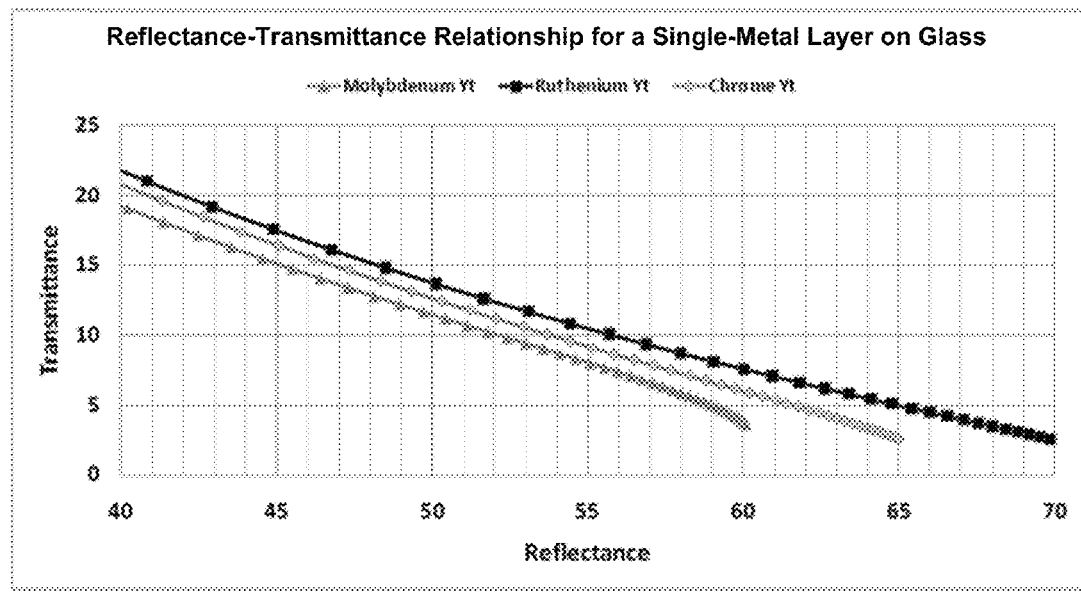
FIGS. 3A and 3B provide plots illustrating interdependence between reflectance and transmittance values of a reflector defined by a single-metal layer on a glass substrate.

The use of single-metal coatings to define an automotive mirror reflector also presents certain operational shortcomings. For example, a coating containing silver is known to be mechanically soft and, for that reason, susceptible to scratches and be generally not durable. The silver-containing coatings are subject to oxidization and/or other types of corrosion and usually survive only when protected from direct interaction with the ambient medium and the user. At least for that reason, a single-layer silver-containing coating deposited on a single-substrate mirror element for use in an exterior automotive assembly is simply not practical. In addition, as addressed in related art, vehicular mirrors with such coatings, when configured to exhibit reflectance values of about 55 percent as required in automotive industry, typically simultaneously demonstrate transmittance values of not significantly lower than 35 percent. Such mirrors end up being simply too transmissive, for practical purposes, to conceal the contents of the assembly disposed behind the mirror from being observed from the front of the assembly. A coating based on a single layer of chromium, molybdenum, ruthenium or other hard metals, on the other hand, possesses substantial durability but, when deposited with a thickness dictated by the required levels of mirror reflectance, has a too low transmittance value. FIG. 3A demonstrate plots showing the relationship between the values of reflectance, R, of a single lite of glass with a layer of one of such metals (Cr, Mo, Ru) disposed thereon and the values of corresponding transmittance, T.

Figure 3B:
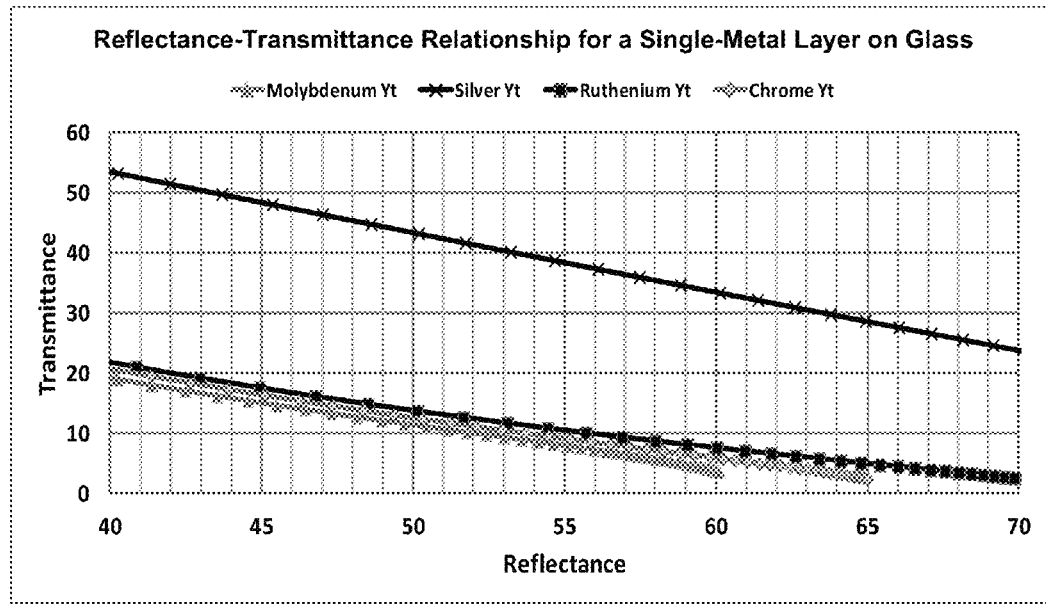

FIG. 3B repeats the plots of FIG. 3A adding a corresponding plot for a singe layer of Ag (and other metals) on glass.

Generally, a single-metal single layer coating does not allow for independent control for reflectance and transmittance values, R and T, of the resulting reflector—at least because the R and T values for such reflector are related to each other through the value of absorbance A of the coating, R+T+A=1. As seen from FIGS. 3A and 3B the combinations of R and T values desired by the automotive industry (such as, for example, R of about 55% and T of about 15%, or R of about 45% and T less than 15%) are not easily achievable with a single-metal layer on a glass substrate. Consequently, to make use of such mirror in an rearview assembly, light sources (such as LEDs) of the assembly must have sufficiently high optical power to form bright indicia in transmission through the chromium coating, which leads to high consumption of electrical power and complexity of associated electronic circuitry governing the operation of the light sources. All in all, the sufficiently satisfying use of single-metal coatings in exterior vehicular assemblies has not been demonstrated yet.

Figure 3C:
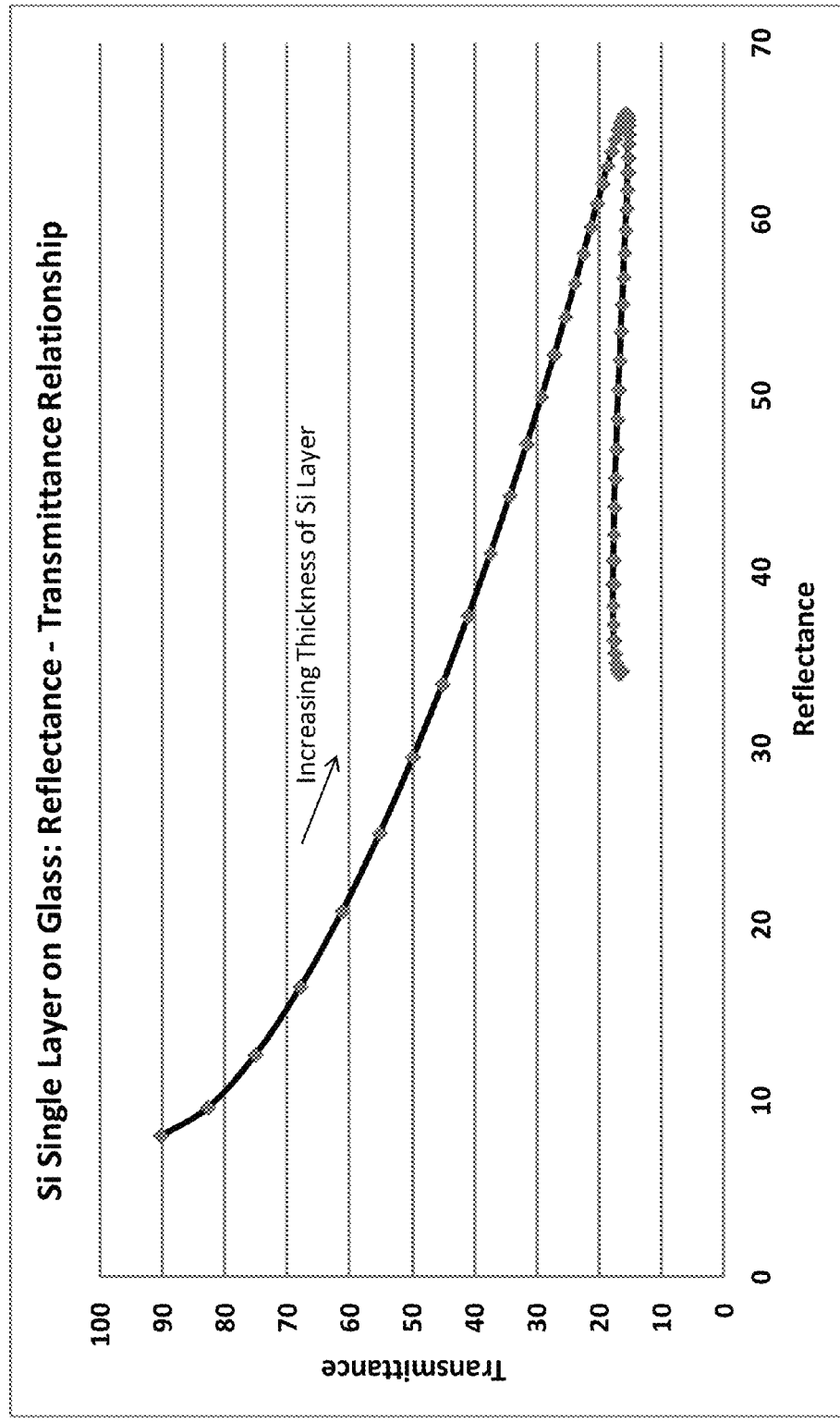
FIG. 3C is a plot illustrating interdependence between reflectance and transmittance values of a reflector defined by a single Si layer on a glass substrate.
Figure 3D:
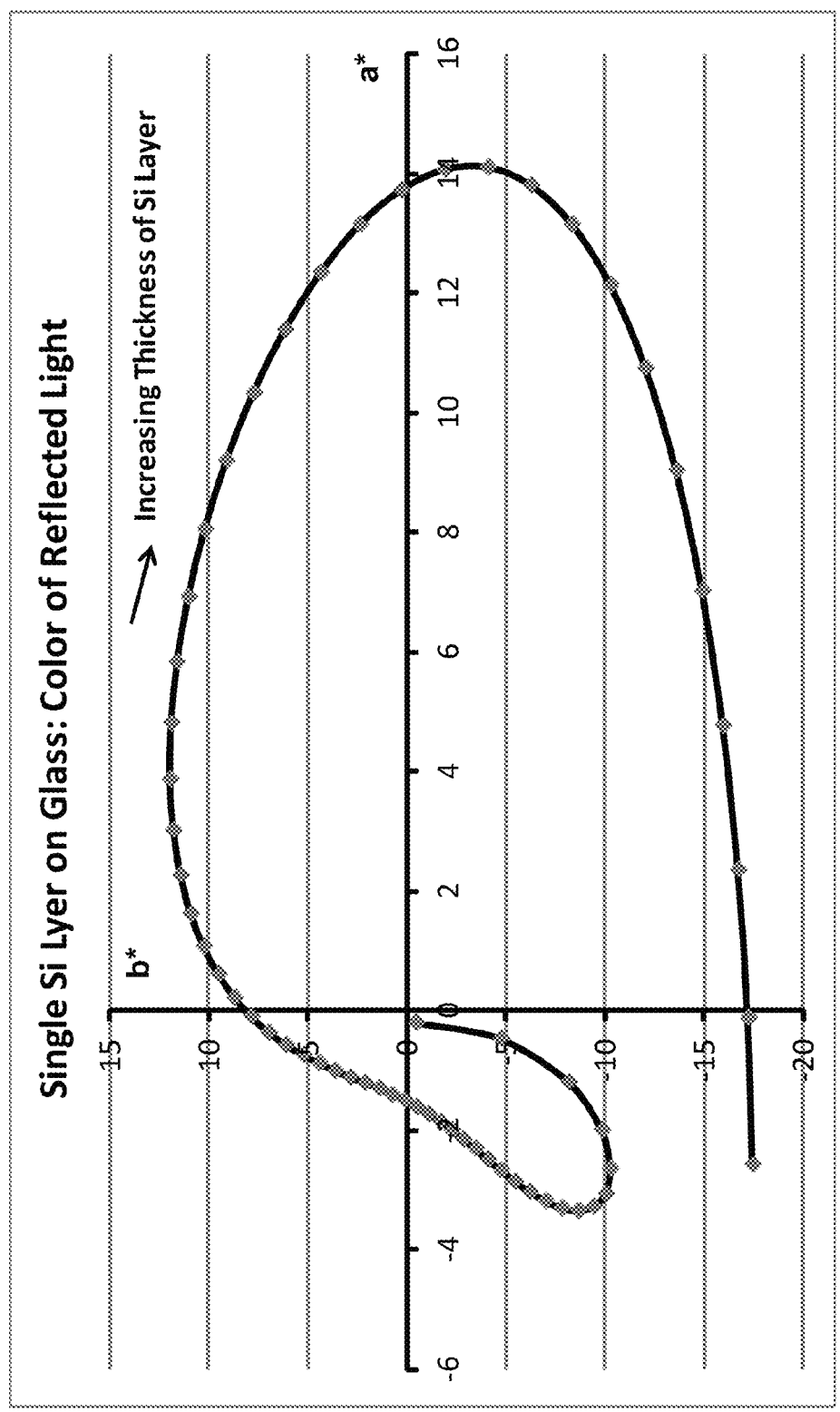
FIG. 3D is a plot in CIELAB coordinates illustrating color content of light generated by a standard $D_{65}$ illuminant and reflected off of the reflector defined by a single Si layer on a glass substrate.

Similarly, a single-material semiconductor layer based automotive mirror reflector, while characterized by reasonably satisfying reflectance values as far as automotive industry needs are concerned, results in too high transmittance values and no degree of freedom of design to independently adjust the R and T values. As an example, FIG. 3C illustrates the R-T relationship for a single Si layer on a glass substrate, while Table 1 summarizes different optical characteristics of such a reflector. The plot of color excursion (which refers to the change in color content of light that has interacted with the coating as a function of coating thickness), observed in reflection of light generated by a standard $D_{65}$ illuminant off of such reflector, is shown in FIG. 3D. Based on the data of FIG. 3D, a skilled artisan will readily appreciate that an automotive reflector defined by a layer of Si does not appear color-neutral but, instead, has a brownish-goldish tint in reflection, which does not meet industry aesthetic standards. FIG. 3D additionally suggests that attaining suitable color content in light reflected with the reflector defined by a single Si layer on glass at any desired transmittance and/or reflectance level is substantially impractical.

TABLE 1

Single Si layer on glass, incident medium: air.
Gradient Non-EC transflective

| Exp | Si_Thickness (nm) | B | C | D | E | Reflectance | | | | | Transmittance | | | | A |
|---|---|---|---|---|---|---|---|---|---|---|---|---|---|---|---|
| | | | | | | Yr | L* | a* | b* | C* | Yt | L* | a* | b* | |
| 1 | 0 | 0 | 0 | 0 | 0 | 7.96 | 33.9 | −0.21 | −0.45 | 0.5 | 90.35 | 96.14 | −0.37 | 0.42 | 1.69 |
| 2 | 1 | 0 | 0 | 0 | 0 | 9.56 | 37.03 | −0.48 | −4.72 | 4.7 | 82.8 | 92.93 | 0.03 | 6.5 | 7.64 |
| 3 | 2 | 0 | 0 | 0 | 0 | 12.54 | 42.06 | −1.2 | −8.16 | 8.2 | 75.22 | 89.5 | 0.88 | 11.32 | 12.23 |
| 4 | 3 | 0 | 0 | 0 | 0 | 16.39 | 47.48 | −2.01 | −9.83 | 10.0 | 67.99 | 86 | 1.92 | 14.98 | 15.62 |
| 5 | 4 | 0 | 0 | 0 | 0 | 20.67 | 52.59 | −2.65 | −10.27 | 10.6 | 61.31 | 82.55 | 2.97 | 17.65 | 18.02 |
| 6 | 5 | 0 | 0 | 0 | 0 | 25.08 | 57.15 | −3.07 | −10.02 | 10.5 | 55.29 | 79.21 | 3.93 | 19.52 | 19.63 |
| 7 | 6 | 0 | 0 | 0 | 0 | 29.42 | 61.15 | −3.29 | −9.41 | 10.0 | 49.93 | 76.03 | 4.75 | 20.78 | 20.65 |
| 8 | 7 | 0 | 0 | 0 | 0 | 33.55 | 64.61 | −3.35 | −8.64 | 9.3 | 45.22 | 73.04 | 5.42 | 21.57 | 21.22 |
| 9 | 8 | 0 | 0 | 0 | 0 | 37.42 | 67.59 | −3.31 | −7.81 | 8.5 | 41.11 | 70.25 | 5.94 | 22 | 21.48 |
| 10 | 9 | 0 | 0 | 0 | 0 | 40.98 | 70.16 | −3.19 | −6.99 | 7.7 | 37.52 | 67.66 | 6.32 | 22.17 | 21.5 |
| 11 | 10 | 0 | 0 | 0 | 0 | 44.24 | 72.39 | −3.04 | −6.2 | 6.9 | 34.4 | 65.28 | 6.58 | 22.14 | 21.36 |
| 12 | 11 | 0 | 0 | 0 | 0 | 47.19 | 74.31 | −2.86 | −5.45 | 6.2 | 31.69 | 63.09 | 6.75 | 21.98 | 21.12 |
| 13 | 12 | 0 | 0 | 0 | 0 | 49.85 | 75.98 | −2.68 | −4.75 | 5.5 | 29.34 | 61.08 | 6.83 | 21.72 | 20.81 |
| 14 | 13 | 0 | 0 | 0 | 0 | 52.24 | 77.43 | −2.5 | −4.08 | 4.8 | 27.29 | 59.24 | 6.84 | 21.39 | 20.47 |
| 15 | 14 | 0 | 0 | 0 | 0 | 54.38 | 78.68 | −2.32 | −3.45 | 4.2 | 25.51 | 57.57 | 6.79 | 21.02 | 20.11 |
| 16 | 15 | 0 | 0 | 0 | 0 | 56.29 | 79.78 | −2.16 | −2.84 | 3.6 | 23.96 | 56.05 | 6.69 | 20.62 | 19.75 |
| 17 | 16 | 0 | 0 | 0 | 0 | 57.99 | 80.73 | −2.01 | −2.25 | 3.0 | 22.61 | 54.67 | 6.56 | 20.21 | 19.4 |
| 18 | 17 | 0 | 0 | 0 | 0 | 59.49 | 81.56 | −1.87 | −1.66 | 2.5 | 21.43 | 53.42 | 6.39 | 19.8 | 19.08 |
| 19 | 18 | 0 | 0 | 0 | 0 | 60.8 | 82.27 | −1.74 | −1.07 | 2.0 | 20.41 | 52.3 | 6.19 | 19.4 | 18.79 |
| 20 | 19 | 0 | 0 | 0 | 0 | 61.95 | 82.89 | −1.62 | −0.48 | 1.7 | 19.52 | 51.29 | 5.97 | 19.02 | 18.53 |
| 21 | 20 | 0 | 0 | 0 | 0 | 62.93 | 83.41 | −1.51 | 0.14 | 1.5 | 18.75 | 50.4 | 5.73 | 18.67 | 18.32 |
| 22 | 21 | 0 | 0 | 0 | 0 | 63.77 | 83.84 | −1.41 | 0.77 | 1.6 | 18.09 | 49.6 | 5.46 | 18.35 | 18.15 |
| 23 | 22 | 0 | 0 | 0 | 0 | 64.45 | 84.2 | −1.31 | 1.43 | 1.9 | 17.52 | 48.9 | 5.18 | 18.07 | 18.03 |
| 24 | 23 | 0 | 0 | 0 | 0 | 65.01 | 84.49 | −1.22 | 2.13 | 2.5 | 17.03 | 48.29 | 4.88 | 17.84 | 17.97 |
| 25 | 24 | 0 | 0 | 0 | 0 | 65.42 | 84.7 | −1.12 | 2.86 | 3.1 | 16.62 | 47.77 | 4.56 | 17.66 | 17.96 |
| 26 | 25 | 0 | 0 | 0 | 0 | 65.71 | 84.85 | −1.01 | 3.63 | 3.8 | 16.27 | 47.33 | 4.23 | 17.54 | 18.02 |
| 27 | 26 | 0 | 0 | 0 | 0 | 65.87 | 84.93 | −0.89 | 4.43 | 4.5 | 15.99 | 46.96 | 3.88 | 17.5 | 18.14 |
| 28 | 27 | 0 | 0 | 0 | 0 | 65.9 | 84.94 | −0.75 | 5.26 | 5.3 | 15.77 | 46.67 | 3.52 | 17.53 | 18.34 |
| 29 | 28 | 0 | 0 | 0 | 0 | 65.8 | 84.89 | −0.58 | 6.12 | 6.1 | 15.59 | 46.44 | 3.14 | 17.65 | 18.61 |
| 30 | 29 | 0 | 0 | 0 | 0 | 65.58 | 84.78 | −0.37 | 6.99 | 7.0 | 15.47 | 46.27 | 2.76 | 17.86 | 18.95 |
| 31 | 30 | 0 | 0 | 0 | 0 | 65.23 | 84.6 | −0.11 | 7.87 | 7.9 | 15.39 | 46.17 | 2.37 | 18.17 | 19.38 |
| 32 | 31 | 0 | 0 | 0 | 0 | 64.76 | 84.36 | 0.21 | 8.72 | 8.7 | 15.36 | 46.12 | 1.97 | 18.59 | 19.89 |
| 33 | 32 | 0 | 0 | 0 | 0 | 64.16 | 84.05 | 0.6 | 9.53 | 9.5 | 15.36 | 46.12 | 1.58 | 19.12 | 20.49 |
| 34 | 33 | 0 | 0 | 0 | 0 | 63.43 | 83.67 | 1.06 | 10.28 | 10.3 | 15.39 | 46.17 | 1.2 | 19.77 | 21.18 |
| 35 | 34 | 0 | 0 | 0 | 0 | 62.58 | 83.22 | 1.61 | 10.93 | 11.0 | 15.46 | 46.26 | 0.83 | 20.54 | 21.96 |
| 36 | 35 | 0 | 0 | 0 | 0 | 61.61 | 82.71 | 2.26 | 11.45 | 11.7 | 15.56 | 46.39 | 0.49 | 21.42 | 22.83 |
| 37 | 36 | 0 | 0 | 0 | 0 | 60.52 | 82.12 | 3.01 | 11.81 | 12.2 | 15.68 | 46.55 | 0.19 | 22.42 | 23.8 |
| 38 | 37 | 0 | 0 | 0 | 0 | 59.32 | 81.47 | 3.86 | 11.98 | 12.6 | 15.83 | 46.75 | −0.05 | 23.54 | 24.85 |
| 39 | 38 | 0 | 0 | 0 | 0 | 58.01 | 80.74 | 4.8 | 11.92 | 12.9 | 15.99 | 46.97 | −0.24 | 24.75 | 26 |
| 40 | 39 | 0 | 0 | 0 | 0 | 56.6 | 79.96 | 5.82 | 11.62 | 13.0 | 16.17 | 47.2 | −0.35 | 26.07 | 27.22 |
| 41 | 40 | 0 | 0 | 0 | 0 | 55.11 | 79.11 | 6.91 | 11.06 | 13.0 | 16.36 | 47.45 | −0.37 | 27.47 | 28.52 |
| 42 | 41 | 0 | 0 | 0 | 0 | 53.55 | 78.2 | 8.04 | 10.23 | 13.0 | 16.56 | 47.7 | −0.28 | 28.94 | 29.89 |
| 43 | 42 | 0 | 0 | 0 | 0 | 51.92 | 77.23 | 9.19 | 9.13 | 13.0 | 16.76 | 47.96 | −0.09 | 30.47 | 31.32 |
| 44 | 43 | 0 | 0 | 0 | 0 | 50.26 | 76.23 | 10.32 | 7.77 | 12.9 | 16.96 | 48.21 | 0.23 | 32.04 | 32.79 |
| 45 | 44 | 0 | 0 | 0 | 0 | 48.57 | 75.18 | 11.38 | 6.17 | 12.9 | 17.15 | 48.45 | 0.68 | 33.62 | 34.28 |
| 46 | 45 | 0 | 0 | 0 | 0 | 46.88 | 74.11 | 12.33 | 4.36 | 13.1 | 17.32 | 48.67 | 1.25 | 35.21 | 35.79 |

TABLE 1-continued

Single Si layer on glass, incident medium: air.
Gradient Non-EC transflective

| | Si_Thickness | | | | | Reflectance | | | | | Transmittance | | | | |
|---|---|---|---|---|---|---|---|---|---|---|---|---|---|---|---|
| Exp | (nm) | B | C | D | E | Yr | L* | a* | b* | C* | Yt | L* | a* | b* | A |
| 47 | 46 | 0 | 0 | 0 | 0 | 45.22 | 73.03 | 13.13 | 2.39 | 13.3 | 17.48 | 48.86 | 1.96 | 36.78 | 37.3 |
| 48 | 47 | 0 | 0 | 0 | 0 | 43.6 | 71.96 | 13.71 | 0.29 | 13.7 | 17.62 | 49.03 | 2.8 | 38.32 | 38.79 |
| 49 | 48 | 0 | 0 | 0 | 0 | 42.04 | 70.9 | 14.05 | −1.89 | 14.2 | 17.73 | 49.16 | 3.76 | 39.8 | 40.23 |
| 50 | 49 | 0 | 0 | 0 | 0 | 40.58 | 69.88 | 14.09 | −4.08 | 14.7 | 17.8 | 49.25 | 4.83 | 41.22 | 41.62 |
| 51 | 50 | 0 | 0 | 0 | 0 | 39.23 | 68.92 | 13.79 | −6.24 | 15.1 | 17.84 | 49.3 | 5.99 | 42.55 | 42.93 |
| 52 | 51 | 0 | 0 | 0 | 0 | 38.01 | 68.03 | 13.14 | −8.32 | 15.6 | 17.84 | 49.31 | 7.24 | 43.79 | 44.14 |
| 53 | 52 | 0 | 0 | 0 | 0 | 36.94 | 67.24 | 12.12 | −10.27 | 15.9 | 17.8 | 49.26 | 8.56 | 44.92 | 45.25 |
| 54 | 53 | 0 | 0 | 0 | 0 | 36.04 | 66.55 | 10.74 | −12.04 | 16.1 | 17.72 | 49.15 | 9.92 | 45.94 | 46.25 |
| 55 | 54 | 0 | 0 | 0 | 0 | 35.3 | 65.98 | 9.02 | −13.59 | 16.3 | 17.59 | 49 | 11.29 | 46.83 | 47.11 |
| 56 | 55 | 0 | 0 | 0 | 0 | 34.74 | 65.55 | 7.01 | −14.9 | 16.5 | 17.42 | 48.79 | 12.67 | 47.6 | 47.84 |
| 57 | 56 | 0 | 0 | 0 | 0 | 34.37 | 65.25 | 4.76 | −15.95 | 16.6 | 17.21 | 48.52 | 14.03 | 48.25 | 48.43 |
| 58 | 57 | 0 | 0 | 0 | 0 | 34.17 | 65.1 | 2.35 | −16.72 | 16.9 | 16.95 | 48.2 | 15.35 | 48.76 | 48.88 |
| 59 | 58 | 0 | 0 | 0 | 0 | 34.15 | 65.08 | −0.13 | −17.22 | 17.2 | 16.66 | 47.83 | 16.6 | 49.15 | 49.19 |
| 60 | 59 | 0 | 0 | 0 | 0 | 34.29 | 65.19 | −2.59 | −17.44 | 17.6 | 16.33 | 47.4 | 17.77 | 49.41 | 49.38 |

A closely related question is posed by a need to define proper surface on which a thin-film coating, forming a reflector on a single-substrate mirror element for use exterior automotive assembly, should be deposited. Indeed, a material for the coating on the first surface (which faces the ambient medium) has to be sufficiently durable and, at the same time, allow for modifications in thickness to accommodate difference reflectance requirements imposed by different customers (as discussed above) while maintaining a sufficiently low transmission value to conceal the contents of the assembly behind the mirror element.

The disposition of the reflecting coating on the second surface of a single-substrate mirror element faces a different problem. In a typical external rearview assembly, a single-substrate mirror element is supported by a carrier that is affixed to the mirror element through a layer of adhesive material and/or an appliqué layer (and, optionally, through a structural layer that includes a heating element). In practice, such adhesive/appliqué layer adheres to the mirror element imperfectly: there may be defects, for examples, such as bubbles or pockets of air in some areas whether the adhesive layer is detached from the substrate, or simply areas of different degree of adhesion between the substrate and the adhesive layer. Moreover, in order to confine light from a light source at the back of the assembly upon its propagation through the mirror element towards the user and to form visually-perceivable indicia such as, for example, the turn signal 294 of FIG. 2, an appropriately formatted substantially opaque appliqué layer is often used as a backup layer against the second surface of the substrate of the mirror element. In particular, the appliqué layer is often structured to contain appropriately shaped apertures and opening therethrough, which apertures and opening define the general shape of the indicia. (For comparison only, the turning signal 294 of FIG. 2 is shown to include an array of circular apertures forming, aggregately, a shape of an arrow.) Accordingly, light incident onto the first surface of the mirror element and traversing the substrate and the thin-film reflecting coating on the second surface will experience different exiting media and different refractive index differentials: across the openings in the appliqué the thin-film coating is backed up by air, while under the appliqué the coating is backed by the appliqué itself. In optical terms, this non-uniformity of adjoining medium results in reflectance values that differ across the surface of the mirror element, as measured from the front of the assembly. While the differences in reflectance values may be practically objectionable even if the affected area is small, the bigger the aggregate area occupied by such apertures/openings in relation to the overall visible area of the mirror element, the more pronounced the non-uniform distribution of reflectance may become, potentially resulting in a substantially dissatisfying visual appearance and rejection of the mirror element. (A degree to which such non-uniformities in reflectance are perceived from the front of the mirror depends, in part, on the value of required reflectance of the mirror and, in part, on the thickness of the reflecting thin-film coating or optical design of a multi-layer stack on the second surface. The use of thick reflecting coatings on the second surface, while helping to reduce the visibility of the above-discussed defects, understandably leads to increased cost of manufacture of the mirror element.)

In accordance with examples of embodiments, a single-substrate transflective mirror element is described that possesses operational characteristics (such as, for example, a resistance to salt and wide range of temperatures, low corrosion, to name just a few) making it employable in an exterior automotive rearview assembly. The substrate may be substantially flat or have a curved region such as a convex or an aspheric region, for example. Embodiments of the invention also describe a rearview assembly employing such a mirror element. The mirror element at issue includes a multilayer transflective coating disposed on the first surface of the substrate and having substantially uniform optical characteristics across a clear aperture of the mirror element that can be tuned in response to customer-set requirements and irradiance levels of light source(s) at the back of the assembly.

FIG. 4 represents schematically, in side view, an implementation 400 of the rearview assembly of the invention, which includes a mirror element 408 formed, at least in part, by a single substrate (such as a lite of glass or optically transparent plastic) 410 on the first surface 410a of which an embodiment 412 of the thin-film coating is disposed, as discussed below. The mirror element is juxtaposed with a housing structure 416 that defines an inner volume 416a (at least partially filled with the mirror element 408) and an aperture at the front limited by a rim 416b of the housing structure 416. In association with the assembly 400 there may be used at least one of auxiliary devices such as, for example, a heating element, a source of light, an illumination assembly, a power supply, a global positioning system, an exterior light control, a moisture sensor, an information display, a light sensor, a blind spot indicator, a turning signal indicator, an approach warning, a compass, a temperature indicator, a voice actuated device, a dimming circuitry, a telecommunication system, a navigation aid, a lane departure warning system, an adaptive cruise control, a vision system, a rear vision system and a tunnel detection system. Such one or more auxiliary devices may be disposed within the inner volume 416 and/or outside the inner volume in operable communication with the mirror element 408. The source of light may include an element such as a light bulb, an LED, or even a display.

The mirror element 408 is supported within this aperture by a carrier 420, to which it is affixed via an appropriately chosen adhesive layer 424. The carrier 420 is mechanically cooperated with the housing 416 in one of the fashions employed in the art such as, for example, tight-fitting or snap-features. At the back of the assembly 400 and in the inner volume 416a at least one source of light 428 may be disposed, the operation of which is governed by a processor and electronic circuitry (not shown). An optional heating element 430 may be placed in coordination with the second surface 410b of the substrate 410 such as to maintain the mirror element 408 at a required temperature. To ensure that light from the light source(s) 428 is transmitted through the mirror element 408 such as to form spatially-defined visually-perceivable indicia representing, to the user 434 at the front the assembly 400, the operation of at least one auxiliary device, an appropriately dimensioned and shaped substantially optically opaque layer of applique 438 may be placed adjoining the second surface 410b. Preferably, the carrier 420, the adhesive layer 424, the heater 430 and the appliqué 438 have spatially coordinated through openings arranged to establish light passage(s) 440 from the light source(s) 428 towards the user 434. Disclosure of various embodiments of rearview assemblies with turn signals, heaters, and blind spot structures have been presented, for example, in U.S. Pat. No. 7,334,922 and U.S. Pat. No. 7,427,150. Disclosure of each of these patents in incorporated herein by reference in its entirety.

According to an embodiment of the invention, the thin-film coating 412 includes a multi-layer structure containing first and second metallic layers and a non-metallic layer disposed between the first and second metallic layers such that the substrate 410 with the coating 412 carried thereon is characterized (i) on one hand, by reflectance values that satisfy the reflectance requirements imposed by automotive industry, such as between about 35 percent and about 70 percent, as discussed above, and (ii) on the other hand, by transmittance values of about 20 percent or less, more preferably 15 percent or less, and most preferably less than about 10 percent. This multilayer structure is referred to herein as an MIM coating, for short. The thin-film coating 412 may also include, in some embodiments, additional layers adjoining the MIM coating such as, for example, adhesion promotion, hydrophobic and/or hydrophilic layers. Moreover, and in addition to the above-mentioned reflectance and transmittance requirements, a specific embodiment of the thin-film coating 412 is adapted to ensure that light reflected from the coating is color neutral as defined in terms of CIELAB based figures of merits discussed above. Optical characteristics of embodiments of the MIM coatings disposed on a substrate are measured in light generated by a CIE Standard $D_{65}$ Illuminant for a 10-degree observer, in accordance with the CIELAB system recognized in the art.

According to an embodiment of the invention, the optical and geometrical properties of the first metallic layer is primarily responsible for the resulting transmittance value of the mirror element. Accordingly, variations in the thickness of the first metallic layer predominantly control variations of the transmittance value of the resulting mirror element. The optical and geometrical properties of the intermediate non-metallic layer primarily define the reflectance characteristics of the resulting mirror element. The variations of the thickness of the second metallic layer can be employed to fine-tune the resulting reflectance value. While the above description offers a rough generalization of the effect that the layers of the MIM coating produce on optical performance of the MIM coating, a person skilled in the art will readily understand that, in order to achieve specified optical performance, the system as a whole has to be optimized.

Generally, an M-layer of the MIM coating includes one or more of chromium, molybdenum, nickel, Inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, and alloys and/or mixtures of these materials.

In one embodiment, an I-layer of the MIM coating includes a semiconductor, while in another embodiment the I-layer includes an insulator and/or dielectric. The semiconductor layer of the MIM structure facilitates enhancement of the reflectance of the mirror element while introducing less absorption as compared to a metallic material. When a low band-gap semiconductor material is used in the MIM structure of the mirror element of the invention, an appreciable amount of absorption in the blue-to-green portion of the visible spectral range is introduced, thereby resulting in the MIM coating with sufficiently high transmittance bias between different wavelengths due to non-uniform spectral dependence of transmittance characteristic of such semiconductor material. As a result, color of light transmitted through such MIM coating has a high metric chroma, or C* value. The reference to "high transmission bias" of light transmitted through the mirror element is, therefore, made when the highest values of transmittance (with spectrum extending over predefined span of visible and/or near infrared spectrum) through the mirror element are greater than about 1.5 times the lowest transmittance values observed in such transmission. More preferably the transmittance corresponding to a highly transmitting region of light's spectrum (first spectral region) is greater than 2 times the transmittance corresponding to the low transmitting region (second spectral region), and most preferably greater than 4 times the transmittance in the low transmitting region. First and second spectral regions are generally chosen, within the extent of spectrum of incident light, based on particular application. Practical examples of an embodiment of the invention defining sufficient metric chroma of the transmitted light are discussed below. Alternatively or in addition, embodiments of the invention have a transflective MIM thin-film stack structured such as to define high transmission bias of the mirror element. Light transmitted therethrough is characterized by a C* value (accordingly defined in transmission) greater than about 8, preferably greater than about 12, and most preferably greater than about 16, as provided in the following Tables and related Figures.

Other semiconductor materials that, according to the idea of the invention, can be used in transflective MIM coatings providing substantial transmittance bias for different portions of the spectrum of the transmitted light (and, therefore, substantial purity of color of the transmitted light) include SiGe, InSb, InP, InGa, InAlAs, InAl, InGaAs, HgTe, Ge, GaSb, AlSb, GaAs and AlGaAs. Other semiconductor materials that would be viable would be those that have a band-gap energy at or below about 3.5 eV. In an application a red-light generating source is used in the assembly behind the transflective coating and where "stealthy" appearance of such red-light source is desired when the source does not emit light, a material such as Ge or an Si—Ge mixture may be preferred in the MIM stack. Ge has a smaller band gap as compared to Si and, as a result, a wider range of wavelengths at which the Ge-layer-containing MIM reflector has lower transmittance bias as compared to the Si-layer containing MIM-reflector. This can be preferred because the lower transmittance at wavelengths different from the display are more effective at hiding any features behind the mirror. If a substantially uniform spectral distribution of transmittance intensity is required, then it would be advantageous to select an insulator material for the I-layer of the MIM coating.

Figure 5A:
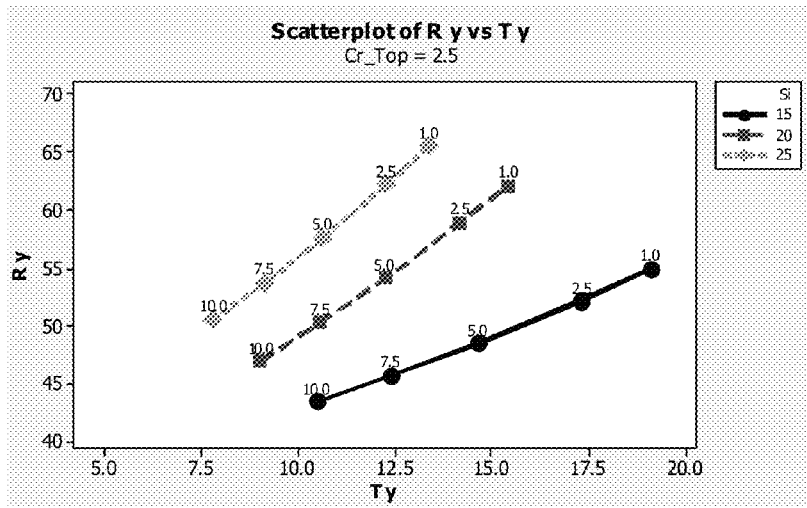
FIGS. 5A, 5B, and 5C provide plots illustrating interdependence between reflectance and transmittance characteristics of a mirror element according to an embodiment of the invention as a function of a thickness of a layer of the mirror element coating.
Figure 5B:
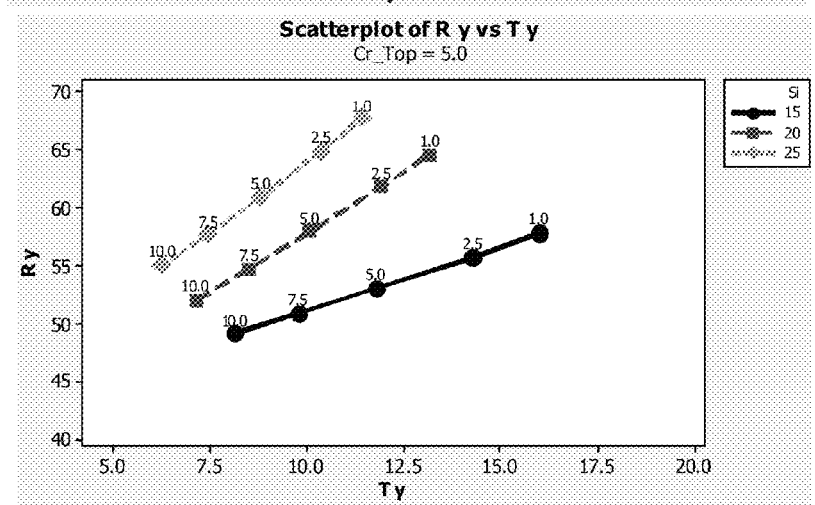
Figure 5C:
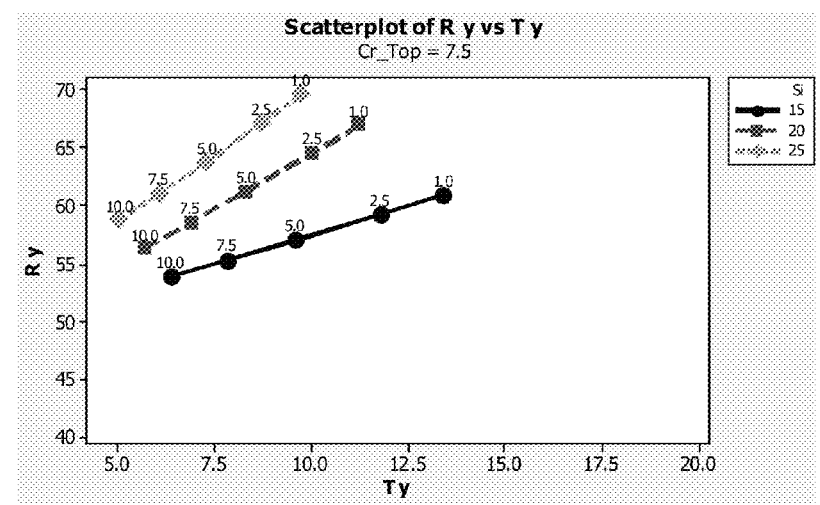
Figures 6A, 6B, 6C:
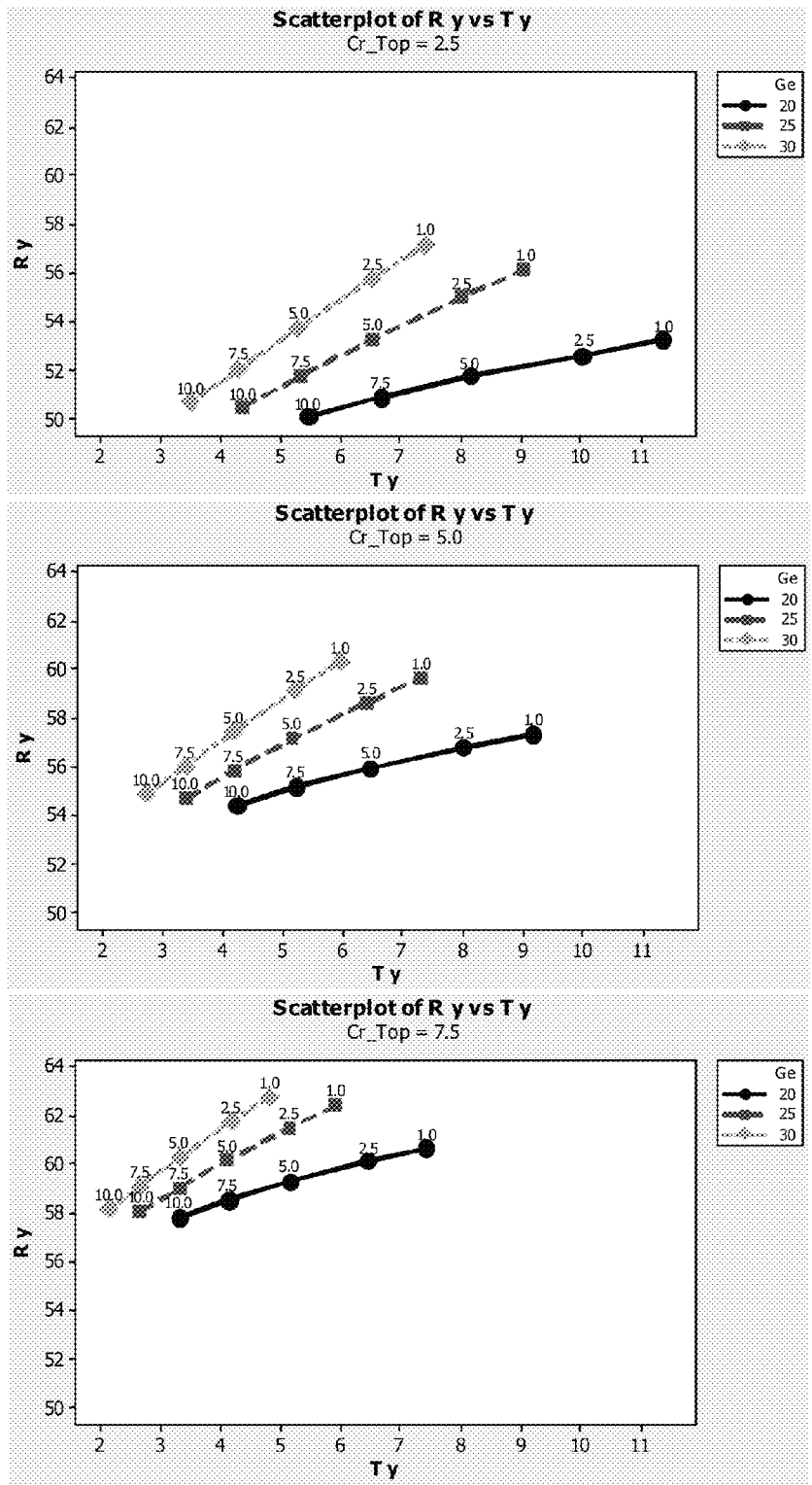
FIGS. 6A, 6B, and 6C provide plots illustrating interdependence between reflectance and transmittance characteristics of a mirror element according to another embodiment of the invention as a function of a thickness of a layer of the mirror element coating.
Figure 7A:
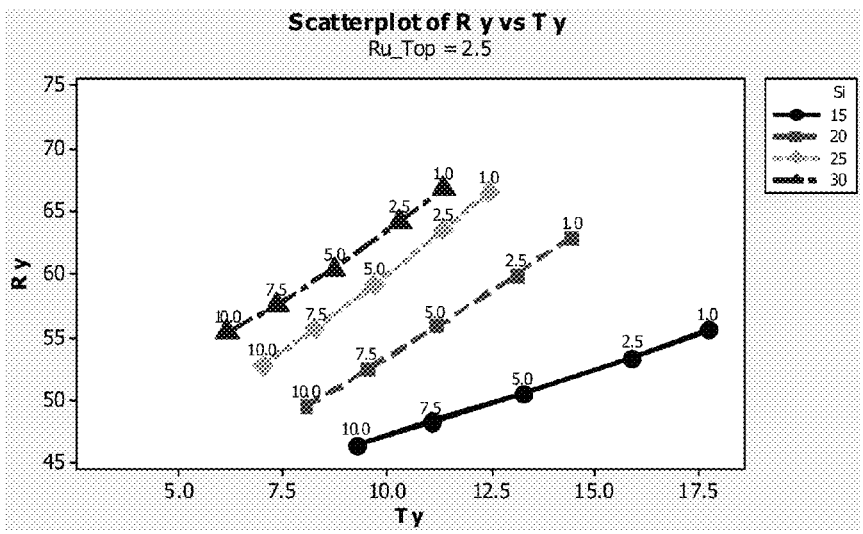
FIGS. 7A, 7B, and 7C provide plots illustrating interdependence between reflectance and transmittance characteristics of a mirror element according to a third embodiment of the invention as a function of a thickness of a layer of the mirror element coating.
Figure 7B:
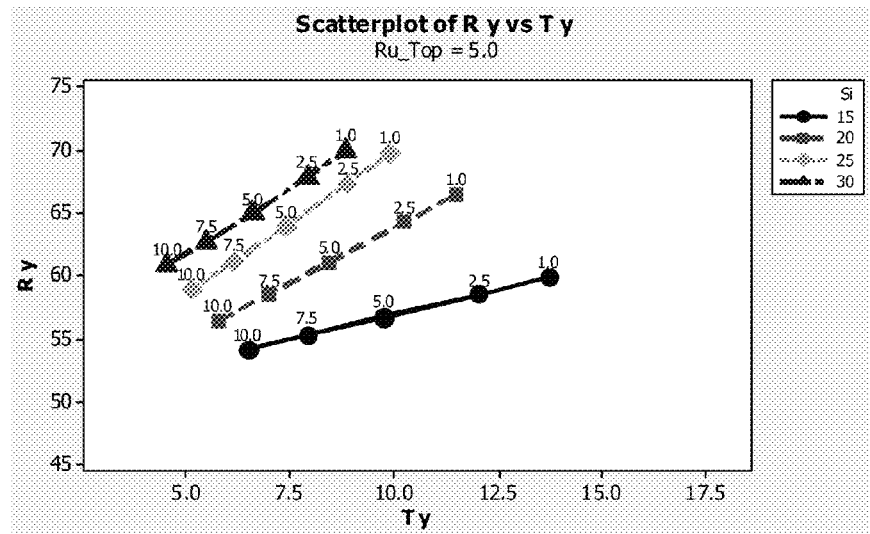
Figure 7C:
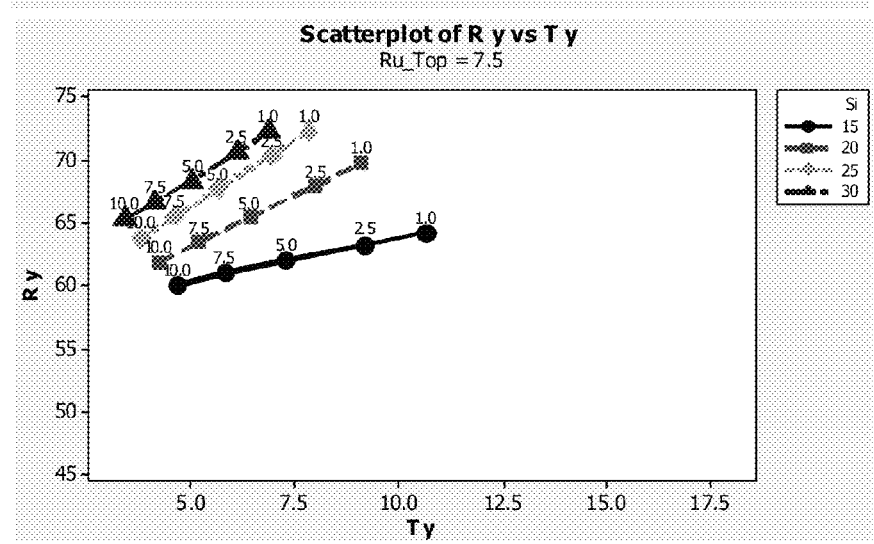
Figure 8A:
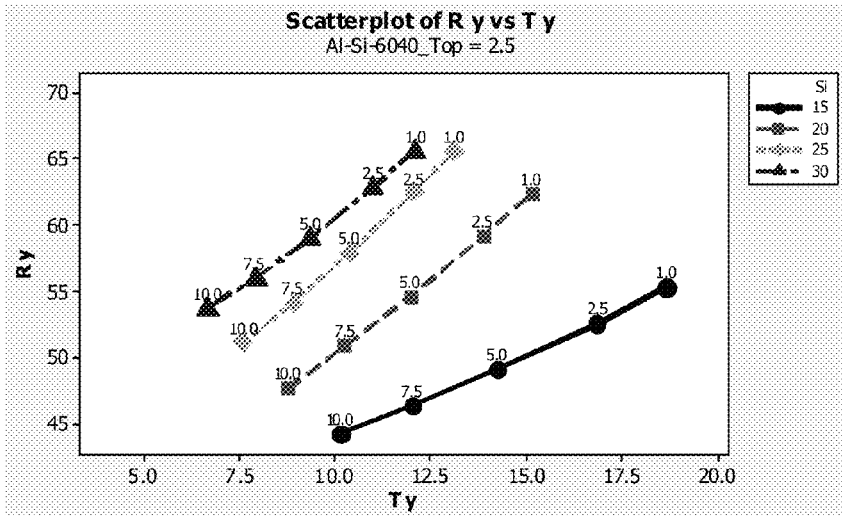
FIGS. 8A, 8B, and 8C provide plots illustrating interdependence between reflectance and transmittance characteristics of a mirror element according to yet another embodiment of the invention as a function of a thickness of a layer of the mirror element coating.
Figure 8B:
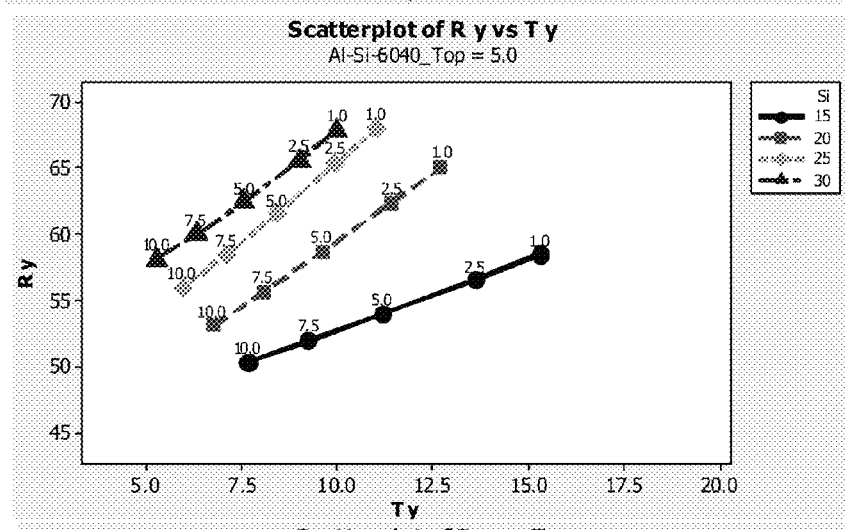
Figure 8C:
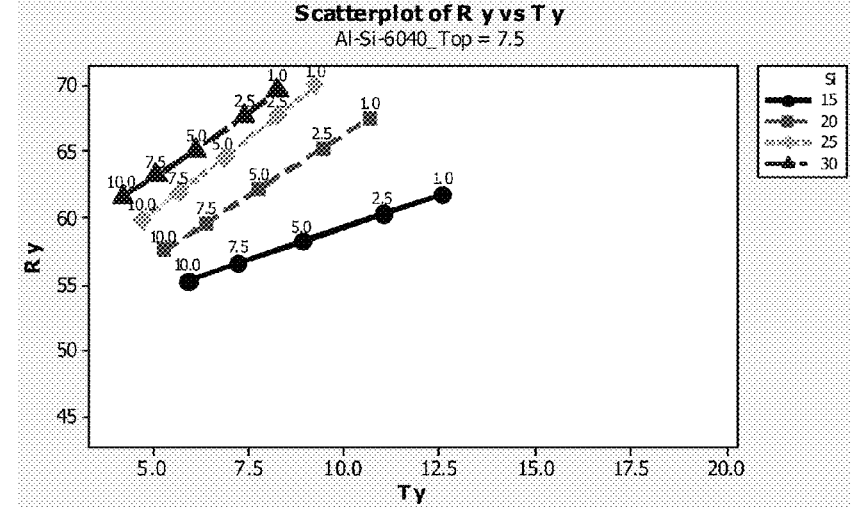
Figure 9A:
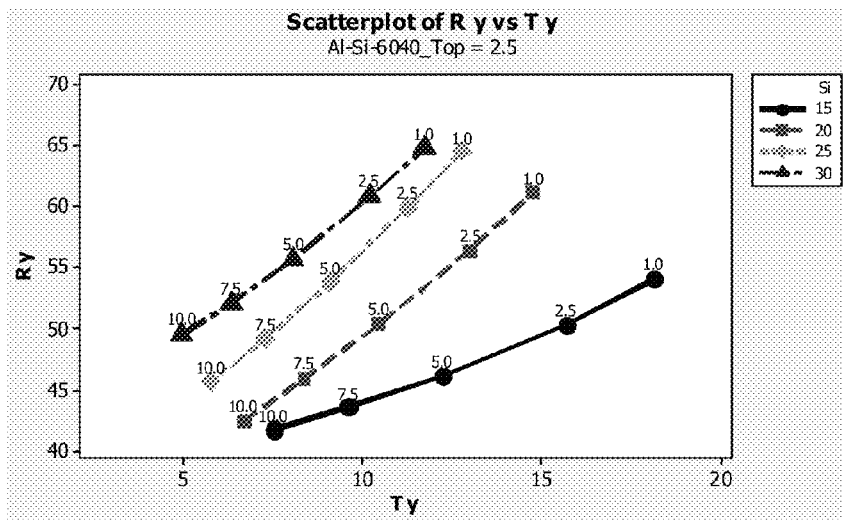
FIGS. 9A, 9B, and 9C provide plots illustrating interdependence between reflectance and transmittance characteristics of a mirror element according to a related embodiment of the invention as a function of a thickness of a layer of the mirror element coating.
Figure 9B:
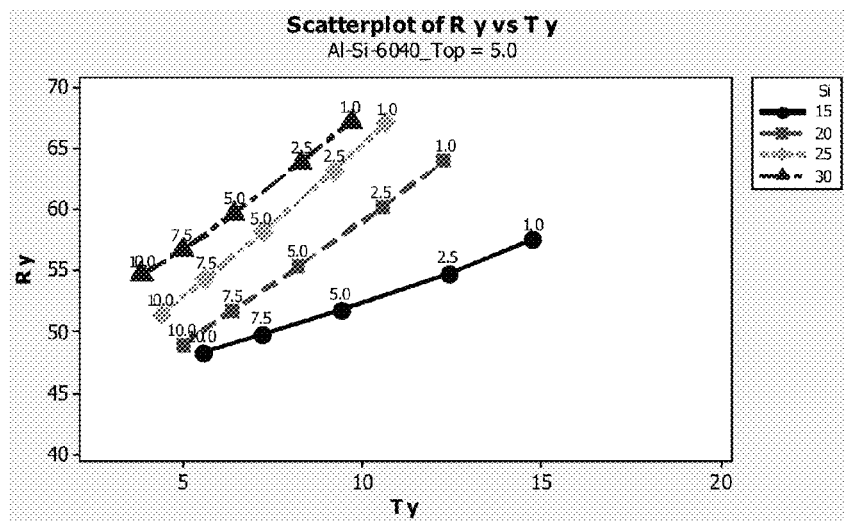
Figure 9C:
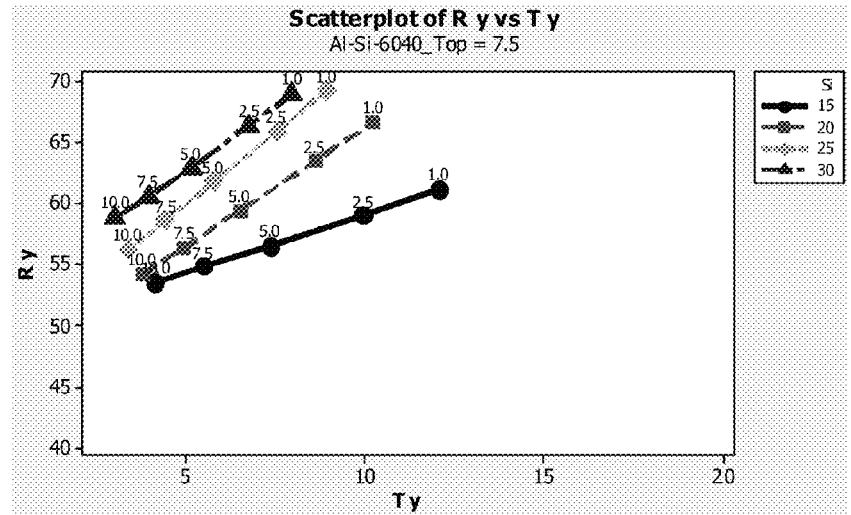

Several implementations of the mirror element 408 structured according to the idea of the invention such as to possess required optical characteristics discussed above (such as R, T, C*) are described in reference to Table 1A and Tables 2 through 7 and related FIGS. 5(A through C), 6 (A through C), 7 (A through C), 8 (A through C) and 9 (A through C). Table 1 and FIGS. 5 (A through C) correspond to an MIM-coating embodiment in which the first and second metallic layers include chromium and the non-metallic layer includes silicon which were tested for durability (see below). Table 2 and FIGS. 6 (A through C) correspond to an MIM-coating embodiment in which the first and second metallic layers include chromium and the non-metallic layer includes germanium. Table 3 and FIGS. 7 (A through C) correspond to an MIM-coating embodiment in which the first metallic layer includes chromium, the second metallic layer includes ruthenium and the non-metallic layer includes silicon. Table 4 and FIGS. 8 (A through C) correspond to an MIM-coating embodiment in which the first metallic layer includes chromium, the second metallic layer includes AlSi6040, and the non-metallic layer includes silicon. Table 5 and FIGS. 9 (A through C) correspond to an MIM-coating embodiment in which the first metallic layer includes ruthenium, the second metallic layer includes AlSi6040, and the non-metallic layer includes silicon. For each of the considered MIM coatings, the corresponding table and corresponding triads of figures contain data representing optical parameters of a mirror element formed by such coating disposed on the glass substrate, including color characteristics of light either transmitted through or reflected by such mirror element. Plots in each of the triads of figures correspond to different thicknesses of the corresponding non-metallic layer. Figures in each of the triads of figures correspond to different thicknesses of the second metallic layer. For example, FIGS. 5A, 5B, and 5C correspond to the same MIM structure comprising a first chromium layer, a silicon layer, and a second chromium layer and detailed in Table 1A. While each of these figures shows reflectance vs. transmittance (R vs. T) dependences for different thicknesses of the Si layer, FIG. 5A corresponds to the second chromium layer of about 2.5 nm thickness, FIG. 5B corresponds to the second chromium layer of about 5 nm thickness, and FIG. 5C corresponds to the second chromium layer of about 7.5 nm thickness. Data points forming each of the individual plots in each of the Figures correspond to and are labeled with a value representing the thickness of the first (closet to the glass substrate) metallic layer. The rest of the Tables 2 through 7 and FIGS. 6 through 9 are organized in a similar fashion.

Table 6 shows, for comparison, optical characteristics of a glass substrate carrying the coating containing a layer of ITO sandwiched between two layers of chromium. The index of refraction of a deposited ITO layer, measured at room temperature, is about 2.0. Alternatively, a layer of titania ($TiO_2$) sandwiched between two layers of chromium is within the scope of the MIM coating according to an embodiment of the invention, an example of which is described in detail in Table 7. The index of refraction of a layer of titania used as part of an MIM coating and measured at room temperature is about 2.45. Generally, however, the material for the I-layer of the MIM-coating of a mirror element of the invention is chosen to have a refractive index greater than 1.9, preferably greater than 2.1 and most preferably greater than 2.4.

Figure 10A:
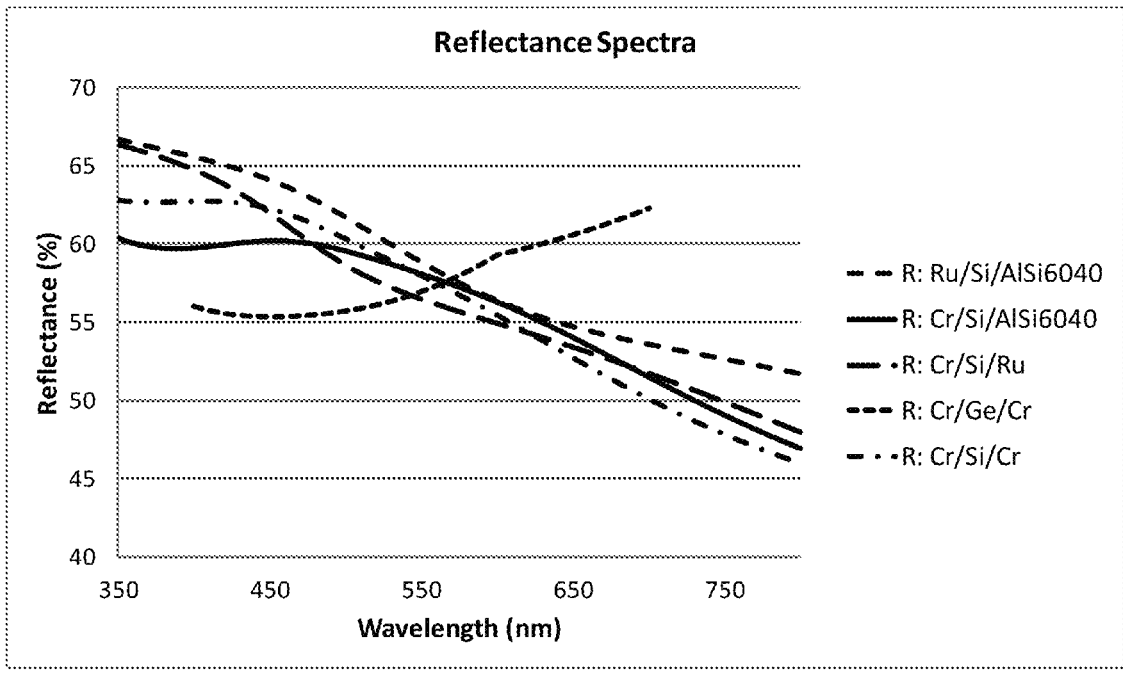
FIG. 10A provides plots illustrating distributions of reflectance values, of mirror elements of the embodiments of FIGS. 5 through 9, in the visible portion of the spectrum.
Figure 10B:
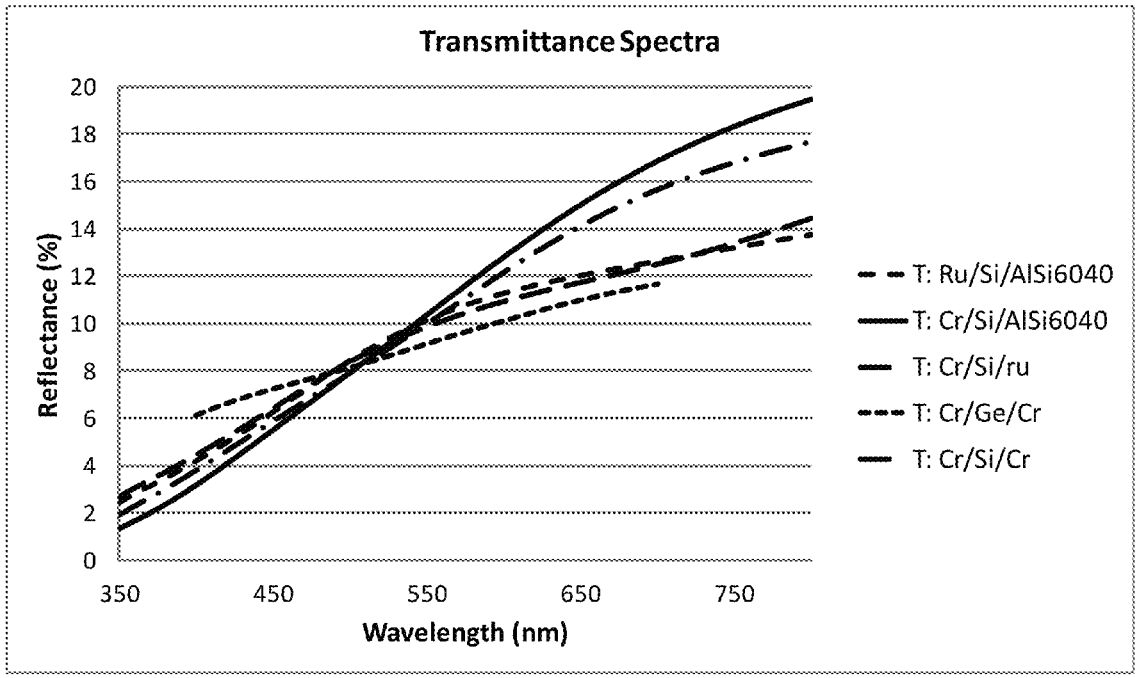
FIG. 10B provides plots illustrating distributions of transmittance values, of mirror elements of the embodiments of FIGS. 5 through 9, in the visible portion of the spectrum.
Figure 11A:
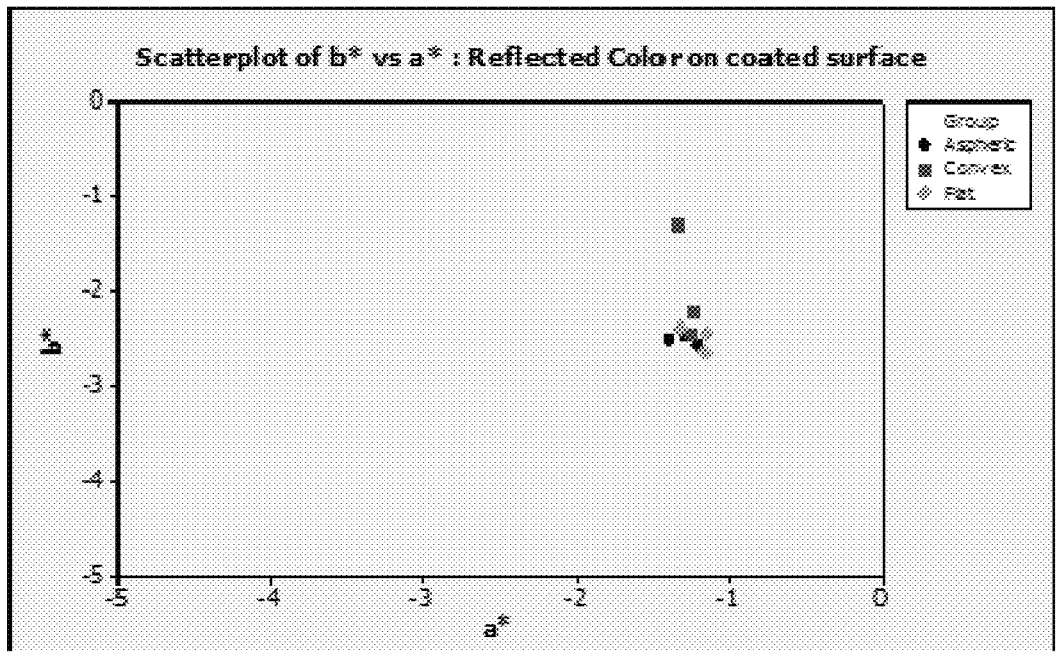
FIGS. 11A and 11B are plots showing empirically determined color content and reflectance parameters, respectively, of light incident onto the first surfaces of mirror samples fabricated according to an embodiment of the invention.
Figure 11B:
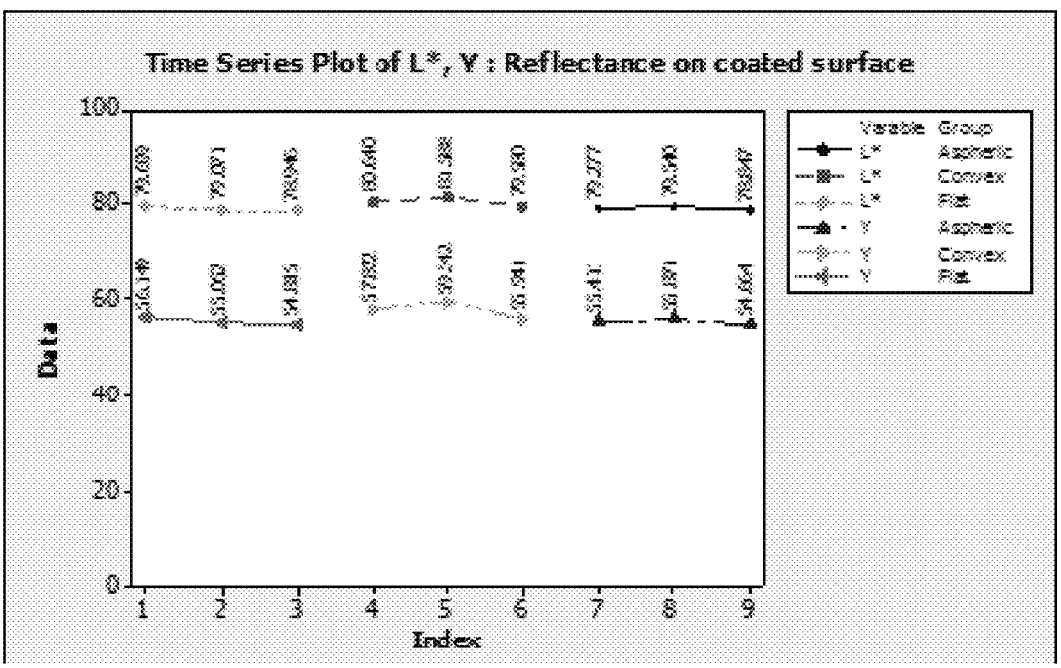
Figure 12A:
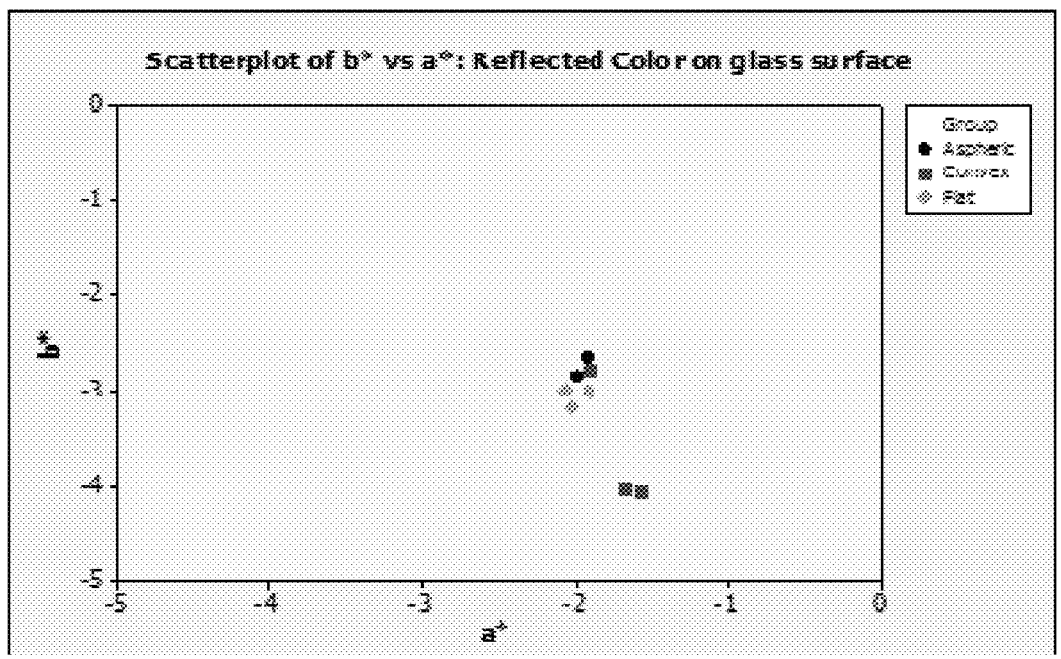
Figure 12B:
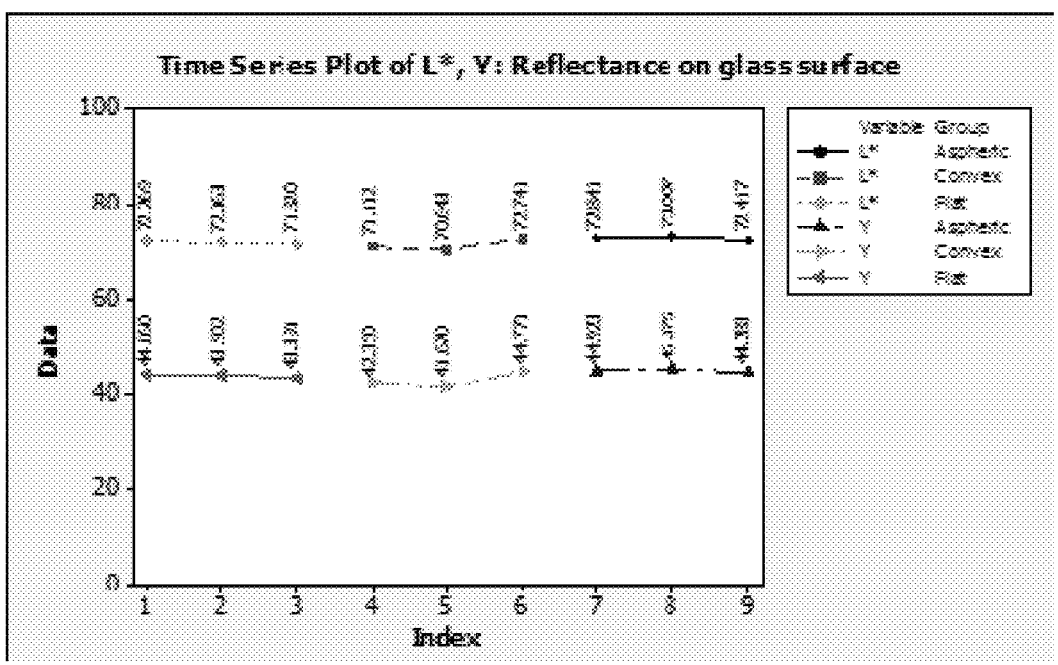
Figure 13A:
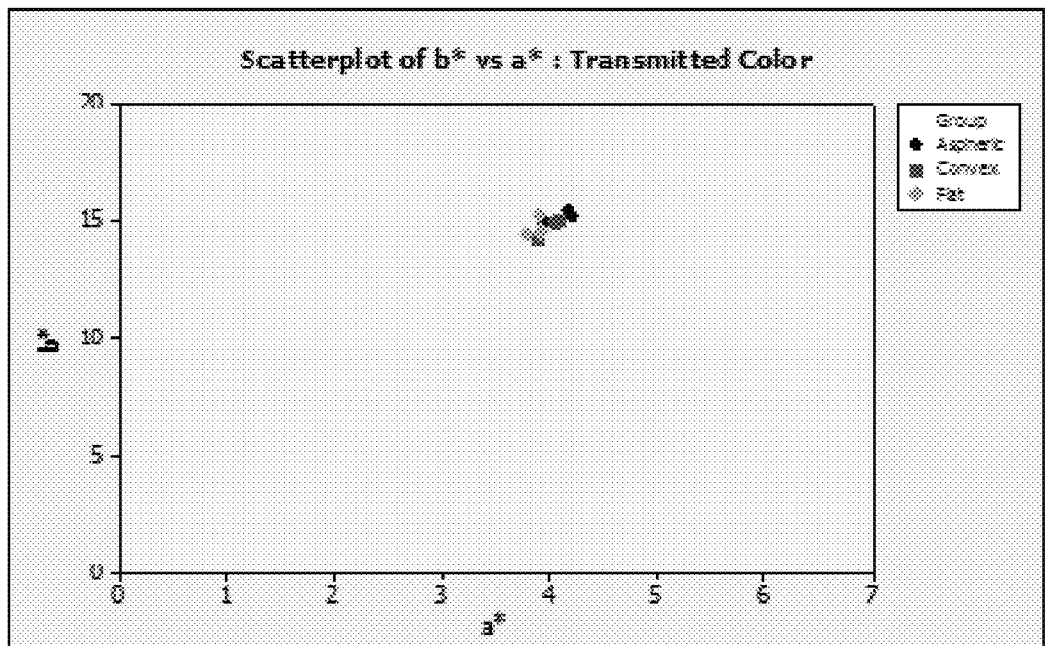
FIGS. 13A and 13B are plots showing empirically determined color content and transmittance parameters, respectively, of light incident onto the first surfaces and transmitted through the mirror samples fabricated according to an embodiment of the invention.
Figure 13B:
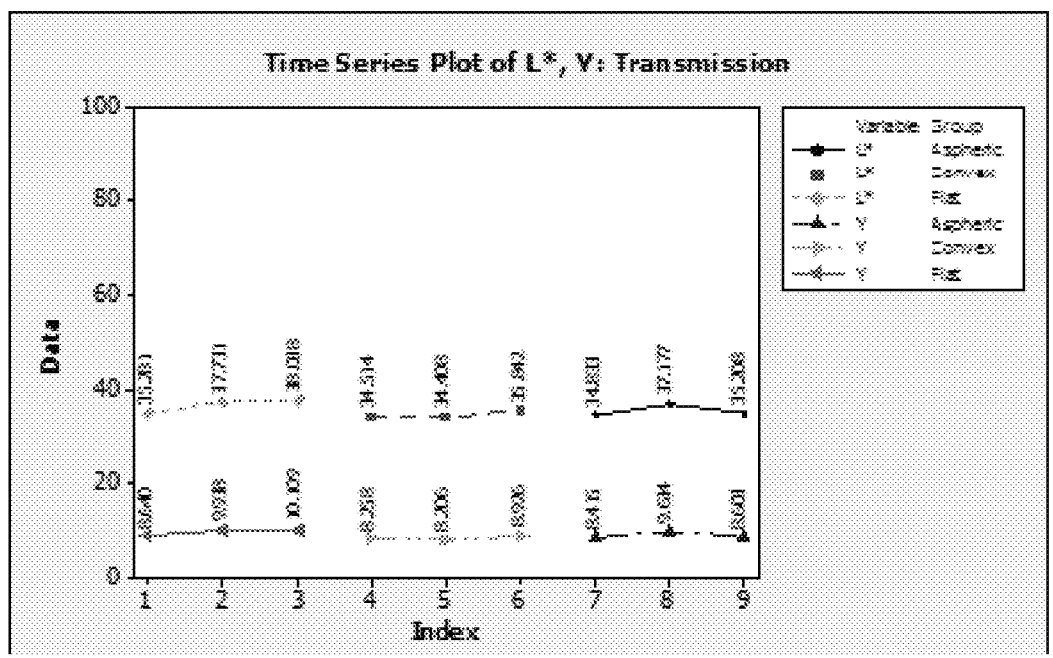

FIGS. 10A and 10B summarize reflectance and transmittance characteristics of several embodiments of the rearview assembly of the invention, structured with the use of listed MIM coatings. For example, FIG. 10B shows transmittance spectra for several MIM stack examples. The Cr/Si/AlSi6040 stack has a transmittance of about 4% in the spectral region between about 350 nm and about 450 nm, and transmittance of about 16% in the region between about 600 nm and about 700 nm, thereby being configured to exhibit a factor of 4 difference in transmittance across the visible spectral range. In accordance with the concept of "color purity" discussed above, a mirror element carrying such MIM stack is configured to transmit light with substantial color purity. In another example of FIG. 10B the MIM stack including a Cr/Ge/Cr coating has a transmittance of about 7% between about 350 nm and about 450 nm and transmittance of about 11% in the 600 to 700 nm wavelength region (the ration of which values is about 1.5). In yet another example of FIG. 10B, the mirror element with the MIM stack including Cr/Si/Ru has a transmittance of about 4% in the wavelength region between 350 and 450 nm and almost a three-times higher transmittance in the 600 to 700 nm wavelength region. Such element embodiment, therefore, possesses require high transmittance bias.

Thicknesses of all layers in Tables 1A and 2 through 7 are shown in nm. Various flash layers can be optionally disposed in between the layers forming an embodiment of the MIM coating of the invention, or between such MIM coating and the carrying substrate. For example, in order to enhance at least a select one of adhesion, stability, nucleation and/or conductivity of thin-film layers forming the MIM coating, a boundary-modifying material may be deposited to adjoin a boundary formed by any two of the substrate and the at least one thin-film layer forming the MIM coating. In one implementation, the boundary-modifying material differs from materials forming the substrate and the at least one thin-film layer forming the MIM coating, and, optionally, the accumulation of such boundary-modifying material does not exceed ten atomic layers (two atomic layers in a related embodiment). Furthermore, such boundary-modifying material may optionally include an element from a group consisting of chalcogenides and pnictogens such as, for example, sulfur and/or selenium. In a related embodiment, where a metallic thin-film layer forming the MIM coating includes a layer of Chromium carried by the (glass) substrate, the boundary-modifying material may be accumulated at the boundary between the layer of Chromium and the non-metallic layer of the MIM coating. In another related embodiment, the boundary modifying layer may be disposed at a boundary between a non-metallic layer of the MIM coating including ITO or $TiO_2$ and an adjoining metallic layer o the MIM coating. Additional overcoat layers such as hydrophobic, hydrophilic, diamond-like carbon or other hardcoats or combinations therein are possible options.

TABLE 1A

An embodiment of the MIM coating: Cr—Si—Cr
Gradient Non-EC transflective

| | | | | Reflectance | | | | | Transmittance | | | | | |
|---|---|---|---|---|---|---|---|---|---|---|---|---|---|---|
| Exp | Cr_Bottom | Si | Cr_Top | Yr | L* | a* | b* | C* | Yt | L* | a* | b* | C* | A |
| 1 | 1 | 15 | 5 | 57.8 | 80.6 | −2.5 | −4.6 | 5.2 | 16.0 | 47.0 | 4.1 | 15.7 | 16.2 | 26.2 |
| 2 | 2.5 | 15 | 5 | 55.7 | 79.4 | −2.1 | −5.0 | 5.4 | 14.3 | 44.6 | 3.6 | 14.3 | 14.8 | 30.0 |
| 3 | 5 | 15 | 5 | 53.0 | 77.9 | −1.5 | −5.3 | 5.5 | 11.8 | 40.9 | 3.2 | 12.5 | 12.9 | 35.2 |
| 4 | 7.5 | 15 | 5 | 50.9 | 76.6 | −0.9 | −5.3 | 5.4 | 9.8 | 37.5 | 2.9 | 11.4 | 11.7 | 39.4 |
| 5 | 10 | 15 | 5 | 49.1 | 75.5 | −0.3 | −5.3 | 5.3 | 8.1 | 34.3 | 2.9 | 10.7 | 11.0 | 42.8 |
| 6 | 1 | 15 | 7.5 | 60.9 | 82.3 | −2.4 | −4.1 | 4.7 | 13.4 | 43.4 | 3.6 | 14.5 | 15.0 | 25.7 |
| 7 | 2.5 | 15 | 7.5 | 59.2 | 81.4 | −2.0 | −4.2 | 4.7 | 11.8 | 40.9 | 3.3 | 13.0 | 13.4 | 29.0 |
| 8 | 5 | 15 | 7.5 | 57.1 | 80.2 | −1.4 | −4.3 | 4.6 | 9.6 | 37.1 | 3.0 | 11.1 | 11.5 | 33.4 |
| 9 | 7.5 | 15 | 7.5 | 55.3 | 79.2 | −1.0 | −4.3 | 4.4 | 7.8 | 33.6 | 2.8 | 9.9 | 10.3 | 36.9 |
| 10 | 10 | 15 | 7.5 | 53.9 | 78.4 | −0.6 | −4.3 | 4.3 | 6.4 | 30.4 | 2.8 | 9.1 | 9.5 | 39.8 |
| 11 | 1 | 15 | 2.5 | 55.0 | 79.0 | −2.5 | −4.7 | 5.3 | 19.1 | 50.8 | 4.9 | 17.5 | 18.2 | 26.0 |
| 12 | 2.5 | 15 | 2.5 | 52.1 | 77.4 | −2.2 | −5.6 | 6.0 | 17.3 | 48.6 | 4.3 | 16.2 | 16.8 | 30.6 |
| 13 | 5 | 15 | 2.5 | 48.5 | 75.1 | −1.6 | −6.4 | 6.6 | 14.7 | 45.2 | 3.6 | 14.6 | 15.1 | 36.9 |
| 14 | 7.5 | 15 | 2.5 | 45.7 | 73.3 | −0.8 | −6.8 | 6.8 | 12.4 | 41.9 | 3.2 | 13.6 | 13.9 | 41.9 |
| 15 | 10 | 15 | 2.5 | 43.4 | 71.9 | 0.1 | −7.0 | 7.0 | 10.5 | 38.7 | 3.0 | 13.0 | 13.3 | 46.1 |
| 16 | 1 | 20 | 5 | 64.5 | 84.2 | −2.1 | −1.6 | 2.7 | 13.2 | 43.1 | 4.7 | 16.8 | 17.4 | 22.3 |
| 17 | 2.5 | 20 | 5 | 61.8 | 82.8 | −2.0 | −2.6 | 3.3 | 11.9 | 41.1 | 4.3 | 15.9 | 16.5 | 26.3 |
| 18 | 5 | 20 | 5 | 57.9 | 80.7 | −1.8 | −3.9 | 4.3 | 10.1 | 38.0 | 4.0 | 14.8 | 15.4 | 32.1 |
| 19 | 7.5 | 20 | 5 | 54.7 | 78.8 | −1.5 | −5.1 | 5.3 | 8.5 | 35.0 | 3.9 | 14.2 | 14.7 | 36.9 |
| 20 | 10 | 20 | 5 | 52.0 | 77.3 | −1.3 | −6.2 | 6.4 | 7.1 | 32.1 | 3.9 | 13.8 | 14.3 | 40.9 |
| 21 | 1 | 20 | 7.5 | 66.9 | 85.5 | −2.1 | −1.4 | 2.5 | 11.3 | 40.0 | 4.5 | 16.4 | 17.0 | 21.9 |
| 22 | 2.5 | 20 | 7.5 | 64.5 | 84.2 | −1.9 | −2.2 | 2.9 | 10.0 | 37.9 | 4.2 | 15.3 | 15.8 | 25.5 |
| 23 | 5 | 20 | 7.5 | 61.2 | 82.5 | −1.7 | −3.3 | 3.7 | 8.3 | 34.6 | 3.8 | 13.8 | 14.4 | 30.5 |
| 24 | 7.5 | 20 | 7.5 | 58.5 | 81.0 | −1.5 | −4.2 | 4.5 | 6.9 | 31.5 | 3.7 | 12.9 | 13.4 | 34.6 |
| 25 | 10 | 20 | 7.5 | 56.3 | 79.8 | −1.3 | −5.1 | 5.2 | 5.7 | 28.7 | 3.6 | 12.3 | 12.8 | 38.1 |
| 26 | 1 | 20 | 2.5 | 62.1 | 83.0 | −2.0 | −1.6 | 2.6 | 15.4 | 46.2 | 5.0 | 17.5 | 18.2 | 22.5 |
| 27 | 2.5 | 20 | 2.5 | 58.8 | 81.2 | −2.0 | −2.8 | 3.5 | 14.2 | 44.5 | 4.7 | 16.9 | 17.6 | 27.1 |
| 28 | 5 | 20 | 2.5 | 54.1 | 78.5 | −1.9 | −4.6 | 5.0 | 12.3 | 41.6 | 4.4 | 16.3 | 16.9 | 33.6 |
| 29 | 7.5 | 20 | 2.5 | 50.2 | 76.2 | −1.6 | −6.3 | 6.5 | 10.6 | 38.8 | 4.3 | 16.0 | 16.6 | 39.2 |
| 30 | 10 | 20 | 2.5 | 47.0 | 74.2 | −1.4 | −7.8 | 7.9 | 9.0 | 36.0 | 4.4 | 16.0 | 16.6 | 44.0 |
| 31 | 1 | 25 | 5 | 67.7 | 85.8 | −1.4 | 1.5 | 2.1 | 11.4 | 40.3 | 4.7 | 17.4 | 18.0 | 20.9 |
| 32 | 2.5 | 25 | 5 | 64.9 | 84.4 | −1.5 | 0.2 | 1.5 | 10.4 | 38.5 | 4.6 | 16.9 | 17.5 | 24.8 |
| 33 | 5 | 25 | 5 | 60.9 | 82.3 | −1.7 | −1.8 | 2.5 | 8.8 | 35.6 | 4.5 | 16.3 | 16.9 | 30.3 |
| 34 | 7.5 | 25 | 5 | 57.6 | 80.5 | −1.9 | −3.5 | 4.0 | 7.4 | 32.8 | 4.7 | 15.9 | 16.6 | 35.0 |
| 35 | 10 | 25 | 5 | 55.0 | 79.0 | −2.2 | −5.2 | 5.6 | 6.3 | 30.1 | 4.9 | 15.7 | 16.4 | 38.8 |
| 36 | 1 | 25 | 7.5 | 69.5 | 86.8 | −1.3 | 1.4 | 1.9 | 9.7 | 37.4 | 5.0 | 17.4 | 18.1 | 20.7 |
| 37 | 2.5 | 25 | 7.5 | 67.1 | 85.6 | −1.4 | 0.3 | 1.4 | 8.7 | 35.5 | 4.7 | 16.6 | 17.2 | 24.2 |
| 38 | 5 | 25 | 7.5 | 63.7 | 83.8 | −1.6 | −1.4 | 2.1 | 7.3 | 32.5 | 4.5 | 15.6 | 16.2 | 29.0 |
| 39 | 7.5 | 25 | 7.5 | 61.0 | 82.4 | −1.8 | −2.9 | 3.4 | 6.1 | 29.6 | 4.5 | 14.9 | 15.5 | 33.0 |
| 40 | 10 | 25 | 7.5 | 58.8 | 81.2 | −2.0 | −4.2 | 4.7 | 5.1 | 26.9 | 4.5 | 14.4 | 15.1 | 36.2 |
| 41 | 1 | 25 | 2.5 | 65.4 | 84.7 | −1.4 | 1.8 | 2.3 | 13.4 | 43.3 | 4.4 | 17.5 | 18.0 | 21.3 |
| 42 | 2.5 | 25 | 2.5 | 62.2 | 83.0 | −1.5 | 0.3 | 1.6 | 12.3 | 41.7 | 4.5 | 17.4 | 17.9 | 25.6 |
| 43 | 5 | 25 | 2.5 | 57.5 | 80.5 | −1.8 | −2.0 | 2.7 | 10.6 | 39.0 | 4.7 | 17.3 | 18.0 | 31.9 |
| 44 | 7.5 | 25 | 2.5 | 53.7 | 78.3 | −2.1 | −4.3 | 4.7 | 9.1 | 36.3 | 5.1 | 17.4 | 18.1 | 37.2 |
| 45 | 10 | 25 | 2.5 | 50.5 | 76.4 | −2.5 | −6.3 | 6.8 | 7.8 | 33.6 | 5.5 | 17.5 | 18.4 | 41.7 |
| 46 | 1 | 30 | 5 | 67.6 | 85.8 | −0.3 | 4.3 | 4.3 | 10.4 | 38.5 | 4.3 | 18.4 | 18.9 | 22.0 |
| 47 | 2.5 | 30 | 5 | 65.2 | 84.6 | −0.6 | 2.8 | 2.9 | 9.4 | 36.7 | 4.5 | 18.1 | 18.6 | 25.5 |
| 48 | 5 | 30 | 5 | 61.8 | 82.8 | −1.2 | 0.5 | 1.3 | 7.9 | 33.8 | 4.8 | 17.6 | 18.2 | 30.3 |
| 49 | 7.5 | 30 | 5 | 59.2 | 81.4 | −1.9 | −1.5 | 2.4 | 6.6 | 30.9 | 5.1 | 17.3 | 18.0 | 34.1 |
| 50 | 10 | 30 | 5 | 57.3 | 80.3 | −2.6 | −3.1 | 4.0 | 5.5 | 28.2 | 5.5 | 17.0 | 17.9 | 37.2 |
| 51 | 1 | 30 | 7.5 | 69.2 | 86.6 | −0.1 | 3.6 | 3.6 | 8.7 | 35.5 | 5.0 | 18.4 | 19.1 | 22.1 |
| 52 | 2.5 | 30 | 7.5 | 67.2 | 85.6 | −0.5 | 2.3 | 2.4 | 7.8 | 33.6 | 5.0 | 17.8 | 18.5 | 25.0 |
| 53 | 5 | 30 | 7.5 | 64.4 | 84.2 | −1.1 | 0.4 | 1.2 | 6.5 | 30.7 | 5.0 | 17.0 | 17.7 | 29.1 |
| 54 | 7.5 | 30 | 7.5 | 62.3 | 83.1 | −1.7 | −1.2 | 2.1 | 5.4 | 27.9 | 5.1 | 16.4 | 17.1 | 32.3 |
| 55 | 10 | 30 | 7.5 | 60.6 | 82.2 | −2.3 | −2.6 | 3.4 | 4.5 | 25.3 | 5.2 | 15.9 | 16.7 | 34.9 |
| 56 | 1 | 30 | 2.5 | 65.4 | 84.7 | −0.4 | 5.2 | 5.2 | 12.3 | 41.7 | 3.6 | 18.4 | 18.8 | 22.3 |
| 57 | 2.5 | 30 | 2.5 | 62.6 | 83.2 | −0.7 | 3.4 | 3.5 | 11.2 | 40.0 | 4.0 | 18.4 | 18.9 | 26.2 |
| 58 | 5 | 30 | 2.5 | 58.6 | 81.1 | −1.3 | 0.6 | 1.4 | 9.6 | 37.1 | 4.7 | 18.5 | 19.1 | 31.8 |
| 59 | 7.5 | 30 | 2.5 | 55.5 | 79.4 | −2.0 | −1.8 | 2.7 | 8.1 | 34.2 | 5.4 | 18.5 | 19.3 | 36.4 |
| 60 | 10 | 30 | 2.5 | 53.2 | 78.0 | −2.9 | −3.8 | 4.7 | 6.8 | 31.4 | 6.1 | 18.5 | 19.4 | 40.0 |

TABLE 2

An embodiment of the MIM coating: Cr—Ge—Cr
Gradient Non-EC transflective

| Exp | Cr_Bottom | Ge | Cr_Top | Reflectance | | | | | Transmittance | | | | | A |
| | | | | Yr | L* | a* | b* | C* | Yt | L* | a* | b* | C* | |
|---|---|---|---|---|---|---|---|---|---|---|---|---|---|---|
| 1 | 1 | 15 | 5 | 53.0 | 77.9 | 1.2 | 1.1 | 1.6 | 11.8 | 40.9 | 1.8 | 4.4 | 4.8 | 35.2 |
| 2 | 2.5 | 15 | 5 | 53.3 | 78.1 | 0.9 | 0.5 | 1.0 | 10.2 | 38.3 | 2.2 | 4.4 | 5.0 | 36.4 |
| 3 | 5 | 15 | 5 | 53.7 | 78.3 | 0.5 | −0.3 | 0.6 | 8.2 | 34.3 | 2.8 | 4.7 | 5.4 | 38.1 |
| 4 | 7.5 | 15 | 5 | 54.0 | 78.4 | 0.2 | −0.9 | 0.9 | 6.6 | 30.8 | 3.3 | 5.0 | 6.0 | 39.5 |
| 5 | 10 | 15 | 5 | 54.0 | 78.5 | 0.0 | −1.4 | 1.4 | 5.3 | 27.6 | 3.7 | 5.4 | 6.5 | 40.7 |
| 6 | 1 | 15 | 7.5 | 57.1 | 80.3 | 0.7 | 0.9 | 1.1 | 9.5 | 36.9 | 2.4 | 4.8 | 5.4 | 33.4 |
| 7 | 2.5 | 15 | 7.5 | 57.3 | 80.4 | 0.5 | 0.5 | 0.6 | 8.2 | 34.4 | 2.8 | 4.8 | 5.5 | 34.5 |
| 8 | 5 | 15 | 7.5 | 57.5 | 80.5 | 0.2 | −0.1 | 0.2 | 6.5 | 30.6 | 3.3 | 4.9 | 5.9 | 36.0 |
| 9 | 7.5 | 15 | 7.5 | 57.6 | 80.5 | 0.0 | −0.6 | 0.6 | 5.2 | 27.2 | 3.7 | 5.1 | 6.3 | 37.3 |
| 10 | 10 | 15 | 7.5 | 57.5 | 80.4 | −0.2 | −1.1 | 1.1 | 4.2 | 24.2 | 4.0 | 5.4 | 6.7 | 38.4 |
| 11 | 1 | 15 | 2.5 | 48.2 | 74.9 | 2.0 | 1.6 | 2.6 | 14.8 | 45.4 | 1.1 | 4.1 | 4.3 | 37.0 |
| 12 | 2.5 | 15 | 2.5 | 48.5 | 75.1 | 1.6 | 0.7 | 1.8 | 13.0 | 42.7 | 1.6 | 4.2 | 4.5 | 38.6 |
| 13 | 5 | 15 | 2.5 | 49.0 | 75.4 | 1.1 | −0.4 | 1.1 | 10.4 | 38.6 | 2.2 | 4.6 | 5.1 | 40.6 |
| 14 | 7.5 | 15 | 2.5 | 49.4 | 75.7 | 0.6 | −1.2 | 1.3 | 8.4 | 34.9 | 2.8 | 5.0 | 5.7 | 42.2 |
| 15 | 10 | 15 | 2.5 | 49.6 | 75.8 | 0.3 | −1.8 | 1.8 | 6.9 | 31.5 | 3.3 | 5.5 | 6.4 | 43.6 |
| 16 | 1 | 20 | 5 | 57.3 | 80.4 | 1.7 | 1.8 | 2.5 | 9.2 | 36.3 | 2.0 | 6.7 | 7.0 | 33.5 |
| 17 | 2.5 | 20 | 5 | 56.8 | 80.1 | 1.5 | 1.1 | 1.9 | 8.0 | 34.0 | 2.4 | 6.8 | 7.2 | 35.2 |
| 18 | 5 | 20 | 5 | 56.0 | 79.6 | 1.2 | 0.2 | 1.2 | 6.5 | 30.5 | 3.1 | 7.0 | 7.6 | 37.6 |
| 19 | 7.5 | 20 | 5 | 55.2 | 79.1 | 0.9 | −0.6 | 1.0 | 5.2 | 27.3 | 3.6 | 7.3 | 8.1 | 39.6 |
| 20 | 10 | 20 | 5 | 54.4 | 78.7 | 0.6 | −1.3 | 1.4 | 4.2 | 24.4 | 4.0 | 7.5 | 8.5 | 41.4 |
| 21 | 1 | 20 | 7.5 | 60.6 | 82.2 | 1.2 | 1.6 | 2.0 | 7.4 | 32.8 | 2.7 | 7.2 | 7.6 | 31.9 |
| 22 | 2.5 | 20 | 7.5 | 60.1 | 81.9 | 1.0 | 1.0 | 1.5 | 6.5 | 30.5 | 3.1 | 7.1 | 7.7 | 33.4 |
| 23 | 5 | 20 | 7.5 | 59.3 | 81.5 | 0.8 | 0.3 | 0.8 | 5.1 | 27.1 | 3.6 | 7.1 | 8.0 | 35.6 |
| 24 | 7.5 | 20 | 7.5 | 58.5 | 81.0 | 0.5 | −0.4 | 0.6 | 4.1 | 24.1 | 4.0 | 7.2 | 8.3 | 37.4 |
| 25 | 10 | 20 | 7.5 | 57.8 | 80.6 | 0.3 | −0.9 | 1.0 | 3.3 | 21.3 | 4.3 | 7.4 | 8.5 | 38.9 |
| 26 | 1 | 20 | 2.5 | 53.3 | 78.0 | 2.5 | 2.3 | 3.4 | 11.4 | 40.2 | 1.2 | 6.3 | 6.4 | 35.4 |
| 27 | 2.5 | 20 | 2.5 | 52.6 | 77.7 | 2.2 | 1.4 | 2.6 | 10.0 | 37.9 | 1.7 | 6.5 | 6.7 | 37.3 |
| 28 | 5 | 20 | 2.5 | 51.7 | 77.1 | 1.8 | 0.2 | 1.8 | 8.2 | 34.3 | 2.4 | 6.9 | 7.3 | 40.1 |
| 29 | 7.5 | 20 | 2.5 | 50.9 | 76.6 | 1.4 | −0.8 | 1.6 | 6.7 | 31.0 | 3.1 | 7.4 | 8.0 | 42.4 |
| 30 | 10 | 20 | 2.5 | 50.1 | 76.1 | 1.1 | −1.7 | 2.0 | 5.5 | 28.0 | 3.6 | 7.8 | 8.6 | 44.5 |
| 31 | 1 | 25 | 5 | 59.7 | 81.7 | 2.0 | 2.3 | 3.0 | 7.3 | 32.5 | 2.5 | 9.0 | 9.3 | 33.0 |
| 32 | 2.5 | 25 | 5 | 58.6 | 81.1 | 1.9 | 1.6 | 2.4 | 6.4 | 30.4 | 2.9 | 9.0 | 9.5 | 35.0 |
| 33 | 5 | 25 | 5 | 57.1 | 80.3 | 1.6 | 0.5 | 1.7 | 5.2 | 27.2 | 3.5 | 9.1 | 9.8 | 37.7 |
| 34 | 7.5 | 25 | 5 | 55.9 | 79.5 | 1.3 | −0.3 | 1.3 | 4.2 | 24.3 | 4.0 | 9.2 | 10.0 | 40.0 |
| 35 | 10 | 25 | 5 | 54.7 | 78.9 | 1.0 | −1.1 | 1.5 | 3.4 | 21.5 | 4.5 | 9.3 | 10.3 | 41.9 |
| 36 | 1 | 25 | 7.5 | 62.4 | 83.1 | 1.5 | 2.0 | 2.5 | 5.9 | 29.2 | 3.2 | 9.3 | 9.8 | 31.7 |
| 37 | 2.5 | 25 | 7.5 | 61.5 | 82.7 | 1.4 | 1.4 | 1.9 | 5.2 | 27.2 | 3.5 | 9.2 | 9.8 | 33.3 |
| 38 | 5 | 25 | 7.5 | 60.2 | 81.9 | 1.1 | 0.5 | 1.2 | 4.1 | 24.1 | 4.0 | 9.1 | 9.9 | 35.7 |
| 39 | 7.5 | 25 | 7.5 | 59.0 | 81.3 | 0.9 | −0.2 | 0.9 | 3.3 | 21.2 | 4.4 | 9.0 | 10.1 | 37.7 |
| 40 | 10 | 25 | 7.5 | 58.0 | 80.8 | 0.6 | −0.8 | 1.0 | 2.7 | 18.6 | 4.7 | 9.0 | 10.2 | 39.3 |
| 41 | 1 | 25 | 2.5 | 56.1 | 79.7 | 2.8 | 2.7 | 3.9 | 9.1 | 36.1 | 1.6 | 8.7 | 8.8 | 34.8 |
| 42 | 2.5 | 25 | 2.5 | 55.0 | 79.0 | 2.6 | 1.8 | 3.1 | 8.0 | 34.0 | 2.1 | 8.9 | 9.1 | 37.0 |
| 43 | 5 | 25 | 2.5 | 53.3 | 78.0 | 2.3 | 0.6 | 2.3 | 6.5 | 30.7 | 2.9 | 9.2 | 9.6 | 40.2 |
| 44 | 7.5 | 25 | 2.5 | 51.8 | 77.2 | 1.9 | −0.5 | 2.0 | 5.3 | 27.7 | 3.6 | 9.5 | 10.1 | 42.9 |
| 45 | 10 | 25 | 2.5 | 50.5 | 76.4 | 1.7 | −1.4 | 2.2 | 4.4 | 24.8 | 4.1 | 9.7 | 10.5 | 45.2 |
| 46 | 1 | 30 | 5 | 60.3 | 82.0 | 2.2 | 2.3 | 3.1 | 6.0 | 29.3 | 3.2 | 11.2 | 11.7 | 33.7 |
| 47 | 2.5 | 30 | 5 | 59.1 | 81.4 | 2.0 | 1.6 | 2.6 | 5.2 | 27.3 | 3.6 | 11.1 | 11.7 | 35.7 |
| 48 | 5 | 30 | 5 | 57.4 | 80.4 | 1.7 | 0.6 | 1.9 | 4.2 | 24.3 | 4.2 | 11.0 | 11.7 | 38.4 |
| 49 | 7.5 | 30 | 5 | 56.0 | 79.6 | 1.5 | −0.2 | 1.5 | 3.4 | 21.5 | 4.6 | 10.9 | 11.8 | 40.6 |
| 50 | 10 | 30 | 5 | 54.9 | 79.0 | 1.3 | −0.9 | 1.5 | 2.7 | 18.9 | 5.0 | 10.8 | 11.8 | 42.4 |
| 51 | 1 | 30 | 7.5 | 62.8 | 83.3 | 1.6 | 1.9 | 2.5 | 4.8 | 26.2 | 3.9 | 11.3 | 11.9 | 32.4 |
| 52 | 2.5 | 30 | 7.5 | 61.7 | 82.8 | 1.5 | 1.4 | 2.0 | 4.2 | 24.2 | 4.2 | 11.1 | 11.8 | 34.1 |
| 53 | 5 | 30 | 7.5 | 60.3 | 82.0 | 1.2 | 0.6 | 1.4 | 3.3 | 21.3 | 4.6 | 10.8 | 11.7 | 36.4 |
| 54 | 7.5 | 30 | 7.5 | 59.1 | 81.4 | 1.0 | −0.1 | 1.0 | 2.7 | 18.6 | 4.9 | 10.6 | 11.6 | 38.2 |
| 55 | 10 | 30 | 7.5 | 58.2 | 80.8 | 0.8 | −0.6 | 1.0 | 2.1 | 16.2 | 5.2 | 10.4 | 11.6 | 39.7 |
| 56 | 1 | 30 | 2.5 | 57.1 | 80.3 | 2.9 | 2.8 | 4.0 | 7.4 | 32.7 | 2.4 | 11.1 | 11.4 | 35.4 |
| 57 | 2.5 | 30 | 2.5 | 55.8 | 79.5 | 2.7 | 1.9 | 3.3 | 6.5 | 30.7 | 2.9 | 11.2 | 11.5 | 37.7 |
| 58 | 5 | 30 | 2.5 | 53.8 | 78.3 | 2.5 | 0.7 | 2.6 | 5.3 | 27.6 | 3.6 | 11.2 | 11.8 | 41.0 |
| 59 | 7.5 | 30 | 2.5 | 52.1 | 77.3 | 2.2 | −0.3 | 2.2 | 4.3 | 24.7 | 4.2 | 11.3 | 12.0 | 43.6 |
| 60 | 10 | 30 | 2.5 | 50.7 | 76.5 | 2.0 | −1.2 | 2.3 | 3.5 | 22.0 | 4.7 | 11.3 | 12.2 | 45.8 |

TABLE 3

An embodiment of the MIM coating: Cr—Si—Ru
Gradient Non-EC transflective

| | | | | Reflectance | | | | | Transmittance | | | | | |
|---|---|---|---|---|---|---|---|---|---|---|---|---|---|---|
| Exp | Cr_Bottom | Si | Ru_Top | Yr | L* | a* | b* | C* | Yt | L* | a* | b* | C* | A |
| 1 | 1 | 15 | 5 | 57.8 | 80.6 | −2.5 | −4.6 | 5.2 | 16.0 | 47.0 | 4.1 | 15.7 | 16.2 | 26.2 |
| 2 | 2.5 | 15 | 5 | 55.7 | 79.4 | −2.1 | −5.0 | 5.4 | 14.3 | 44.6 | 3.6 | 14.3 | 14.8 | 30.0 |
| 3 | 5 | 15 | 5 | 53.0 | 77.9 | −1.5 | −5.3 | 5.5 | 11.8 | 40.9 | 3.2 | 12.5 | 12.9 | 35.2 |
| 4 | 7.5 | 15 | 5 | 50.9 | 76.6 | −0.9 | −5.3 | 5.4 | 9.8 | 37.5 | 2.9 | 11.4 | 11.7 | 39.4 |
| 5 | 10 | 15 | 5 | 49.1 | 75.5 | −0.3 | −5.3 | 5.3 | 8.1 | 34.3 | 2.9 | 10.7 | 11.0 | 42.8 |
| 6 | 1 | 15 | 7.5 | 60.9 | 82.3 | −2.4 | −4.1 | 4.7 | 13.4 | 43.4 | 3.6 | 14.5 | 15.0 | 25.7 |
| 7 | 2.5 | 15 | 7.5 | 59.2 | 81.4 | −2.0 | −4.2 | 4.7 | 11.8 | 40.9 | 3.3 | 13.0 | 13.4 | 29.0 |
| 8 | 5 | 15 | 7.5 | 57.1 | 80.2 | −1.4 | −4.3 | 4.6 | 9.6 | 37.1 | 3.0 | 11.1 | 11.5 | 33.4 |
| 9 | 7.5 | 15 | 7.5 | 55.3 | 79.2 | −1.0 | −4.3 | 4.4 | 7.8 | 33.6 | 2.8 | 9.9 | 10.3 | 36.9 |
| 10 | 10 | 15 | 7.5 | 53.9 | 78.4 | −0.6 | −4.3 | 4.3 | 6.4 | 30.4 | 2.8 | 9.1 | 9.5 | 39.8 |
| 11 | 1 | 15 | 2.5 | 55.0 | 79.0 | −2.5 | −4.7 | 5.3 | 19.1 | 50.8 | 4.9 | 17.5 | 18.2 | 26.0 |
| 12 | 2.5 | 15 | 2.5 | 52.1 | 77.4 | −2.2 | −5.6 | 6.0 | 17.3 | 48.6 | 4.3 | 16.2 | 16.8 | 30.6 |
| 13 | 5 | 15 | 2.5 | 48.5 | 75.1 | −1.6 | −6.4 | 6.6 | 14.7 | 45.2 | 3.6 | 14.6 | 15.1 | 36.9 |
| 14 | 7.5 | 15 | 2.5 | 45.7 | 73.3 | −0.8 | −6.8 | 6.8 | 12.4 | 41.9 | 3.2 | 13.6 | 13.9 | 41.9 |
| 15 | 10 | 15 | 2.5 | 43.4 | 71.9 | 0.1 | −7.0 | 7.0 | 10.5 | 38.7 | 3.0 | 13.0 | 13.3 | 46.1 |
| 16 | 1 | 20 | 5 | 64.5 | 84.2 | −2.1 | −1.6 | 2.7 | 13.2 | 43.1 | 4.7 | 16.8 | 17.4 | 22.3 |
| 17 | 2.5 | 20 | 5 | 61.8 | 82.8 | −2.0 | −2.6 | 3.3 | 11.9 | 41.1 | 4.3 | 15.9 | 16.5 | 26.3 |
| 18 | 5 | 20 | 5 | 57.9 | 80.7 | −1.8 | −3.9 | 4.3 | 10.1 | 38.0 | 4.0 | 14.8 | 15.4 | 32.1 |
| 19 | 7.5 | 20 | 5 | 54.7 | 78.8 | −1.5 | −5.1 | 5.3 | 8.5 | 35.0 | 3.9 | 14.2 | 14.7 | 36.9 |
| 20 | 10 | 20 | 5 | 52.0 | 77.3 | −1.3 | −6.2 | 6.4 | 7.1 | 32.1 | 3.9 | 13.8 | 14.3 | 40.9 |
| 21 | 1 | 20 | 7.5 | 66.9 | 85.5 | −2.1 | −1.4 | 2.5 | 11.3 | 40.0 | 4.5 | 16.4 | 17.0 | 21.9 |
| 22 | 2.5 | 20 | 7.5 | 64.5 | 84.2 | −1.9 | −2.2 | 2.9 | 10.0 | 37.9 | 4.2 | 15.3 | 15.8 | 25.5 |
| 23 | 5 | 20 | 7.5 | 61.2 | 82.5 | −1.7 | −3.3 | 3.7 | 8.3 | 34.6 | 3.8 | 13.8 | 14.4 | 30.5 |
| 24 | 7.5 | 20 | 7.5 | 58.5 | 81.0 | −1.5 | −4.2 | 4.5 | 6.9 | 31.5 | 3.7 | 12.9 | 13.4 | 34.6 |
| 25 | 10 | 20 | 7.5 | 56.3 | 79.8 | −1.3 | −5.1 | 5.2 | 5.7 | 28.7 | 3.6 | 12.3 | 12.8 | 38.1 |
| 26 | 1 | 20 | 2.5 | 62.1 | 83.0 | −2.0 | −1.6 | 2.6 | 15.4 | 46.2 | 5.0 | 17.5 | 18.2 | 22.5 |
| 27 | 2.5 | 20 | 2.5 | 58.8 | 81.2 | −2.0 | −2.8 | 3.5 | 14.2 | 44.5 | 4.7 | 16.9 | 17.6 | 27.1 |
| 28 | 5 | 20 | 2.5 | 54.1 | 78.5 | −1.9 | −4.6 | 5.0 | 12.3 | 41.6 | 4.4 | 16.3 | 16.9 | 33.6 |
| 29 | 7.5 | 20 | 2.5 | 50.2 | 76.2 | −1.6 | −6.3 | 6.5 | 10.6 | 38.8 | 4.3 | 16.0 | 16.6 | 39.2 |
| 30 | 10 | 20 | 2.5 | 47.0 | 74.2 | −1.4 | −7.8 | 7.9 | 9.0 | 36.0 | 4.4 | 16.0 | 16.6 | 44.0 |
| 31 | 1 | 25 | 5 | 67.7 | 85.8 | −1.4 | 1.5 | 2.1 | 11.4 | 40.3 | 4.7 | 17.4 | 18.0 | 20.9 |
| 32 | 2.5 | 25 | 5 | 64.9 | 84.4 | −1.5 | 0.2 | 1.5 | 10.4 | 38.5 | 4.6 | 16.9 | 17.5 | 24.8 |
| 33 | 5 | 25 | 5 | 60.9 | 82.3 | −1.7 | −1.8 | 2.5 | 8.8 | 35.6 | 4.5 | 16.3 | 16.9 | 30.3 |
| 34 | 7.5 | 25 | 5 | 57.6 | 80.5 | −1.9 | −3.5 | 4.0 | 7.4 | 32.8 | 4.7 | 15.9 | 16.6 | 35.0 |
| 35 | 10 | 25 | 5 | 55.0 | 79.0 | −2.2 | −5.2 | 5.6 | 6.3 | 30.1 | 4.9 | 15.7 | 16.4 | 38.8 |
| 36 | 1 | 25 | 7.5 | 69.5 | 86.8 | −1.3 | 1.4 | 1.9 | 9.7 | 37.4 | 5.0 | 17.4 | 18.1 | 20.7 |
| 37 | 2.5 | 25 | 7.5 | 67.1 | 85.6 | −1.4 | 0.3 | 1.4 | 8.7 | 35.5 | 4.7 | 16.6 | 17.2 | 24.2 |
| 38 | 5 | 25 | 7.5 | 63.7 | 83.8 | −1.6 | −1.4 | 2.1 | 7.3 | 32.5 | 4.5 | 15.6 | 16.2 | 29.0 |
| 39 | 7.5 | 25 | 7.5 | 61.0 | 82.4 | −1.8 | −2.9 | 3.4 | 6.1 | 29.6 | 4.5 | 14.9 | 15.5 | 33.0 |
| 40 | 10 | 25 | 7.5 | 58.8 | 81.2 | −2.0 | −4.2 | 4.7 | 5.1 | 26.9 | 4.5 | 14.4 | 15.1 | 36.2 |
| 41 | 1 | 25 | 2.5 | 65.4 | 84.7 | −1.4 | 1.8 | 2.3 | 13.4 | 43.3 | 4.4 | 17.5 | 18.0 | 21.3 |
| 42 | 2.5 | 25 | 2.5 | 62.2 | 83.0 | −1.5 | 0.3 | 1.6 | 12.3 | 41.7 | 4.5 | 17.4 | 17.9 | 25.6 |
| 43 | 5 | 25 | 2.5 | 57.5 | 80.5 | −1.8 | −2.0 | 2.7 | 10.6 | 39.0 | 4.7 | 17.3 | 18.0 | 31.9 |
| 44 | 7.5 | 25 | 2.5 | 53.7 | 78.3 | −2.1 | −4.3 | 4.7 | 9.1 | 36.3 | 5.1 | 17.4 | 18.1 | 37.2 |
| 45 | 10 | 25 | 2.5 | 50.5 | 76.4 | −2.5 | −6.3 | 6.8 | 7.8 | 33.6 | 5.5 | 17.5 | 18.4 | 41.7 |
| 46 | 1 | 30 | 5 | 67.6 | 85.8 | −0.3 | 4.3 | 4.3 | 10.4 | 38.5 | 4.3 | 18.4 | 18.9 | 22.0 |
| 47 | 2.5 | 30 | 5 | 65.2 | 84.6 | −0.6 | 2.8 | 2.9 | 9.4 | 36.7 | 4.5 | 18.1 | 18.6 | 25.5 |
| 48 | 5 | 30 | 5 | 61.8 | 82.8 | −1.2 | 0.5 | 1.3 | 7.9 | 33.8 | 4.8 | 17.6 | 18.2 | 30.3 |
| 49 | 7.5 | 30 | 5 | 59.2 | 81.4 | −1.9 | −1.5 | 2.4 | 6.6 | 30.9 | 5.1 | 17.3 | 18.0 | 34.1 |
| 50 | 10 | 30 | 5 | 57.3 | 80.3 | −2.6 | −3.1 | 4.0 | 5.5 | 28.2 | 5.5 | 17.0 | 17.9 | 37.2 |
| 51 | 1 | 30 | 7.5 | 69.2 | 86.6 | −0.1 | 3.6 | 3.6 | 8.7 | 35.5 | 5.0 | 18.4 | 19.1 | 22.1 |
| 52 | 2.5 | 30 | 7.5 | 67.2 | 85.6 | −0.5 | 2.3 | 2.4 | 7.8 | 33.6 | 5.0 | 17.8 | 18.5 | 25.0 |
| 53 | 5 | 30 | 7.5 | 64.4 | 84.2 | −1.1 | 0.4 | 1.2 | 6.5 | 30.7 | 5.0 | 17.0 | 17.7 | 29.1 |
| 54 | 7.5 | 30 | 7.5 | 62.3 | 83.1 | −1.7 | −1.2 | 2.1 | 5.4 | 27.9 | 5.1 | 16.4 | 17.1 | 32.3 |
| 55 | 10 | 30 | 7.5 | 60.6 | 82.2 | −2.3 | −2.6 | 3.4 | 4.5 | 25.3 | 5.2 | 15.9 | 16.7 | 34.9 |
| 56 | 1 | 30 | 2.5 | 65.4 | 84.7 | −0.4 | 5.2 | 5.2 | 12.3 | 41.7 | 3.6 | 18.4 | 18.8 | 22.3 |
| 57 | 2.5 | 30 | 2.5 | 62.6 | 83.2 | −0.7 | 3.4 | 3.5 | 11.2 | 40.0 | 4.0 | 18.4 | 18.9 | 26.2 |
| 58 | 5 | 30 | 2.5 | 58.6 | 81.1 | −1.3 | 0.6 | 1.4 | 9.6 | 37.1 | 4.7 | 18.5 | 19.1 | 31.8 |
| 59 | 7.5 | 30 | 2.5 | 55.5 | 79.4 | −2.0 | −1.8 | 2.7 | 8.1 | 34.2 | 5.4 | 18.5 | 19.3 | 36.4 |
| 60 | 10 | 30 | 2.5 | 53.2 | 78.0 | −2.9 | −3.8 | 4.7 | 6.8 | 31.4 | 6.1 | 18.5 | 19.4 | 40.0 |

TABLE 4

An embodiment of the MIM coating: Cr—Si—AlSi6040
Gradient Non-EC transflective

| Exp | Cr_Bottom | Si | AlSi6040_Top | Reflectance | | | | | Transmittance | | | | | A |
| --- | --- | --- | --- | --- | --- | --- | --- | --- | --- | --- | --- | --- | --- | --- |
| | | | | Yr | L* | a* | b* | C* | Yt | L* | a* | b* | C* | |
| 1 | 1 | 15 | 5 | 57.8 | 80.6 | −2.5 | −4.6 | 5.2 | 16.0 | 47.0 | 4.1 | 15.7 | 16.2 | 26.2 |
| 2 | 2.5 | 15 | 5 | 55.7 | 79.4 | −2.1 | −5.0 | 5.4 | 14.3 | 44.6 | 3.6 | 14.3 | 14.8 | 30.0 |
| 3 | 5 | 15 | 5 | 53.0 | 77.9 | −1.5 | −5.3 | 5.5 | 11.8 | 40.9 | 3.2 | 12.5 | 12.9 | 35.2 |
| 4 | 7.5 | 15 | 5 | 50.9 | 76.6 | −0.9 | −5.3 | 5.4 | 9.8 | 37.5 | 2.9 | 11.4 | 11.7 | 39.4 |
| 5 | 10 | 15 | 5 | 49.1 | 75.5 | −0.3 | −5.3 | 5.3 | 8.1 | 34.3 | 2.9 | 10.7 | 11.0 | 42.8 |
| 6 | 1 | 15 | 7.5 | 60.9 | 82.3 | −2.4 | −4.1 | 4.7 | 13.4 | 43.4 | 3.6 | 14.5 | 15.0 | 25.7 |
| 7 | 2.5 | 15 | 7.5 | 59.2 | 81.4 | −2.0 | −4.2 | 4.7 | 11.8 | 40.9 | 3.3 | 13.0 | 13.4 | 29.0 |
| 8 | 5 | 15 | 7.5 | 57.1 | 80.2 | −1.4 | −4.3 | 4.6 | 9.6 | 37.1 | 3.0 | 11.1 | 11.5 | 33.4 |
| 9 | 7.5 | 15 | 7.5 | 55.3 | 79.2 | −1.0 | −4.3 | 4.4 | 7.8 | 33.6 | 2.8 | 9.9 | 10.3 | 36.9 |
| 10 | 10 | 15 | 7.5 | 53.9 | 78.4 | −0.6 | −4.3 | 4.3 | 6.4 | 30.4 | 2.8 | 9.1 | 9.5 | 39.8 |
| 11 | 1 | 15 | 2.5 | 55.0 | 79.0 | −2.5 | −4.7 | 5.3 | 19.1 | 50.8 | 4.9 | 17.5 | 18.2 | 26.0 |
| 12 | 2.5 | 15 | 2.5 | 52.1 | 77.4 | −2.2 | −5.6 | 6.0 | 17.3 | 48.6 | 4.3 | 16.2 | 16.8 | 30.6 |
| 13 | 5 | 15 | 2.5 | 48.5 | 75.1 | −1.6 | −6.4 | 6.6 | 14.7 | 45.2 | 3.6 | 14.6 | 15.1 | 36.9 |
| 14 | 7.5 | 15 | 2.5 | 45.7 | 73.3 | −0.8 | −6.8 | 6.8 | 12.4 | 41.9 | 3.2 | 13.6 | 13.9 | 41.9 |
| 15 | 10 | 15 | 2.5 | 43.4 | 71.9 | 0.1 | −7.0 | 7.0 | 10.5 | 38.7 | 3.0 | 13.0 | 13.3 | 46.1 |
| 16 | 1 | 20 | 5 | 64.5 | 84.2 | −2.1 | −1.6 | 2.7 | 13.2 | 43.1 | 4.7 | 16.8 | 17.4 | 22.3 |
| 17 | 2.5 | 20 | 5 | 61.8 | 82.8 | −2.0 | −2.6 | 3.3 | 11.9 | 41.1 | 4.3 | 15.9 | 16.5 | 26.3 |
| 18 | 5 | 20 | 5 | 57.9 | 80.7 | −1.8 | −3.9 | 4.3 | 10.1 | 38.0 | 4.0 | 14.8 | 15.4 | 32.1 |
| 19 | 7.5 | 20 | 5 | 54.7 | 78.8 | −1.5 | −5.1 | 5.3 | 8.5 | 35.0 | 3.9 | 14.2 | 14.7 | 36.9 |
| 20 | 10 | 20 | 5 | 52.0 | 77.3 | −1.3 | −6.2 | 6.4 | 7.1 | 32.1 | 3.9 | 13.8 | 14.3 | 40.9 |
| 21 | 1 | 20 | 7.5 | 66.9 | 85.5 | −2.1 | −1.4 | 2.5 | 11.3 | 40.0 | 4.5 | 16.4 | 17.0 | 21.9 |
| 22 | 2.5 | 20 | 7.5 | 64.5 | 84.2 | −1.9 | −2.2 | 2.9 | 10.0 | 37.9 | 4.2 | 15.3 | 15.8 | 25.5 |
| 23 | 5 | 20 | 7.5 | 61.2 | 82.5 | −1.7 | −3.3 | 3.7 | 8.3 | 34.6 | 3.8 | 13.8 | 14.4 | 30.5 |
| 24 | 7.5 | 20 | 7.5 | 58.5 | 81.0 | −1.5 | −4.2 | 4.5 | 6.9 | 31.5 | 3.7 | 12.9 | 13.4 | 34.6 |
| 25 | 10 | 20 | 7.5 | 56.3 | 79.8 | −1.3 | −5.1 | 5.2 | 5.7 | 28.7 | 3.6 | 12.3 | 12.8 | 38.1 |
| 26 | 1 | 20 | 2.5 | 62.1 | 83.0 | −2.0 | −1.6 | 2.6 | 15.4 | 46.2 | 5.0 | 17.5 | 18.2 | 22.5 |
| 27 | 2.5 | 20 | 2.5 | 58.8 | 81.2 | −2.0 | −2.8 | 3.5 | 14.2 | 44.5 | 4.7 | 16.9 | 17.6 | 27.1 |
| 28 | 5 | 20 | 2.5 | 54.1 | 78.5 | −1.9 | −4.6 | 5.0 | 12.3 | 41.6 | 4.4 | 16.3 | 16.9 | 33.6 |
| 29 | 7.5 | 20 | 2.5 | 50.2 | 76.2 | −1.6 | −6.3 | 6.5 | 10.6 | 38.8 | 4.3 | 16.0 | 16.6 | 39.2 |
| 30 | 10 | 20 | 2.5 | 47.0 | 74.2 | −1.4 | −7.8 | 7.9 | 9.0 | 36.0 | 4.4 | 16.0 | 16.6 | 44.0 |
| 31 | 1 | 25 | 5 | 67.7 | 85.8 | −1.4 | 1.5 | 2.1 | 11.4 | 40.3 | 4.7 | 17.4 | 18.0 | 20.9 |
| 32 | 2.5 | 25 | 5 | 64.9 | 84.4 | −1.5 | 0.2 | 1.5 | 10.4 | 38.5 | 4.6 | 16.9 | 17.5 | 24.8 |
| 33 | 5 | 25 | 5 | 60.9 | 82.3 | −1.7 | −1.8 | 2.5 | 8.8 | 35.6 | 4.5 | 16.3 | 16.9 | 30.3 |
| 34 | 7.5 | 25 | 5 | 57.6 | 80.5 | −1.9 | −3.5 | 4.0 | 7.4 | 32.8 | 4.7 | 15.9 | 16.6 | 35.0 |
| 35 | 10 | 25 | 5 | 55.0 | 79.0 | −2.2 | −5.2 | 5.6 | 6.3 | 30.1 | 4.9 | 15.7 | 16.4 | 38.8 |
| 36 | 1 | 25 | 7.5 | 69.5 | 86.8 | −1.3 | 1.4 | 1.9 | 9.7 | 37.4 | 5.0 | 17.4 | 18.1 | 20.7 |
| 37 | 2.5 | 25 | 7.5 | 67.1 | 85.6 | −1.4 | 0.3 | 1.4 | 8.7 | 35.5 | 4.7 | 16.6 | 17.2 | 24.2 |
| 38 | 5 | 25 | 7.5 | 63.7 | 83.8 | −1.6 | −1.4 | 2.1 | 7.3 | 32.5 | 4.5 | 15.6 | 16.2 | 29.0 |
| 39 | 7.5 | 25 | 7.5 | 61.0 | 82.4 | −1.8 | −2.9 | 3.4 | 6.1 | 29.6 | 4.5 | 14.9 | 15.5 | 33.0 |
| 40 | 10 | 25 | 7.5 | 58.8 | 81.2 | −2.0 | −4.2 | 4.7 | 5.1 | 26.9 | 4.5 | 14.4 | 15.1 | 36.2 |
| 41 | 1 | 25 | 2.5 | 65.4 | 84.7 | −1.4 | 1.8 | 2.3 | 13.4 | 43.3 | 4.4 | 17.5 | 18.0 | 21.3 |
| 42 | 2.5 | 25 | 2.5 | 62.2 | 83.0 | −1.5 | 0.3 | 1.6 | 12.3 | 41.7 | 4.5 | 17.4 | 17.9 | 25.6 |
| 43 | 5 | 25 | 2.5 | 57.5 | 80.5 | −1.8 | −2.0 | 2.7 | 10.6 | 39.0 | 4.7 | 17.3 | 18.0 | 31.9 |
| 44 | 7.5 | 25 | 2.5 | 53.7 | 78.3 | −2.1 | −4.3 | 4.7 | 9.1 | 36.3 | 5.1 | 17.4 | 18.1 | 37.2 |
| 45 | 10 | 25 | 2.5 | 50.5 | 76.4 | −2.5 | −6.3 | 6.8 | 7.8 | 33.6 | 5.5 | 17.5 | 18.4 | 41.7 |
| 46 | 1 | 30 | 5 | 67.6 | 85.8 | −0.3 | 4.3 | 4.3 | 10.4 | 38.5 | 4.3 | 18.4 | 18.9 | 22.0 |
| 47 | 2.5 | 30 | 5 | 65.2 | 84.6 | −0.6 | 2.8 | 2.9 | 9.4 | 36.7 | 4.5 | 18.1 | 18.6 | 25.5 |
| 48 | 5 | 30 | 5 | 61.8 | 82.8 | −1.2 | 0.5 | 1.3 | 7.9 | 33.8 | 4.8 | 17.6 | 18.2 | 30.3 |
| 49 | 7.5 | 30 | 5 | 59.2 | 81.4 | −1.9 | −1.5 | 2.4 | 6.6 | 30.9 | 5.1 | 17.3 | 18.0 | 34.1 |
| 50 | 10 | 30 | 5 | 57.3 | 80.3 | −2.6 | −3.1 | 4.0 | 5.5 | 28.2 | 5.5 | 17.0 | 17.9 | 37.2 |
| 51 | 1 | 30 | 7.5 | 69.2 | 86.6 | −0.1 | 3.6 | 3.6 | 8.7 | 35.5 | 5.0 | 18.4 | 19.1 | 22.1 |
| 52 | 2.5 | 30 | 7.5 | 67.2 | 85.6 | −0.5 | 2.3 | 2.4 | 7.8 | 33.6 | 5.0 | 17.8 | 18.5 | 25.0 |
| 53 | 5 | 30 | 7.5 | 64.4 | 84.2 | −1.1 | 0.4 | 1.2 | 6.5 | 30.7 | 5.0 | 17.0 | 17.7 | 29.1 |
| 54 | 7.5 | 30 | 7.5 | 62.3 | 83.1 | −1.7 | −1.2 | 2.1 | 5.4 | 27.9 | 5.1 | 16.4 | 17.1 | 32.3 |
| 55 | 10 | 30 | 7.5 | 60.6 | 82.2 | −2.3 | −2.6 | 3.4 | 4.5 | 25.3 | 5.2 | 15.9 | 16.7 | 34.9 |
| 56 | 1 | 30 | 2.5 | 65.4 | 84.7 | −0.4 | 5.2 | 5.2 | 12.3 | 41.7 | 3.6 | 18.4 | 18.8 | 22.3 |
| 57 | 2.5 | 30 | 2.5 | 62.6 | 83.2 | −0.7 | 3.4 | 3.5 | 11.2 | 40.0 | 4.0 | 18.4 | 18.9 | 26.2 |
| 58 | 5 | 30 | 2.5 | 58.6 | 81.1 | −1.3 | 0.6 | 1.4 | 9.6 | 37.1 | 4.7 | 18.5 | 19.1 | 31.8 |
| 59 | 7.5 | 30 | 2.5 | 55.5 | 79.4 | −2.0 | −1.8 | 2.7 | 8.1 | 34.2 | 5.4 | 18.5 | 19.3 | 36.4 |
| 60 | 10 | 30 | 2.5 | 53.2 | 78.0 | −2.9 | −3.8 | 4.7 | 6.8 | 31.4 | 6.1 | 18.5 | 19.4 | 40.0 |

TABLE 5

An embodiment of the MIM coating: Ru—Si—AlSi6040
Gradient Non-EC transflective

|  |  |  |  | Reflectance | | | | | Transmittance | | | | | |
| --- | --- | --- | --- | --- | --- | --- | --- | --- | --- | --- | --- | --- | --- | --- |
| Exp | Ru_Bottom | Si | AlSi6040_Top | Yr | L* | a* | b* | C* | Yt | L* | a* | b* | C* | A |
| 1 | 1 | 15 | 5 | 57.8 | 80.6 | −2.5 | −4.6 | 5.2 | 16.0 | 47.0 | 4.1 | 15.7 | 16.2 | 26.2 |
| 2 | 2.5 | 15 | 5 | 55.7 | 79.4 | −2.1 | −5.0 | 5.4 | 14.3 | 44.6 | 3.6 | 14.3 | 14.8 | 30.0 |
| 3 | 5 | 15 | 5 | 53.0 | 77.9 | −1.5 | −5.3 | 5.5 | 11.8 | 40.9 | 3.2 | 12.5 | 12.9 | 35.2 |
| 4 | 7.5 | 15 | 5 | 50.9 | 76.6 | −0.9 | −5.3 | 5.4 | 9.8 | 37.5 | 2.9 | 11.4 | 11.7 | 39.4 |
| 5 | 10 | 15 | 5 | 49.1 | 75.5 | −0.3 | −5.3 | 5.3 | 8.1 | 34.3 | 2.9 | 10.7 | 11.0 | 42.8 |
| 6 | 1 | 15 | 7.5 | 60.9 | 82.3 | −2.4 | −4.1 | 4.7 | 13.4 | 43.4 | 3.6 | 14.5 | 15.0 | 25.7 |
| 7 | 2.5 | 15 | 7.5 | 59.2 | 81.4 | −2.0 | −4.2 | 4.7 | 11.8 | 40.9 | 3.3 | 13.0 | 13.4 | 29.0 |
| 8 | 5 | 15 | 7.5 | 57.1 | 80.2 | −1.4 | −4.3 | 4.6 | 9.6 | 37.1 | 3.0 | 11.1 | 11.5 | 33.4 |
| 9 | 7.5 | 15 | 7.5 | 55.3 | 79.2 | −1.0 | −4.3 | 4.4 | 7.8 | 33.6 | 2.8 | 9.9 | 10.3 | 36.9 |
| 10 | 10 | 15 | 7.5 | 53.9 | 78.4 | −0.6 | −4.3 | 4.3 | 6.4 | 30.4 | 2.8 | 9.1 | 9.5 | 39.8 |
| 11 | 1 | 15 | 2.5 | 55.0 | 79.0 | −2.5 | −4.7 | 5.3 | 19.1 | 50.8 | 4.9 | 17.5 | 18.2 | 26.0 |
| 12 | 2.5 | 15 | 2.5 | 52.1 | 77.4 | −2.2 | −5.6 | 6.0 | 17.3 | 48.6 | 4.3 | 16.2 | 16.8 | 30.6 |
| 13 | 5 | 15 | 2.5 | 48.5 | 75.1 | −1.6 | −6.4 | 6.6 | 14.7 | 45.2 | 3.6 | 14.6 | 15.1 | 36.9 |
| 14 | 7.5 | 15 | 2.5 | 45.7 | 73.3 | −0.8 | −6.8 | 6.8 | 12.4 | 41.9 | 3.2 | 13.6 | 13.9 | 41.9 |
| 15 | 10 | 15 | 2.5 | 43.4 | 71.9 | 0.1 | −7.0 | 7.0 | 10.5 | 38.7 | 3.0 | 13.0 | 13.3 | 46.1 |
| 16 | 1 | 20 | 5 | 64.5 | 84.2 | −2.1 | −1.6 | 2.7 | 13.2 | 43.1 | 4.7 | 16.8 | 17.4 | 22.3 |
| 17 | 2.5 | 20 | 5 | 61.8 | 82.8 | −2.0 | −2.6 | 3.3 | 11.9 | 41.1 | 4.3 | 15.9 | 16.5 | 26.3 |
| 18 | 5 | 20 | 5 | 57.9 | 80.7 | −1.8 | −3.9 | 4.3 | 10.1 | 38.0 | 4.0 | 14.8 | 15.4 | 32.1 |
| 19 | 7.5 | 20 | 5 | 54.7 | 78.8 | −1.5 | −5.1 | 5.3 | 8.5 | 35.0 | 3.9 | 14.2 | 14.7 | 36.9 |
| 20 | 10 | 20 | 5 | 52.0 | 77.3 | −1.3 | −6.2 | 6.4 | 7.1 | 32.1 | 3.9 | 13.8 | 14.3 | 40.9 |
| 21 | 1 | 20 | 7.5 | 66.9 | 85.5 | −2.1 | −1.4 | 2.5 | 11.3 | 40.0 | 4.5 | 16.4 | 17.0 | 21.9 |
| 22 | 2.5 | 20 | 7.5 | 64.5 | 84.2 | −1.9 | −2.2 | 2.9 | 10.0 | 37.9 | 4.2 | 15.3 | 15.8 | 25.5 |
| 23 | 5 | 20 | 7.5 | 61.2 | 82.5 | −1.7 | −3.3 | 3.7 | 8.3 | 34.6 | 3.8 | 13.8 | 14.4 | 30.5 |
| 24 | 7.5 | 20 | 7.5 | 58.5 | 81.0 | −1.5 | −4.2 | 4.5 | 6.9 | 31.5 | 3.7 | 12.9 | 13.4 | 34.6 |
| 25 | 10 | 20 | 7.5 | 56.3 | 79.8 | −1.3 | −5.1 | 5.2 | 5.7 | 28.7 | 3.6 | 12.3 | 12.8 | 38.1 |
| 26 | 1 | 20 | 2.5 | 62.1 | 83.0 | −2.0 | −1.6 | 2.6 | 15.4 | 46.2 | 5.0 | 17.5 | 18.2 | 22.5 |
| 27 | 2.5 | 20 | 2.5 | 58.8 | 81.2 | −2.0 | −2.8 | 3.5 | 14.2 | 44.5 | 4.7 | 16.9 | 17.6 | 27.1 |
| 28 | 5 | 20 | 2.5 | 54.1 | 78.5 | −1.9 | −4.6 | 5.0 | 12.3 | 41.6 | 4.4 | 16.3 | 16.9 | 33.6 |
| 29 | 7.5 | 20 | 2.5 | 50.2 | 76.2 | −1.6 | −6.3 | 6.5 | 10.6 | 38.8 | 4.3 | 16.0 | 16.6 | 39.2 |
| 30 | 10 | 20 | 2.5 | 47.0 | 74.2 | −1.4 | −7.8 | 7.9 | 9.0 | 36.0 | 4.4 | 16.0 | 16.6 | 44.0 |
| 31 | 1 | 25 | 5 | 67.7 | 85.8 | −1.4 | 1.5 | 2.1 | 11.4 | 40.3 | 4.7 | 17.4 | 18.0 | 20.9 |
| 32 | 2.5 | 25 | 5 | 64.9 | 84.4 | −1.5 | 0.2 | 1.5 | 10.4 | 38.5 | 4.6 | 16.9 | 17.5 | 24.8 |
| 33 | 5 | 25 | 5 | 60.9 | 82.3 | −1.7 | −1.8 | 2.5 | 8.8 | 35.6 | 4.5 | 16.3 | 16.9 | 30.3 |
| 34 | 7.5 | 25 | 5 | 57.6 | 80.5 | −1.9 | −3.5 | 4.0 | 7.4 | 32.8 | 4.7 | 15.9 | 16.6 | 35.0 |
| 35 | 10 | 25 | 5 | 55.0 | 79.0 | −2.2 | −5.2 | 5.6 | 6.3 | 30.1 | 4.9 | 15.7 | 16.4 | 38.8 |
| 36 | 1 | 25 | 7.5 | 69.5 | 86.8 | −1.3 | 1.4 | 1.9 | 9.7 | 37.4 | 5.0 | 17.4 | 18.1 | 20.7 |
| 37 | 2.5 | 25 | 7.5 | 67.1 | 85.6 | −1.4 | 0.3 | 1.4 | 8.7 | 35.5 | 4.7 | 16.6 | 17.2 | 24.2 |
| 38 | 5 | 25 | 7.5 | 63.7 | 83.8 | −1.6 | −1.4 | 2.1 | 7.3 | 32.5 | 4.5 | 15.6 | 16.2 | 29.0 |
| 39 | 7.5 | 25 | 7.5 | 61.0 | 82.4 | −1.8 | −2.9 | 3.4 | 6.1 | 29.6 | 4.5 | 14.9 | 15.5 | 33.0 |
| 40 | 10 | 25 | 7.5 | 58.8 | 81.2 | −2.0 | −4.2 | 4.7 | 5.1 | 26.9 | 4.5 | 14.4 | 15.1 | 36.2 |
| 41 | 1 | 25 | 2.5 | 65.4 | 84.7 | −1.4 | 1.8 | 2.3 | 13.4 | 43.3 | 4.4 | 17.5 | 18.0 | 21.3 |
| 42 | 2.5 | 25 | 2.5 | 62.2 | 83.0 | −1.5 | 0.3 | 1.6 | 12.3 | 41.7 | 4.5 | 17.4 | 17.9 | 25.6 |
| 43 | 5 | 25 | 2.5 | 57.5 | 80.5 | −1.8 | −2.0 | 2.7 | 10.6 | 39.0 | 4.7 | 17.3 | 18.0 | 31.9 |
| 44 | 7.5 | 25 | 2.5 | 53.7 | 78.3 | −2.1 | −4.3 | 4.7 | 9.1 | 36.3 | 5.1 | 17.4 | 18.1 | 37.2 |
| 45 | 10 | 25 | 2.5 | 50.5 | 76.4 | −2.5 | −6.3 | 6.8 | 7.8 | 33.6 | 5.5 | 17.5 | 18.4 | 41.7 |
| 46 | 1 | 30 | 5 | 67.6 | 85.8 | −0.3 | 4.3 | 4.3 | 10.4 | 38.5 | 4.3 | 18.4 | 18.9 | 22.0 |
| 47 | 2.5 | 30 | 5 | 65.2 | 84.6 | −0.6 | 2.8 | 2.9 | 9.4 | 36.7 | 4.5 | 18.1 | 18.6 | 25.5 |
| 48 | 5 | 30 | 5 | 61.8 | 82.8 | −1.2 | 0.5 | 1.3 | 7.9 | 33.8 | 4.8 | 17.6 | 18.2 | 30.3 |
| 49 | 7.5 | 30 | 5 | 59.2 | 81.4 | −1.9 | −1.5 | 2.4 | 6.6 | 30.9 | 5.1 | 17.3 | 18.0 | 34.1 |
| 50 | 10 | 30 | 5 | 57.3 | 80.3 | −2.6 | −3.1 | 4.0 | 5.5 | 28.2 | 5.5 | 17.0 | 17.9 | 37.2 |
| 51 | 1 | 30 | 7.5 | 69.2 | 86.6 | −0.1 | 3.6 | 3.6 | 8.7 | 35.5 | 5.0 | 18.4 | 19.1 | 22.1 |
| 52 | 2.5 | 30 | 7.5 | 67.2 | 85.6 | −0.5 | 2.3 | 2.4 | 7.8 | 33.6 | 5.0 | 17.8 | 18.5 | 25.0 |
| 53 | 5 | 30 | 7.5 | 64.4 | 84.2 | −1.1 | 0.4 | 1.2 | 6.5 | 30.7 | 5.0 | 17.0 | 17.7 | 29.1 |
| 54 | 7.5 | 30 | 7.5 | 62.3 | 83.1 | −1.7 | −1.2 | 2.1 | 5.4 | 27.9 | 5.1 | 16.4 | 17.1 | 32.3 |
| 55 | 10 | 30 | 7.5 | 60.6 | 82.2 | −2.3 | −2.6 | 3.4 | 4.5 | 25.3 | 5.2 | 15.9 | 16.7 | 34.9 |
| 56 | 1 | 30 | 2.5 | 65.4 | 84.7 | −0.4 | 5.2 | 5.2 | 12.3 | 41.7 | 3.6 | 18.4 | 18.8 | 22.3 |
| 57 | 2.5 | 30 | 2.5 | 62.6 | 83.2 | −0.7 | 3.4 | 3.5 | 11.2 | 40.0 | 4.0 | 18.4 | 18.9 | 26.2 |
| 58 | 5 | 30 | 2.5 | 58.6 | 81.1 | −1.3 | 0.6 | 1.4 | 9.6 | 37.1 | 4.7 | 18.5 | 19.1 | 31.8 |
| 59 | 7.5 | 30 | 2.5 | 55.5 | 79.4 | −2.0 | −1.8 | 2.7 | 8.1 | 34.2 | 5.4 | 18.5 | 19.3 | 36.4 |
| 60 | 10 | 30 | 2.5 | 53.2 | 78.0 | −2.9 | −3.8 | 4.7 | 6.8 | 31.4 | 6.1 | 18.5 | 19.4 | 40.0 |

TABLE 6

An embodiment of the Cr-ITO-Cr coating:
Gradient Non-EC transflective

| | | | | Reflectance | | | | | Transmittance | | | | | |
|---|---|---|---|---|---|---|---|---|---|---|---|---|---|---|
| Exp | Cr_Bottom | ITO | Cr_Top | Yr | L* | a* | b* | C* | Yt | L* | a* | b* | C* | A |
| 1 | 1 | 50 | 2.5 | 23.29 | 55.37 | 0.27 | −4.42 | 4.4 | 46.16 | 73.65 | 0.6 | −4.03 | 4.1 | 30.55 |
| 2 | 2.5 | 50 | 2.5 | 18.12 | 49.64 | 2.75 | −2.75 | 3.9 | 37.66 | 67.77 | 1.25 | −7.14 | 7.2 | 44.22 |
| 3 | 5 | 50 | 2.5 | 13.17 | 43.02 | 6.09 | 2.71 | 6.7 | 27.61 | 59.53 | 2.3 | −10.2 | 10.5 | 59.22 |
| 4 | 7.5 | 50 | 2.5 | 10.64 | 38.96 | 8.5 | 9.71 | 12.9 | 20.82 | 52.75 | 3.12 | −11.6 | 12.0 | 68.55 |
| 5 | 10 | 50 | 2.5 | 9.26 | 36.48 | 10.24 | 16.68 | 19.6 | 16.03 | 47.02 | 3.7 | −11.9 | 12.5 | 74.71 |
| 6 | 1 | 50 | 5 | 32.07 | 63.4 | −0.58 | −1.92 | 2.0 | 32.37 | 63.65 | 1.53 | −6.78 | 7.0 | 35.56 |
| 7 | 2.5 | 50 | 5 | 28.11 | 59.98 | 0.4 | 0.53 | 0.7 | 25.37 | 57.44 | 2.75 | −9.94 | 10.3 | 46.52 |
| 8 | 5 | 50 | 5 | 24.08 | 56.16 | 1.04 | 5.39 | 5.5 | 17.69 | 49.12 | 4.27 | −12.7 | 13.4 | 58.23 |
| 9 | 7.5 | 50 | 5 | 21.7 | 53.7 | 1.07 | 10.03 | 10.1 | 12.87 | 42.56 | 5.22 | −13.7 | 14.7 | 65.44 |
| 10 | 10 | 50 | 5 | 20.12 | 51.97 | 0.9 | 13.96 | 14.0 | 9.64 | 37.19 | 5.76 | −13.7 | 14.9 | 70.24 |
| 11 | 1 | 50 | 7.5 | 39.78 | 69.31 | −1.07 | −1.03 | 1.5 | 23.64 | 55.73 | 2.22 | −7.85 | 8.2 | 36.58 |
| 12 | 2.5 | 50 | 7.5 | 36.66 | 67.02 | −0.66 | 1.02 | 1.2 | 18 | 49.5 | 3.67 | −10.8 | 11.4 | 45.34 |
| 13 | 5 | 50 | 7.5 | 33.41 | 64.49 | −0.72 | 4.47 | 4.5 | 12.13 | 41.42 | 5.26 | −13.2 | 14.2 | 54.46 |
| 14 | 7.5 | 50 | 7.5 | 31.39 | 62.84 | −1.1 | 7.34 | 7.4 | 8.61 | 35.22 | 6.11 | −13.8 | 15.1 | 60 |
| 15 | 10 | 50 | 7.5 | 30 | 61.65 | −1.53 | 9.57 | 9.7 | 6.34 | 30.25 | 6.52 | −13.6 | 15.1 | 63.66 |
| 16 | 1 | 60 | 2.5 | 25.01 | 57.08 | −0.41 | −4.91 | 4.9 | 45.81 | 73.42 | 0.54 | −3.3 | 3.3 | 29.18 |
| 17 | 2.5 | 60 | 2.5 | 18.81 | 50.47 | 2.4 | −8.04 | 8.4 | 37.77 | 67.85 | 0.82 | −5.97 | 6.0 | 43.42 |
| 18 | 5 | 60 | 2.5 | 12.26 | 41.63 | 7.7 | −12.4 | 14.6 | 28.08 | 59.96 | 1.4 | −8.63 | 8.7 | 59.65 |
| 19 | 7.5 | 60 | 2.5 | 8.45 | 34.9 | 13.51 | −16.8 | 21.6 | 21.41 | 53.39 | 1.93 | −9.81 | 10.0 | 70.14 |
| 20 | 10 | 60 | 2.5 | 6.14 | 29.76 | 19.53 | −21.6 | 29.2 | 16.62 | 47.78 | 2.34 | −10.0 | 10.3 | 77.24 |
| 21 | 1 | 60 | 5 | 33.58 | 64.63 | −0.91 | −2.82 | 3.0 | 32.37 | 63.65 | 1.21 | −5.72 | 5.8 | 34.05 |
| 22 | 2.5 | 60 | 5 | 28.5 | 60.34 | 0.67 | −3.45 | 3.5 | 25.72 | 57.77 | 2.02 | −9.34 | 9.6 | 45.78 |
| 23 | 5 | 60 | 5 | 22.91 | 54.98 | 2.71 | −3.04 | 4.1 | 18.23 | 49.78 | 3.28 | −12.8 | 13.2 | 58.85 |
| 24 | 7.5 | 60 | 5 | 19.38 | 51.12 | 4.18 | −2.03 | 4.6 | 13.42 | 43.39 | 4.21 | −14.3 | 15.0 | 67.2 |
| 25 | 10 | 60 | 5 | 16.97 | 48.23 | 5.32 | −1.12 | 5.4 | 10.15 | 38.11 | 4.82 | −14.7 | 15.5 | 72.88 |
| 26 | 1 | 60 | 7.5 | 41.03 | 70.19 | −1.23 | −1.9 | 2.3 | 23.78 | 55.86 | 1.75 | −6.64 | 6.9 | 35.2 |
| 27 | 2.5 | 60 | 7.5 | 36.94 | 67.23 | −0.32 | −1.83 | 1.9 | 18.38 | 49.95 | 2.87 | −10.6 | 11.0 | 44.68 |
| 28 | 5 | 60 | 7.5 | 32.4 | 63.67 | 0.5 | −0.51 | 0.7 | 12.6 | 42.16 | 4.47 | −14.3 | 15.0 | 55 |
| 29 | 7.5 | 60 | 7.5 | 29.48 | 61.2 | 0.8 | 1.24 | 1.5 | 9.06 | 36.1 | 5.55 | −15.8 | 16.8 | 61.46 |
| 30 | 10 | 60 | 7.5 | 27.45 | 59.38 | 0.87 | 2.88 | 3.0 | 6.73 | 31.19 | 6.21 | −16.2 | 17.4 | 65.82 |
| 31 | 1 | 80 | 2.5 | 26.93 | 58.91 | −2.35 | −0.67 | 2.4 | 45.16 | 72.99 | 0.95 | −3.2 | 3.3 | 27.92 |
| 32 | 2.5 | 80 | 2.5 | 22.54 | 54.6 | −2.06 | −9.79 | 10.0 | 37.44 | 67.6 | 0.72 | −4.02 | 4.1 | 40.02 |
| 33 | 5 | 80 | 2.5 | 18.16 | 49.69 | −1.32 | −22.4 | 22.4 | 28.04 | 59.93 | 0.57 | −4.54 | 4.6 | 53.8 |
| 34 | 7.5 | 80 | 2.5 | 15.99 | 46.97 | −0.69 | −31.8 | 31.8 | 21.49 | 53.48 | 0.58 | −4.4 | 4.4 | 62.52 |
| 35 | 10 | 80 | 2.5 | 15.11 | 45.78 | −0.39 | −38.3 | 38.4 | 16.74 | 47.93 | 0.69 | −3.86 | 3.9 | 68.15 |
| 36 | 1 | 80 | 5 | 35.42 | 66.07 | −2.31 | −0.33 | 2.3 | 31.97 | 63.32 | 1.28 | −4.23 | 4.4 | 32.61 |
| 37 | 2.5 | 80 | 5 | 31.46 | 62.9 | −1.66 | −6.41 | 6.6 | 26.21 | 58.24 | 0.76 | −6.73 | 6.8 | 42.32 |
| 38 | 5 | 80 | 5 | 26.83 | 58.82 | 0.1 | −14.9 | 15.0 | 19.35 | 51.1 | 0.47 | −9.2 | 9.2 | 53.81 |
| 39 | 7.5 | 80 | 5 | 23.83 | 55.92 | 2.09 | −22 | 22.1 | 14.68 | 45.19 | 0.46 | −10.2 | 10.3 | 61.49 |
| 40 | 10 | 80 | 5 | 21.88 | 53.9 | 3.95 | −27.7 | 28.0 | 11.35 | 40.17 | 0.53 | −10.4 | 10.4 | 66.76 |
| 41 | 1 | 80 | 7.5 | 42.57 | 71.26 | −2.24 | −0.24 | 2.3 | 23.52 | 55.6 | 1.56 | −4.34 | 4.6 | 33.91 |
| 42 | 2.5 | 80 | 7.5 | 39.3 | 68.97 | −1.68 | −4.52 | 4.8 | 19.12 | 50.82 | 0.97 | −7.81 | 7.9 | 41.58 |
| 43 | 5 | 80 | 7.5 | 35.23 | 65.93 | −0.08 | −10.3 | 10.4 | 13.96 | 44.17 | 0.82 | −11.46 | 11.5 | 50.81 |
| 44 | 7.5 | 80 | 7.5 | 32.39 | 63.66 | 1.74 | −15.1 | 15.2 | 10.5 | 38.73 | 1.03 | −13.3 | 13.3 | 57.11 |
| 45 | 10 | 25 | 7.5 | 42.83 | 71.44 | −1.88 | 5.18 | 5.5 | 6.49 | 30.62 | 5.25 | −6.07 | 8.0 | 50.68 |
| 46 | 1 | 70 | 2.5 | 26.31 | 58.33 | −1.37 | −3.55 | 3.8 | 45.45 | 73.19 | 0.67 | −3 | 3.1 | 28.24 |
| 47 | 2.5 | 70 | 2.5 | 20.42 | 52.31 | 0.58 | −10.5 | 10.5 | 37.69 | 67.79 | 0.61 | −4.82 | 4.9 | 41.89 |
| 48 | 5 | 70 | 2.5 | 14.1 | 44.38 | 4.6 | −21.46 | 21.9 | 28.24 | 60.1 | 0.73 | −6.49 | 6.5 | 57.66 |
| 49 | 7.5 | 70 | 2.5 | 10.43 | 38.61 | 9.03 | −31.38 | 32.7 | 21.65 | 53.65 | 0.92 | −7.06 | 7.1 | 67.92 |
| 50 | 10 | 70 | 2.5 | 8.3 | 34.61 | 13.24 | −39.86 | 42.0 | 16.87 | 48.1 | 1.13 | −6.94 | 7.0 | 74.82 |
| 51 | 1 | 70 | 5 | 34.78 | 65.58 | −1.57 | −2.22 | 2.7 | 32.23 | 63.53 | 1.12 | −4.78 | 4.9 | 32.99 |
| 52 | 2.5 | 70 | 5 | 29.72 | 61.41 | −0.07 | −6.07 | 6.1 | 26.02 | 58.05 | 1.27 | −8.16 | 8.3 | 44.26 |
| 53 | 5 | 70 | 5 | 23.88 | 55.97 | 2.69 | −11.1 | 11.5 | 18.83 | 50.49 | 1.85 | −11.5 | 11.7 | 57.29 |
| 54 | 7.5 | 70 | 5 | 20.06 | 51.91 | 5.39 | −15.4 | 16.3 | 14.07 | 44.34 | 2.42 | −13.1 | 13.4 | 65.86 |
| 55 | 10 | 70 | 5 | 17.46 | 48.84 | 7.9 | −19.2 | 20.8 | 10.77 | 39.18 | 2.84 | −13.5 | 13.9 | 71.77 |
| 56 | 1 | 70 | 7.5 | 42.04 | 70.9 | −1.69 | −1.58 | 2.3 | 23.73 | 55.81 | 1.5 | −5.33 | 5.5 | 34.24 |
| 57 | 2.5 | 70 | 7.5 | 37.89 | 67.94 | −0.65 | −3.98 | 4.0 | 18.78 | 50.43 | 1.85 | −9.54 | 9.7 | 43.33 |
| 58 | 5 | 70 | 7.5 | 33 | 64.16 | 1.09 | −6.53 | 6.6 | 13.26 | 43.15 | 2.85 | −13.8 | 14.1 | 53.74 |
| 59 | 7.5 | 70 | 7.5 | 29.71 | 61.4 | 2.59 | −8.16 | 8.6 | 9.73 | 37.36 | 3.78 | −15.8 | 16.3 | 60.56 |
| 60 | 10 | 70 | 7.5 | 27.4 | 59.34 | 3.85 | −9.44 | 10.2 | 7.35 | 32.59 | 4.44 | −16.6 | 17.2 | 65.26 |

TABLE 7

An embodiment of the Cr—TiO$_2$—Cr coating:
Gradient Non-EC Transflective

| Exp | Cr_Bottom | TiO2 | Cr_Top | Yr | L* | a* | b* | C* | Yt | L* | a* | b* | C* | A |
|---|---|---|---|---|---|---|---|---|---|---|---|---|---|---|
| 1 | 1 | 50 | 2.5 | 24.2 | 56.3 | 0.9 | −13.6 | 13.7 | 45.0 | 72.9 | 0.2 | 0.4 | 0.5 | 30.9 |
| 2 | 2.5 | 50 | 2.5 | 28.8 | 60.6 | 0.9 | −10.6 | 10.6 | 36.5 | 66.9 | 0.4 | −2.7 | 2.8 | 34.7 |
| 3 | 5 | 50 | 2.5 | 36.6 | 67.0 | 0.4 | −7.1 | 7.1 | 26.5 | 58.5 | 1.0 | −5.9 | 6.0 | 36.9 |
| 4 | 7.5 | 50 | 2.5 | 43.4 | 71.8 | −0.1 | −5.1 | 5.1 | 19.9 | 51.7 | 1.5 | −7.5 | 7.6 | 36.7 |
| 5 | 10 | 50 | 2.5 | 49.2 | 75.5 | −0.5 | −4.0 | 4.0 | 15.3 | 46.0 | 2.0 | −8.0 | 8.2 | 35.6 |
| 6 | 1 | 50 | 5 | 15.4 | 46.1 | 6.1 | −24.5 | 25.3 | 36.6 | 66.9 | −0.3 | −0.2 | 0.3 | 48.1 |
| 7 | 2.5 | 50 | 5 | 20.6 | 52.5 | 5.3 | −17.0 | 17.8 | 28.6 | 60.4 | 0.4 | −4.8 | 4.8 | 50.8 |
| 8 | 5 | 50 | 5 | 29.7 | 61.4 | 3.1 | −9.5 | 10.0 | 19.9 | 51.7 | 1.7 | −9.5 | 9.6 | 50.4 |
| 9 | 7.5 | 50 | 5 | 37.8 | 67.9 | 1.6 | −5.9 | 6.1 | 14.4 | 44.8 | 2.7 | −11.7 | 12.0 | 47.8 |
| 10 | 10 | 50 | 5 | 44.6 | 72.6 | 0.6 | −4.2 | 4.3 | 10.8 | 39.2 | 3.5 | −12.6 | 13.1 | 44.6 |
| 11 | 1 | 50 | 7.5 | 10.1 | 38.0 | 12.9 | −35.9 | 38.1 | 29.9 | 61.6 | −0.5 | −0.1 | 0.5 | 60.0 |
| 12 | 2.5 | 50 | 7.5 | 15.3 | 46.0 | 10.3 | −23.5 | 25.7 | 22.7 | 54.8 | 0.5 | −5.8 | 5.8 | 62.0 |
| 13 | 5 | 50 | 7.5 | 25.1 | 57.2 | 5.6 | −11.2 | 12.6 | 15.3 | 46.0 | 2.3 | −11.3 | 11.5 | 59.7 |
| 14 | 7.5 | 50 | 7.5 | 34.0 | 65.0 | 2.8 | −6.0 | 6.6 | 10.8 | 39.2 | 3.7 | −13.9 | 14.4 | 55.2 |
| 15 | 10 | 50 | 7.5 | 41.5 | 70.5 | 1.2 | −3.9 | 4.0 | 7.9 | 33.8 | 4.7 | −15.0 | 15.7 | 50.6 |
| 16 | 1 | 60 | 2.5 | 27.0 | 58.9 | −2.0 | −10.2 | 10.3 | 43.7 | 72.0 | 1.2 | −0.3 | 1.2 | 29.3 |
| 17 | 2.5 | 60 | 2.5 | 31.6 | 63.0 | −1.5 | −8.4 | 8.5 | 35.8 | 66.3 | 0.9 | −2.5 | 2.6 | 32.7 |
| 18 | 5 | 60 | 2.5 | 39.0 | 68.8 | −1.4 | −6.1 | 6.3 | 26.3 | 58.3 | 0.9 | −4.5 | 4.6 | 34.7 |
| 19 | 7.5 | 60 | 2.5 | 45.5 | 73.2 | −1.4 | −4.7 | 4.9 | 19.9 | 51.7 | 1.0 | −5.4 | 5.5 | 34.6 |
| 20 | 10 | 60 | 2.5 | 50.8 | 76.6 | −1.5 | −3.6 | 3.9 | 15.3 | 46.1 | 1.2 | −5.5 | 5.6 | 33.8 |
| 21 | 1 | 60 | 5 | 20.1 | 52.0 | −1.4 | −23.5 | 23.5 | 35.0 | 65.8 | 1.1 | 1.4 | 1.7 | 44.9 |
| 22 | 2.5 | 60 | 5 | 24.6 | 56.7 | 0.3 | −19.1 | 19.1 | 28.1 | 59.9 | 0.6 | −2.6 | 2.7 | 47.3 |
| 23 | 5 | 60 | 5 | 32.7 | 63.9 | 0.7 | −13.3 | 13.3 | 20.1 | 51.9 | 0.6 | −6.8 | 6.8 | 47.2 |
| 24 | 7.5 | 60 | 5 | 40.2 | 69.6 | 0.3 | −9.6 | 9.6 | 14.9 | 45.5 | 0.9 | −9.0 | 9.0 | 44.9 |
| 25 | 10 | 60 | 5 | 46.5 | 73.9 | −0.2 | −7.4 | 7.4 | 11.3 | 40.1 | 1.3 | −9.9 | 10.0 | 42.2 |
| 26 | 1 | 60 | 7.5 | 16.6 | 47.8 | −1.6 | −34.2 | 34.2 | 28.2 | 60.1 | 1.2 | 3.0 | 3.2 | 55.2 |
| 27 | 2.5 | 60 | 7.5 | 20.3 | 52.2 | 2.0 | −28.4 | 28.5 | 22.3 | 54.3 | 0.5 | −2.3 | 2.3 | 57.4 |
| 28 | 5 | 60 | 7.5 | 28.4 | 60.3 | 2.9 | −19.5 | 19.7 | 15.6 | 46.5 | 0.6 | −7.9 | 7.9 | 55.9 |
| 29 | 7.5 | 60 | 7.5 | 36.4 | 66.9 | 2.1 | −13.8 | 13.9 | 11.4 | 40.3 | 1.2 | −10.9 | 11.0 | 52.2 |
| 30 | 10 | 60 | 7.5 | 43.4 | 71.8 | 1.3 | −10.3 | 10.3 | 8.6 | 35.2 | 1.7 | −12.4 | 12.5 | 48.1 |
| 31 | 1 | 70 | 2.5 | 28.4 | 60.3 | −4.5 | −3.4 | 5.7 | 43.0 | 71.6 | 2.3 | −2.9 | 3.6 | 28.6 |
| 32 | 2.5 | 70 | 2.5 | 33.2 | 64.3 | −3.9 | −2.9 | 4.9 | 35.2 | 65.9 | 1.8 | −3.7 | 4.1 | 31.6 |
| 33 | 5 | 70 | 2.5 | 40.6 | 69.9 | −3.3 | −2.2 | 4.0 | 26.0 | 58.0 | 1.5 | −4.3 | 4.5 | 33.5 |
| 34 | 7.5 | 70 | 2.5 | 46.8 | 74.1 | −2.9 | −1.7 | 3.4 | 19.7 | 51.5 | 1.3 | −4.2 | 4.3 | 33.6 |
| 35 | 10 | 70 | 2.5 | 51.9 | 77.2 | −2.6 | −1.3 | 2.9 | 15.2 | 45.9 | 1.3 | −3.7 | 3.9 | 33.0 |
| 36 | 1 | 70 | 5 | 25.4 | 57.5 | −7.3 | −16.2 | 17.8 | 33.2 | 64.3 | 2.9 | 0.2 | 2.9 | 41.4 |
| 37 | 2.5 | 70 | 5 | 29.6 | 61.3 | −5.2 | −14.4 | 15.3 | 27.2 | 59.2 | 1.7 | −2.3 | 2.8 | 43.3 |
| 38 | 5 | 70 | 5 | 36.9 | 67.2 | −3.4 | −11.1 | 11.6 | 20.0 | 51.9 | 0.6 | −4.8 | 4.8 | 43.1 |
| 39 | 7.5 | 70 | 5 | 43.6 | 71.9 | −2.7 | −8.5 | 8.9 | 15.1 | 45.8 | 0.0 | −5.9 | 5.9 | 41.3 |
| 40 | 10 | 70 | 5 | 49.3 | 75.6 | −2.5 | −6.6 | 7.0 | 11.7 | 40.7 | −0.2 | −6.2 | 6.2 | 39.1 |
| 41 | 1 | 70 | 7.5 | 25.1 | 57.2 | −10.2 | −24.0 | 26.1 | 26.0 | 58.0 | 3.5 | 2.4 | 4.2 | 48.9 |
| 42 | 2.5 | 70 | 7.5 | 28.0 | 59.9 | −6.7 | −22.4 | 23.4 | 21.3 | 53.3 | 1.7 | −0.9 | 1.9 | 50.7 |
| 43 | 5 | 70 | 7.5 | 34.6 | 65.4 | −3.4 | −18.1 | 18.4 | 15.7 | 46.6 | 0.0 | −4.6 | 4.6 | 49.7 |
| 44 | 7.5 | 70 | 7.5 | 41.3 | 70.4 | −2.3 | −14.1 | 14.3 | 11.9 | 41.0 | −0.7 | −6.6 | 6.6 | 46.8 |
| 45 | 10 | 70 | 7.5 | 47.4 | 74.4 | −1.9 | −11.0 | 11.2 | 9.2 | 36.3 | −1.0 | −7.5 | 7.6 | 43.5 |
| 46 | 1 | 40 | 2.5 | 20.79 | 52.72 | 3.26 | −12.92 | 13.3 | 46.36 | 73.78 | −0.28 | −0.8 | 0.8 | 32.84 |
| 47 | 2.5 | 40 | 2.5 | 25.73 | 57.78 | 2.46 | −8.5 | 8.8 | 37.13 | 67.37 | 0.46 | −4.36 | 4.4 | 37.14 |
| 48 | 5 | 40 | 2.5 | 34 | 64.96 | 1.08 | −4.36 | 4.5 | 26.57 | 58.58 | 1.64 | −7.85 | 8.0 | 39.43 |
| 49 | 7.5 | 40 | 2.5 | 41.32 | 70.4 | 0.16 | −2.59 | 2.6 | 19.69 | 51.48 | 2.54 | −9.48 | 9.8 | 39 |
| 50 | 10 | 40 | 2.5 | 47.42 | 74.46 | −0.38 | −1.88 | 1.9 | 14.96 | 45.58 | 3.18 | −10.01 | 10.5 | 37.62 |
| 51 | 1 | 40 | 5 | 13.09 | 42.9 | 10.4 | −14.75 | 18.0 | 37.19 | 67.42 | −0.47 | −3.95 | 4.0 | 49.72 |
| 52 | 2.5 | 40 | 5 | 19.15 | 50.87 | 6.38 | −6.28 | 9.0 | 28.6 | 60.42 | 1.11 | −7.88 | 8.0 | 52.25 |
| 53 | 5 | 40 | 5 | 28.96 | 60.75 | 2.47 | −0.58 | 2.5 | 19.45 | 51.21 | 3.07 | −11.34 | 11.7 | 51.58 |
| 54 | 7.5 | 40 | 5 | 37.34 | 67.53 | 0.59 | 0.77 | 1.0 | 13.89 | 44.08 | 4.29 | −12.69 | 13.4 | 48.77 |
| 55 | 10 | 40 | 5 | 44.17 | 72.34 | −0.31 | 0.76 | 0.8 | 10.27 | 38.32 | 5.01 | −12.93 | 13.9 | 45.56 |
| 56 | 1 | 40 | 7.5 | 8.9 | 35.8 | 18.46 | −14.98 | 23.8 | 30.07 | 61.72 | −0.37 | −5.76 | 5.8 | 61.02 |
| 57 | 2.5 | 40 | 7.5 | 15.27 | 46.01 | 9.77 | −2.69 | 10.1 | 22.39 | 54.44 | 1.78 | −9.81 | 10.0 | 62.33 |
| 58 | 5 | 40 | 7.5 | 25.8 | 57.85 | 3.12 | 3.56 | 4.7 | 14.66 | 45.16 | 4.14 | −13.05 | 13.7 | 59.54 |
| 59 | 7.5 | 40 | 7.5 | 34.77 | 65.57 | 0.5 | 3.98 | 4.0 | 10.19 | 38.19 | 5.44 | −14.08 | 15.1 | 55.03 |
| 60 | 10 | 40 | 7.5 | 42.04 | 70.9 | −0.6 | 3.1 | 3.2 | 7.39 | 32.67 | 6.11 | −14.06 | 15.3 | 50.57 |

According to embodiments described in Tables 8 and 9, the mirror element of the invention is structured to not only withstand the wide range of temperature, humidity, and chemical and particulates' abuse when operating as part of a vehicular exterior rearview assembly, but also to ensure that the optical characteristics of ambient light, which has interacted with the mirror element, do not change within a minimum prescribed range of angles of incidence of such ambient light.

In particular, embodiments of the MIM-coating are structured such that light reflected by the mirror element (that is defined by the MIM coating on a glass substrate) remains color-neutral, as defined in this application, when the angle of incidence of ambient light shifts from about zero degrees to at least 50 degrees (with respect to the normal to the surface of the coating). Generally, embodiments of the invention include an MIM-coating structured to ensure that C* value of reflected light remains well within 15 C* units, preferably below 10 C* units, and more preferably below 5 C* units as a function of a reflection angle of up to at least 50 degrees. As follows from the example (A) described in Table 8, the C* value of light generated by a standard $D_{65}$ illuminant and reflected off of the mirror element in normal operation remains well below $C^*=\sqrt{a^{*2}+b^{*2}}=5$ units for angles of incidence up to 40 degrees (while the mirror element maintains the reflectance values exceeding 57 percent). Put differently, a user observing the object in such rearview mirror at an angle of up to 40 degrees with respect to the local normal to the surface of the mirror will not observe color change in excess of about $\Delta C^*=0.07$ units or so, while the reflectance characteristic of the mirror remains greater than 57 percent. Moreover, as follows from Table 8 for the sample (A), even when the object is observed at an angle of 50 degrees, the color shift compared to the observation of the object at zero degrees does not exceed about $\Delta C^*=0.16$ units, while C* remains well below 5 units and the reflectance value of the mirror still exceeds 55 percent. As another example, sample (B) of Table 8 is structured such that the shift of color content of the reflected light within the angular range between zero and 50 degrees does not exceed about $\Delta C^*=0.4$ units or so, while the color content itself remains at a level below $C^*=2.5$ units. Similar shifts in color characteristics representing samples (C), (D), and (E) can be easily verified from the data of Table 8. Table 9 complements the data of Table 8 representing the same samples in transmission of light. In a related embodiment of invention, the MIM coating is structured to ensure that the change of spectral content (or color shift) of light reflected from the embodiment of the mirror element as a function of angle, and measured in units of $\Delta C^*$, does not exceed 10 units of $\Delta C^*$, preferably is less than 5 units of $\Delta C^*$, and in the most preferred configuration is less than 2.5 units of $\Delta C^*$ up to at least 30 degrees from the normal to the surface of the mirror element. To the best knowledge of the inventors, exterior rearview mirror assemblies having a first-surface reflective coating that is structured to ensure such optical properties have not been reported so far.

TABLE 8

Reflectance angle effects

| (A) Glass/Cr/Si/Cr: 5 nm/20 nm/5 nm Design Non-EC transflective Polarization Mean | | | | (B) Glass/Cr/Ge/Cr: 1 nm/20 nm/5 nm Design Non-EC transflective Polarization Mean | | | |
|---|---|---|---|---|---|---|---|
| Angle of Incidence | Y | a* | b* | Angle of Incidence | Y | a* | b* |
| 0 | 57.86 | −1.80 | −3.93 | 0.00 | 57.32 | 1.71 | 1.82 |
| 10 | 57.84 | −1.80 | −3.94 | 10.00 | 57.30 | 1.71 | 1.81 |
| 20 | 57.75 | −1.80 | −3.95 | 20.00 | 57.23 | 1.71 | 1.79 |
| 30 | 57.53 | −1.80 | −3.97 | 30.00 | 57.03 | 1.70 | 1.74 |
| 40 | 57.01 | −1.79 | −4.01 | 40.00 | 56.59 | 1.69 | 1.63 |
| 50 | 55.96 | −1.76 | −4.07 | 50.00 | 55.69 | 1.65 | 1.38 |
| 60 | 53.96 | −1.66 | −4.17 | 60.00 | 53.98 | 1.57 | 0.81 |

| (C) Glass/Cr/Si/Ru: 5 nm/15 nm/5 nm Design Non-EC transflective Polarization Mean | | | | (D) Glass/Cr/Si/AlSi6040: 5 nm/25 nm/2.5 nm Design Non-EC transflective Polarization Mean | | | |
|---|---|---|---|---|---|---|---|
| Angle of Incidence | Y | a* | b* | Angle of Incidence | Y | a* | b* |
| 0.00 | 56.69 | −0.37 | −4.80 | 0.00 | 57.90 | −1.58 | −2.08 |
| 10.00 | 56.67 | −0.37 | −4.80 | 10.00 | 57.88 | −1.59 | −2.08 |
| 20.00 | 56.60 | −0.36 | −4.80 | 20.00 | 57.80 | −1.59 | −2.11 |
| 30.00 | 56.42 | −0.36 | −4.80 | 30.00 | 57.59 | −1.59 | −2.15 |
| 40.00 | 55.98 | −0.34 | −4.80 | 40.00 | 57.07 | −1.59 | −2.22 |

TABLE 8-continued

Reflectance angle effects

| 50.00 | 55.06 | −0.31 | −4.78 | 50.00 | 55.99 | −1.58 | −2.34 |
|---|---|---|---|---|---|---|---|
| 60.00 | 53.26 | −0.25 | −4.73 | 60.00 | 53.91 | −1.50 | −2.52 |

(E) Glass/Ru/Si/AlSi6040: 2.5 nm/15 nm/7.5 nm
Design Non-EC transflective
Polarization Mean

| Angle of Incidence | Y | a* | b* |
|---|---|---|---|
| 0.00 | 58.93 | −1.45 | −4.60 |
| 10.00 | 58.91 | −1.45 | −4.60 |
| 20.00 | 58.83 | −1.44 | −4.61 |
| 30.00 | 58.63 | −1.43 | −4.61 |
| 40.00 | 58.16 | −1.41 | −4.62 |
| 50.00 | 57.18 | −1.36 | −4.64 |
| 60.00 | 55.27 | −1.26 | −4.68 |

TABLE 9

Transmittance angle effects

| (A) Glass/Cr/Si/Cr: nm/20 nm/5 nm Design Non-EC transflective Polarization Mean | | | | (B) Glass/Cr/Ge/Cr: 1 nm/20 nm/5 nm Design Non-EC transflective Polarization Mean | | | |
|---|---|---|---|---|---|---|---|
| Angle of Incidence | Y | a* | b* | Angle of Incidence | Y | a* | b* |
| 0 | 10.07 | 4.02 | 14.84 | 0.00 | 9.17 | 2.00 | 6.71 |
| 10 | 10.07 | 4.02 | 14.85 | 10.00 | 9.16 | 2.00 | 6.74 |
| 20 | 10.07 | 4.02 | 14.90 | 20.00 | 9.15 | 2.02 | 6.82 |
| 30 | 10.11 | 4.02 | 14.98 | 30.00 | 9.16 | 2.05 | 6.98 |
| 40 | 10.27 | 4.00 | 15.10 | 40.00 | 9.26 | 2.12 | 7.26 |
| 50 | 10.63 | 3.95 | 15.30 | 50.00 | 9.53 | 2.26 | 7.73 |
| 60 | 11.29 | 3.82 | 15.56 | 60.00 | 10.02 | 2.53 | 8.53 |

| (C) Glass/Cr/Si/Ru: 5 nm/15 nm/5 nm Design Non-EC transflective Polarization Mean | | | | (D) Glass/Cr/Si/AlSi6040: 5 nm/25 nm/2.5 nm Design Non-EC transflective Polarization Mean | | | |
|---|---|---|---|---|---|---|---|
| Angle of Incidence | Y | a* | b* | Angle of Incidence | Y | a* | b* |
| 0.00 | 9.73 | 1.03 | 11.50 | 0.00 | 10.38 | 4.36 | 17.50 |
| 10.00 | 9.73 | 1.03 | 11.51 | 10.00 | 10.38 | 4.36 | 17.52 |
| 20.00 | 9.73 | 1.03 | 11.53 | 20.00 | 10.38 | 4.37 | 17.57 |
| 30.00 | 9.77 | 1.02 | 11.58 | 30.00 | 10.43 | 4.38 | 17.67 |
| 40.00 | 9.91 | 1.01 | 11.63 | 40.00 | 10.60 | 4.39 | 17.87 |
| 50.00 | 10.24 | 0.97 | 11.70 | 50.00 | 10.99 | 4.39 | 18.19 |
| 60.00 | 10.84 | 0.89 | 11.73 | 60.00 | 11.71 | 4.32 | 18.66 |

(E) Glass/Ru/Si/AlSi6040: 2.5 nm/15 nm/7.5 nm
Design Non-EC transflective
Polarization Mean

| Angle of Incidence | Y | a* | b* |
|---|---|---|---|
| 0.00 | 9.95 | 1.00 | 12.77 |
| 10.00 | 9.95 | 1.00 | 12.78 |
| 20.00 | 9.95 | 1.00 | 12.81 |
| 30.00 | 9.99 | 0.99 | 12.85 |
| 40.00 | 10.14 | 0.97 | 12.92 |
| 50.00 | 10.49 | 0.90 | 13.02 |
| 60.00 | 11.13 | 0.77 | 13.14 |

Samples and Testing.

As already mentioned above, various implementations of the mirror element of the invention are specifically structured such as to ensure that the mirror element is operable as part of the exterior automotive rearview assembly. It should be noted that not every mirror element would satisfy this requirement. In particular, as a person of skill in the arts will appreciate, mirror elements used as mirrors for use at home, mirror elements for use with an interior vehicular rearview assembly, and various reflectors not specifically designated for use with the exterior vehicular mirror assembly, to name just a few, cannot, generally, be utilized with an exterior rearview assembly. Indeed, automotive industry imposes specific operational requirements on exterior mirror elements, and, unless a given mirror element is shown to satisfy such requirements—as proven by specifically designed tests recognized in automotive industry—such mirror element cannot be used for intended purposes and it is likely to fail due to harsh operational conditions.

The following examples provide illustrations to several measured operational characteristics of embodiments of a mirror element of the invention, as needed for operation in an exterior rearview assembly. In particular, the measurements of the fabricated samples were made with respect to optical properties, haze in reflection of light (a parameter describing reflection of light that excludes specular reflection of light), mechanical/adhesion characteristics, and durability in response to environmental and/or chemical exposure. For each of these examples, an MIM-coating was deposited on the convex glass substrate (1.6 mm thick), the aspheric glass substrate (1.6 mm thick), and flat glass substrate (2.2 mm thick) by magnetron sputtering and included the first metallic layer of chromium with thickness of about 50 Angstrom. In fabricating the samples, an approximately 100 square inch target was run at about 1000 watts of DC power and the speed of the conveyor carrying a substrate was adjusted to control the thickness of the film. The I-layer of the MIM coating is a silicon layer approximately 260 angstroms thick. A 100 square inch target was also run at 2000 watts of DC power with a pulse frequency of 100 kHz. The conveyor speed was also adjusted on this layer to control the thickness of the silicon. The second metallic layer of the MIM coating was a chrome layer deposited the same as the first layer. The speed of the conveyor was adjusted to control the film thickness of approximately 50-60 angstroms. The argon pressure was held constant at 2 mTorr during the deposition of all three layers.

The measured optical properties of so fabricated mirror elements are shown in FIGS. 11 through 14. FIG. 11A provides a plot illustrating color content of light directly incident onto and reflected by a mirror element of the invention that is oriented with the MIM coating towards the source of light (when light in incident onto the first surface of the mirror element), demonstrating the C* values on the order of 3.5 or lower. FIG. 11B shows plots detailing reflectance characteristics of such mirror element. It can be observed that the reflectance values for mirror samples with flat, convex, and aspheric substrates range, in this case, from about 54 percent up to about 60 percent. FIGS. 12A and 12B show similar plots for a mirror element the MIM-coating of which is turned away from the source of light (in this case, the light incident onto the MIM-coating passes first through the glass substrate of the mirror element). Reflectance values measured in this configuration are, understandably, reduced as compared to the case of FIG. 11B. FIGS. 13A and 13B illustrate color and transmittance parameters for light that has impinged directly onto the MIM coating and then transmitted through the MIM coating and the glass substrate. The transmittance values are on the order of 8 to 9 percent. It follows, therefore, that the fabricated samples of a mirror element of the invention satisfy the optical requirements imposed on the automotive rearview mirror elements by the industry.

The fabricated mirror elements defined by the above-described MIM-coating were subjected to the snap test (such as 3M-610 or General Motors specified 3M #710; here, a piece of controlled tape adhered to the coating is pulled perpendicularly to the coated substrate surface and the resultant surface is examined for regions where the coating got detached); epoxy pop test (here, an uncured epoxy layer formulated according to U.S. Pat. No. 6,963,439 approximately 150 microns thick, and diameter of about ½" or less, is placed between two coated glass surfaces, cured for a minimum of 10 minutes at 302-338 F, cooled, and then the two pieces of coated glass are separated using a razor blade to create force to separate the two pieces of glass); and the eraser test (in which the mirror coating is subjected to 2000 strokes of a pencil eraser at about 1 kg load), all of which test the mirror coatings passed without being degraded.

Additional environmental tests passed by the embodiments of the invention included the salt-spray test (a 250 hour exposure to a 5% salt spray in accordance with ASTM B 117); a humidity test (exposure to 50° C., 95% relative humidity, for 10 days); a high temperature test (a 7 day exposure to 100° C.); a low temperature test (a 7 day exposure at −40° C.); a short-term heat storage test (a 1 hour exposure at 170° C. in the oven), a Corrodkote test (Corrodkote slurry was prepared per ASTM B380-97, then applied to the samples and maintained at high-T/high-humidity for 20 hours, after which the salt spray test was added for 10 days); and a CASS (Copper Accelerated Acetic Acid Salt Spray) test (a 96 hour exposure to a 5% sodium chloride solution, with one gram of copper chloride dehydrate added to each 3.8 liters of salt solution. The solution is then adjusted to a pH range of 3.1 to 3.3 by adding acetic acid, and the temperature of the salt spray chamber is controlled. This is performed similar to the ASTM B117 Salt Spray test). Prior to and after each of these tests, optical characteristics of the mirror samples were measured to determine the changes in optical characteristics caused by the tests. Generally, the change in haze reflectance parameter was between about −0.01 and 0.01, the change in the overall reflectance value remained within the range from −0.67 to −0.07, and the change in transmittance value remained within the range from −0.33 to 0.51. Preferably, the delta haze will be less than 1% and most preferably less than 0.5%, the delta reflectance and/or delta transmittance will be less than 1.5% and preferably less than 1% and most preferably less than 0.5%.

Chemical tests of the MIM-coatings of the mirror samples included immersion into boiling water for 200 hours; alcohol swipe test; repeated cycling of exposure to boiling water and iced water (25 cycles); acid resistance test (such as 1% sulfuric acid, immersion for 0.5 hours); alkali resistance test (1% caustic soda, immersion for 0.5 hours); resistance against cutting oil and resistance against grinding solution. In each of the tests the changes in optical characteristics did not exceed the limits discussed above in reference to environmental testing of the MIM-coated mirror samples.

Figure 14A:
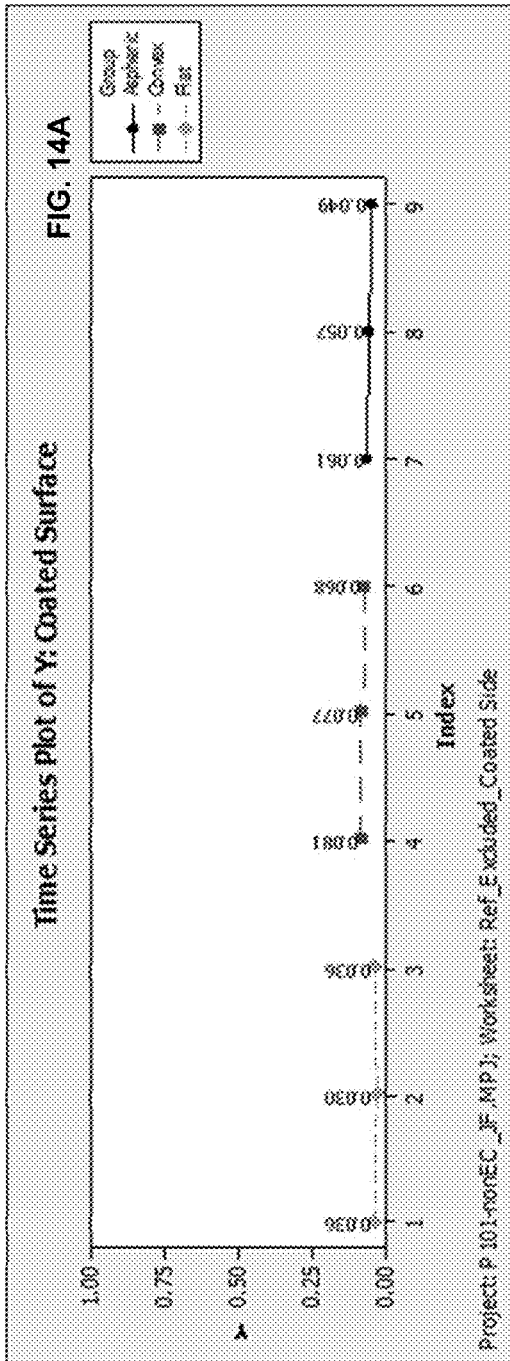
FIGS. 14A and 14B illustrate reflectance parameters corresponding to non-specular reflection of light incident onto the first and second surfaces, respectively, of mirror samples fabricated according to an embodiment of the invention.
Figure 14B:
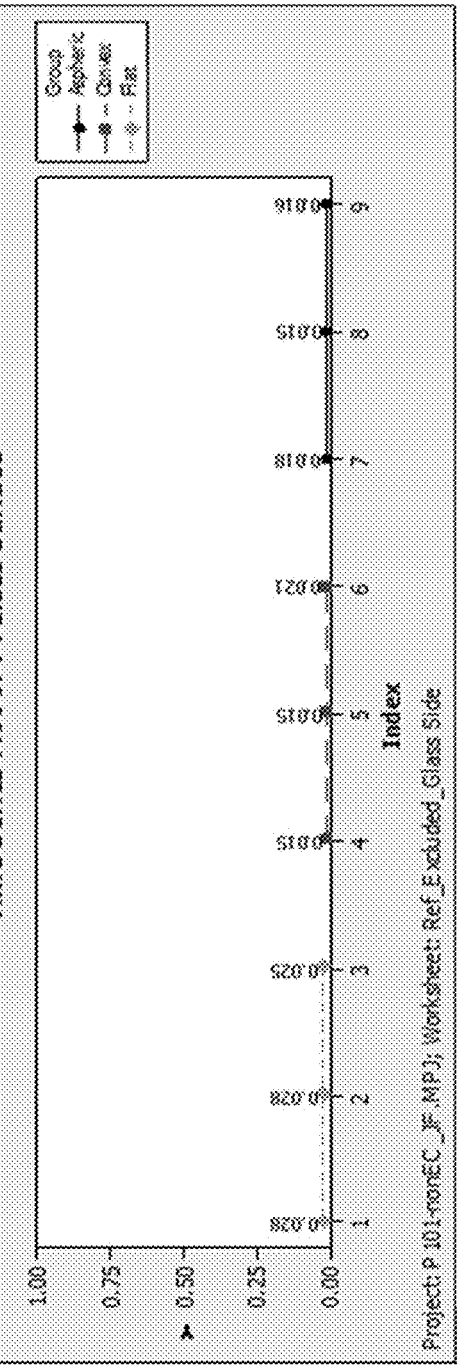

FIGS. 14A and 14B show the results of measurements of reflection of light of the same mirror samples off of the MIM-coated surface and off of the glass surface (the second surface of the mirror element), demonstrating that the amount of haze (corresponding to incident light that has been reflected non-specularly is well below 1%.

Based on the above-described measurements, successful implementation of the MIM-defined mirror elements suitable for operation in a vehicular exterior rearview assembly has been demonstrated.

Figure 15:
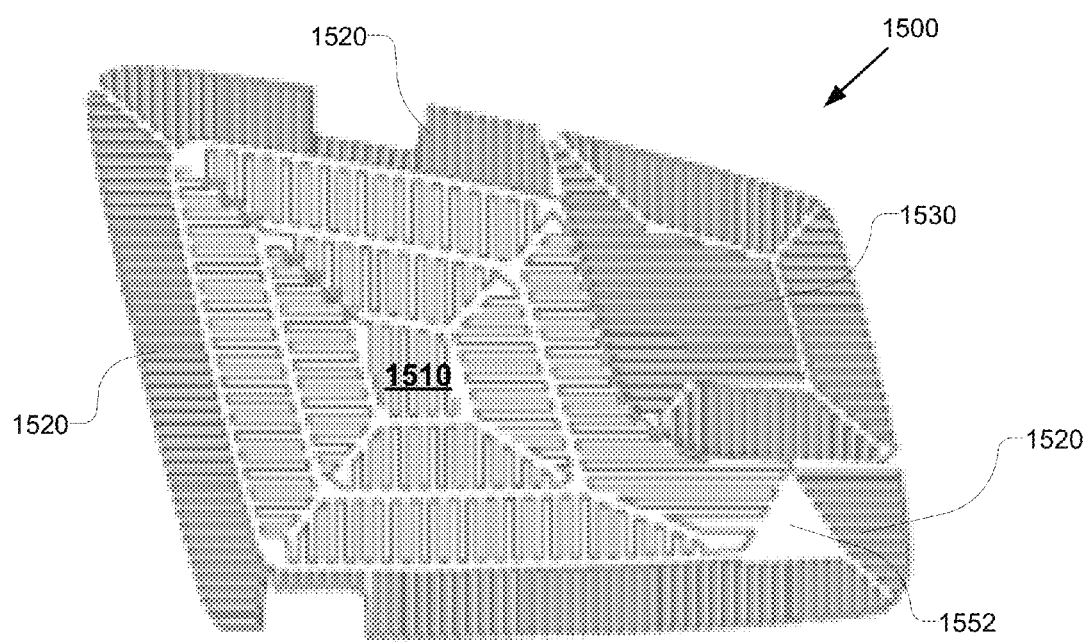
FIG. 15 is a diagram showing schematically an electrically-conductive pattern of a heating element for use with an embodiment of an exterior rearview mirror assembly.

It is appreciated that the exterior rearview assemblies often require the use of a heating element. Examples of the appropriate heating elements and modes of their operation are detailed in co-assigned U.S. 2011/0168687. FIG. 15 illustrates an embodiment 1500 of a heating layer of a three-zone heating element, where a zone 1510 corresponds to the inner area of the mirror element to be heated and is disposed in a substantially internal relationship with respect to a first exterior zone 1520 (extending along an arc of the circumference of the heating element 1500), and a second exterior zone 1530. Here, the zones 1520 and 1530 may be viewed as corresponding to different portions of the peripheral area of the mirror element to be heated. Each of the zones 1510, 1520 and 1530 has a pair of corresponding terminal contacts connecting these heating zones to electronic circuitry. The embodiment of the heating pattern layer 1500 is shown to contain a "light indicia" opening (either in a pattern of one of the heating zones or between the heating zones). As illustrated, the light indicia opening is provided between the zones 1510 and 1520. Such opening advantageously allows for both the heating of the mirror element and transmission of light by or to any of information or detection devices (such as, e.g., an information display, a blind spot indicator, or a turn signal for example) that may be employed in a rearview assembly behind the mirror element, as defined with respect to the viewer. In a rearview assembly, the opening 1552 is arranged in overlying registry with the predetermined area of the mirror element through which the light is transmitted.

An embodiment of the exterior rearview assembly may include or be operably associated with a processor controlled by instructions stored in a memory. The memory may be random access memory (RAM), read-only memory (ROM), flash memory or any other memory, or combination thereof, suitable for storing control software or other instructions and data. Some of the functions performed by such processor govern the operation of electronic circuitry and/or light source and other auxiliary devices associated with the rearview assembly. Instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described examples of embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

What is claimed is:

1. An exterior automotive rearview assembly having a front, the assembly comprising:
    a mirror element structured for normal operation as part of the exterior automotive rearview assembly and including
        a first substrate having a first surface corresponding to the front and a second surface substantially tangentially parallel to the first surface; and
        a thin-film coating carried on the first surface, said thin-film coating including first and second metallic layers and a non-metallic layer disposed therebetween such as to impart, to the first substrate with the thin-film coating thereon, a reflectance value from about 35 percent to about 70 percent and a transmittance value from about 5 percent to about 20 percent as measured in visible light generated by a standard $D_{65}$ illuminant and incident onto the first surface from the front.

2. An assembly according to claim 1, wherein each of the first and second metallic layers includes a layer of chromium and a non-metallic layer includes a layer of silicon such that said reflectance value is between about 45 percent and about 65 percent and said transmittance value is between about 7.5 percent and about 15 percent.

3. An assembly according to claim 1, wherein the first substrate is in contact with ambient medium surrounding the assembly during normal operation of the assembly.

4. An assembly according to claim 1, wherein the thin-film coating includes thin-film layers structured to ensure that a color characteristic of said visible light reflected by the mirror element does not exceed 15 units of metric chroma $C^* = \sqrt{a^{*2} + b^{*2}}$, $a^*$ and $b^*$ being color parameters of the CIELAB color system.

5. An assembly according to claim 1, wherein the thin-film coating includes thin-film layers structured to ensure that a color characteristic of said visible light reflected by the mirror element does not exceed 10 units of metric chroma $C^* = \sqrt{a^{*2} + b^{*2}}$, $a^*$ and $b^*$ being color parameters of the CIELAB color system.

6. An assembly according to claim 1, wherein the thin-film coating includes thin-film layers structured to ensure that a color characteristic of said visible light reflected by the mirror element does not exceed 5 units of metric chroma $C^* = \sqrt{a^{*2} + b^{*2}}$, $a^*$ and $b^*$ being color parameters of the CIELAB color system.

7. An assembly according to claim 1, wherein the mirror element is configured to ensure that, during normal operation of the assembly, a difference between first and second color characteristic values of the mirror element measured in reflection of light generated by the standard $D_{65}$ illuminant does not exceed 5 units of metric chroma $C^* = \sqrt{a^{*2} + b^{*2}}$, wherein the first color characteristic value corresponds to light incident onto the mirror element along a normal to the first surface and the second color characteristics value corresponds to light incident onto the first surface at an angle up to about 40 degrees, $a^*$ and $b^*$ being color parameters of the CIELAB color system.

8. An assembly according to claim 1, wherein the mirror element is configured to ensure that, during normal operation of the assembly, a difference between first and second color characteristic values of the mirror element measured in reflection of light generated by the standard $D_{65}$ illuminant does not exceed 2.5 units of metric chroma $C^* = \sqrt{a^{*2} + b^{*2}}$, wherein the first color characteristic value corresponds to light incident onto the mirror element along a normal to the first surface and the second color characteristics value corresponds to light incident onto the first surface at an angle up to about 40 degrees, $a^*$ and $b^*$ being color parameters of the CIELAB color system.

9. An assembly according to claim 1, wherein the non-metallic layer of said thin-film coating includes a semiconductor material layer or a dielectric material layer.

10. An assembly according to claim 9, wherein a metallic layer of said thin-film coating includes one or more of chromium, molybdenum, nickel, Inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, and alloys thereof.

11. An assembly according to claim 9, wherein the non-metallic layer includes one or more of Si, SiGe, InSb, InP, InGa, InAlAs, InAl, InGaAs, HgTe, Ge, GaSb, AlSb, GaAs and AlGaAs.

12. An assembly according to claim 11, wherein the non-metallic layer includes a material layer having refractive index greater than 1.9.

13. An assembly according to claim 1, wherein said first surface includes a non-planar surface.

14. An assembly according to claim 1, further comprising:
a housing juxtaposed with the mirror element such that the first surface is observable from the front;
a heating element located in the inner volume behind the mirror element in thermal contact with a corresponding area of the mirror element; and
a light source behind the heating element, the light source configured to provide visually-perceivable indicia representing operation of the vehicle, said heating element containing a light-indicia area that is arranged in overlying registry with said light source such as to transmit light from the light source through said light indicia area towards the front.

15. An assembly according to claim 1, characterized by at least one of (i) a change in haze reflectance parameter by less than 1.0 percent, (ii) a change in the overall reflectance value by less than 1.5 percent, (iii) a change in transmittance value by less than 1.5% as a result of exposure to at least one of industrial tests of CASS, salt-spray test according to ASTM B117, a Corrodkote test, a high-temperature test, a humidity test, a short-term heat storage test, a boiling water test, an alkali resistance test, and a test of resistance against cutting oil and grinding solution.

16. An assembly according to claim 1, characterized by at least one of (i) a change in haze reflectance parameter by less than 0.5 percent, (ii) a change in the overall reflectance value by less than 1.0 percent, (iii) a change in transmittance value by less than 1.0 as a result of exposure to at least one of industrial tests of CASS, salt-spray test according to ASTM B117, a Corrodkote test, a high-temperature test, a humidity test, a short-term heat storage test, a boiling water test, an alkali resistance test, and a test of resistance against cutting oil and grinding solution.

17. An assembly according to claim 1, further comprising at least one auxiliary device operably associated with the assembly and including one or more of a heating element, a source of light, an illumination assembly, a power supply, a global positioning system, an exterior light control, a moisture sensor, an information display, a light sensor, a blind spot indicator, a turning signal indicator, an approach warning, a compass, a temperature indicator, a voice actuated device, a dimming circuitry, a telecommunication system, a navigation aid, a lane departure warning system, an adaptive cruise control, a vision system, a rear vision system and a tunnel detection system.

18. An assembly according to claim 17, further comprising a processor configured to govern an operation of the at least one auxiliary device.

19. An exterior automotive rearview assembly having a front, the assembly comprising:
a single-substrate mirror element structured for normal operation as part of the exterior automotive rearview assembly and including
a substrate having a non-planar first surface corresponding the front and a second surface substantially parallel to the first surface; and
a thin-film coating carried on the first surface, said thin-film coating exposed to an incident medium, said thin-film coating including first and second metallic layers and a non-metallic layer disposed therebetween such as to impart, to the single-substrate mirror element, a reflectance value from about 35 percent to about 70 percent, a transmittance value from about 5 percent to about 20 percent, and a change of metric chroma C* color characteristic of less than 10 units as a function of angle of incidence of light between zero degrees and about 30 degrees, as measured in visible light generated by a standard $D_{65}$ illuminant and directly incident onto the first surface from the incident medium, wherein $C^*=\sqrt{a^{*2}+b^{*2}}$ and a* and b* are parameters of the CIELAB color system.

20. An assembly according to claim 19, further comprising:
a housing juxtaposed with the mirror element such that the first surface is observable from the front;
a heating element located in the inner volume behind the mirror element in thermal contact with a corresponding area of the mirror element; and
a light source behind the heating element, the light source configured to provide visually-perceivable indicia representing operation of the vehicle, said heating element containing a light-indicia area that is arranged in overlying registry with said light source such as to transmit light from the light source through said light indicia area towards the front.

21. An assembly according to claim 19, wherein a metallic layer of said thin-film coating includes one or more of chromium, molybdenum, nickel, Inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, and alloys thereof.

22. An assembly according to claim 19, wherein the non-metallic layer includes one or more of Si, SiGe, InSb, InP, InGa, InAlAs, InAl, InGaAs, HgTe, Ge, GaSb, AlSb, GaAs and AlGaAs.

23. An assembly according to claim 19, wherein the non-metallic layer includes a material layer having refractive index greater than 1.9.

24. An assembly according to claim 19, wherein the mirror element is structured such that, during normal operation of the assembly, a difference between first and second color characteristic values of the mirror element measured in reflection of light generated by the standard $D_{65}$ illuminant does not exceed 5 units of metric chroma $C^*=\sqrt{a^{*2}+b^{*2}}$, wherein the first color characteristic value corresponds to light incident onto the mirror element along a normal to the first surface and the second color characteristics value corresponds to light incident onto the first surface at an angle up to about 40 degrees, a* and b* being color parameters of the CIELAB color system.

25. An assembly according to claim 19, wherein the thin-film coating is configured to ensure that a color characteristic of said visible light reflected by the mirror element in the course of normal operation of a rearview assembly does not exceed 15 units of metric chroma $C^*=\sqrt{a^{*2}+b^{*2}}$, a* and b* being color parameters of the CIELAB color system.

26. An assembly according to claim 19, wherein the thin-film coating is configured to ensure that a color characteristic of said visible light reflected by the mirror element in the course of normal operation of a rearview assembly does not exceed 10 units of metric chroma $C^*=\sqrt{a^{*2}+b^{*2}}$, a* and b* being color parameters of the CIELAB color system.

27. An assembly according to claim 19, characterized by at least one of (i) a change in haze reflectance parameter by less than 1.0 percent, (ii) a change in the overall reflectance value by less than 1.5 percent, (iii) a change in transmittance value by less than 1.5% as a result of exposure to at least one of industrial tests of CASS, salt-spray test according to ASTM B117, a Corrodkote test, a high-temperature test, a humidity test, a short-term heat storage test, a boiling water test, an alkali resistance test, and a test of resistance against cutting oil and grinding solution.

28. An assembly according to claim 19, characterized by at least one of (i) a change in haze reflectance parameter by less than 0.5 percent, (ii) a change in the overall reflectance value by less than 1.0 percent, (iii) a change in transmittance value by less than 1.0 as a result of exposure to at least one of industrial tests of CASS, salt-spray test according to ASTM B117, a Corrodkote test, a high-temperature test, a humidity test, a short-term heat storage test, a boiling water test, an alkali resistance test, and a test of resistance against cutting oil and grinding solution.

29. An assembly according to claim 19, further comprising at least one auxiliary device operably associated with the assembly and including one or more of a heating element, a source of light, an illumination assembly, a power supply, a global positioning system, an exterior light control, a moisture sensor, an information display, a light sensor, a blind spot indicator, a turning signal indicator, an approach warning, a compass, a temperature indicator, a voice actuated device, a dimming circuitry, a telecommunication system, a navigation aid, a lane departure warning system, an adaptive cruise control, a vision system, a rear vision system and a tunnel detection system.

* * * * *